(12) United States Patent
Liu et al.

(10) Patent No.: US 10,896,369 B2
(45) Date of Patent: Jan. 19, 2021

(54) POWER CONVERSION IN NEURAL NETWORKS

(71) Applicant: Shanghai Cambricon Information Technology Co., Ltd, Shanghai (CN)

(72) Inventors: Shaoli Liu, Shanghai (CN); Yimin Zhuang, Shanghai (CN); Qi Guo, Shanghai (CN); Tianshi Chen, Shanghai (CN)

(73) Assignee: CAMBRICON TECHNOLOGIES CORPORATION LIMITED, Beijing (CN)

(*) Notice: Subject to any disclaimer, the term of this patent is extended or adjusted under 35 U.S.C. 154(b) by 0 days.

(21) Appl. No.: 16/283,711

(22) Filed: Feb. 22, 2019

(65) Prior Publication Data
US 2019/0205739 A1    Jul. 4, 2019

Related U.S. Application Data

(63) Continuation-in-part of application No. PCT/CN2018/081929, filed on Apr. 4, 2018.

(30) Foreign Application Priority Data

Apr. 6, 2017   (CN) .......................... 2017 1 0222232
Apr. 7, 2017   (CN) .......................... 2017 1 0227493
(Continued)

(51) Int. Cl.
G06N 3/063    (2006.01)
G06F 9/38     (2018.01)
G06F 9/30     (2018.01)

(52) U.S. Cl.
CPC .......... *G06N 3/063* (2013.01); *G06F 9/30025* (2013.01); *G06F 9/30083* (2013.01); *G06F 9/3802* (2013.01)

(58) Field of Classification Search
CPC ...................................................... G06N 3/063
(Continued)

(56) References Cited

U.S. PATENT DOCUMENTS 5,072,130 A * 12/1991 Dobson ................. G06F 7/5095
                                                            706/26
5,629,884 A *  5/1997 Pan .......................... G06F 1/035
                                                            341/75
(Continued)

FOREIGN PATENT DOCUMENTS

CN    100586092 C    1/2010
CN    201726420 U    1/2011
(Continued)

OTHER PUBLICATIONS

Iwata et al., An Artificial Neural Network Accelerator Using General Purpose 24 Bits Floating Point Digital Signal Processors; IJCNN; Jun. 18-22, 1989; pp. 11-171 to 11-175 (Year: 1989).*
(Continued)

*Primary Examiner* — James D. Rutten
(74) *Attorney, Agent, or Firm* — Getech Law LLC; Jun Ye

(57) ABSTRACT

The present disclosure provides an operation device, comprising: an operation module for executing a neural network operation; and a power conversion module connected to the operation module, for converting input neuron data and/or output neuron data of the neural network operation into power neuron data. The present disclosure further provides an operation method. The operation device and method according to the present disclosure reduce the cost of storage resources and computing resources and increase the operation speed.

22 Claims, 22 Drawing Sheets

(30) Foreign Application Priority Data

| | | | |
|---|---|---|---|
| Apr. 19, 2017 | (CN) | ............................ | 2017 1 0256444 |
| Apr. 21, 2017 | (CN) | ............................ | 2017 1 0266052 |
| May 5, 2017 | (CN) | ............................ | 2017 1 0312415 |

(58) Field of Classification Search
USPC .......................................................... 706/43
See application file for complete search history.

(56) References Cited

U.S. PATENT DOCUMENTS

| | | | | |
|---|---|---|---|---|
| 6,247,114 | B1* | 6/2001 | Trull ..................... | G06F 9/3802 712/202 |
| 6,581,049 | B1* | 6/2003 | Aparicio, IV ......... | G06N 3/063 706/39 |
| 2005/0135506 | A1* | 6/2005 | Ma ....................... | H03G 3/3042 375/316 |
| 2010/0257221 | A1* | 10/2010 | Jiang ......................... | G06F 7/38 708/495 |
| 2011/0251985 | A1* | 10/2011 | Waxman .................. | A61B 5/08 706/20 |
| 2015/0170021 | A1* | 6/2015 | Lupon .................... | G06N 3/063 706/15 |
| 2017/0315778 | A1* | 11/2017 | Sano ................... | G06F 9/30025 |
| 2017/0357891 | A1* | 12/2017 | Judd ....................... | G06N 3/049 |
| 2018/0046597 | A1* | 2/2018 | Chen ........................ | G06F 7/58 |
| 2018/0089562 | A1* | 3/2018 | Jin .......................... | G06F 7/5443 |
| 2018/0121796 | A1* | 5/2018 | Deisher .................. | G06N 3/063 |
| 2019/0205740 | A1* | 7/2019 | Judd ....................... | G06N 3/063 |

FOREIGN PATENT DOCUMENTS

| | | |
|---|---|---|
| CN | 102508803 A | 6/2012 |
| CN | 104598391 A | 5/2015 |
| CN | 105426160 A | 3/2016 |
| CN | 105844330 A | 8/2016 |
| CN | 105930902 A | 9/2016 |
| CN | 106066783 A | 11/2016 |
| WO | 2016099779 A1 | 6/2016 |

OTHER PUBLICATIONS

Li, Z., Wang, Y., Zhi, T. et al. "A survey of neural network accelerators" Front. Comput. Sci. (2017) 11: 746. https://doi.org/10.1007/s11704-016-6159-1 (Year: 2017).*

Miyashita et al. "Convolutional Neural Networks using Logarithmic Data Representation" Mar. 17, 2016, eprint at arXiv.org, <arXiv.org/abs/1603.01025> (Year: 2016).*

Chen, et al., "A Small-Footprint Accelerator for Large-Scale Neural Networks", ACM Transactions on Computer Systems, vol. 33, No. 2, Article 6, May 2015, 27 pages.

Du, et al., "An Accelerator for High Efficient Vision Processing", IEEE Transactions on Computer-aided Design of Integrated Circuits and System, vol. 36, No. 2, Feb. 2017, pp. 227-240.

Liu, et al., "Cambricon: An Instruction Set Architecture for Neural Networks", 2016 ACM/IEEE 43rd Annual International Symposium on Computer Architecture, Oct. 12, 2016, pp. 393-405.

Zhang, et al., "Cambricon-X" An Accelerator for Sparse Neural Networks, The 49th Annual IEEE/ACM International Symposium on Microarchitecture Article No. 20, Oct. 15, 2016, 12 pages.

Chen, et al., "DaDianNao: A Machine-Learning Supercomputer", 2014 47th Annual IEEE/ACM International Symposium on Microarchitecture, Dec. 13, 2014, pp. 609-622.

Luo, et al., "DaDianNao: A Neural Network Supercomputer", IEEE Transaction on Computers, vol. 66, No. 1, Jan. 2017, pp. 73-88.

Chen, et al., "DianNao: A Small-Footprint High-Throughput Accelerator for Ubiquitous Machine-Learning", ASPLOS 14, Proceedings of the 19th international conference on Architectural Support for Programming Languages and Operating Systems, Mar. 1-5, 2014, pp. 269-283.

Chen, et al., "DianNao Family: Energy-Efficient Hardware Accelerators for Machine Learning", Communications of he ACM, vol. 59, No. 11, Nov. 2016, pp. 105-112.

Liu, et al., "PuDianNao: A Polyvalent Machine Learning Accelerator", ASPLOS '15 Proceedings of the Twentieth International Conference on Architectural Support for Programming Languages and Operating Systems, Mar. 14-18, 2015, pp. 369-381.

Du, et al., "ShiDianNao: Shifting Vision Processing Closer to the Sensor", ISCA '15 Proceedings of the 42nd Annual International Symposium on Computer Architecture, Jun. 13-17, 2015, pp. 92-104.

Application No. 19199528.1—Extended European Search Report, dated Feb. 11, 2020, 9 pages.

Lazzizzera, et al., "Fast and Compact Controllers with Digital Neural Networks", Instrumental and Measurement Technology Conference, 1997, IEEE, vol. 1, Ottawa, Canada, May 19, 1997, 6 pages.

EP18780474, Supplemental European Search Report dated Feb. 17, 2020, 1 page.

CN201110256444.5, Official Action dated Jan. 2, 2020, 11 pages. (No English translation).

PCT/CN2017/101843—International Search Report, dated Jan. 18, 2018, 8 pages. (no English translation).

Lazzizzera et al.; "Fast and Compact Controllers with Digital Neural Networks"; IEEE Instrumentation and Measurement Technology Conference, Ottawa, Canada, May 19-21, 1997, 6 pages.

* cited by examiner

| Power-bit data | 00000 | 00001 | 00010 | 00011 | 00100 |
|---|---|---|---|---|---|
| Exponential value | 0 | 3 | 4 | 1 | Zero setting |

FIG.1I

| Power-bit data | 00000 | 00001 | 00010 | 00011 | 11111 |
|---|---|---|---|---|---|
| Exponential value | 0 | 1 | 2 | 3 | Zero setting |

FIG.1J

| Power-bit data | 00000 | 00001 | 00010 | 00011 | 11111 |
|---|---|---|---|---|---|
| Exponential value | 0 | 2 | 4 | 6 | Zero setting |

FIG.1K

| Power-bit data | 11111 | 11110 | 11101 | 11100 | 00000 |
|---|---|---|---|---|---|
| Exponential value | 0 | 1 | 2 | 3 | Zero setting |

FIG.1L

POWER CONVERSION IN NEURAL NETWORKS

CROSS-REFERENCE TO RELATED APPLICATIONS

The present invention is a continuation-in-part of PCT Application No. PCT/CN2018/081929, filed on Apr. 4, 2018, which claims priority to CN Application No. 201710222232.5, filed on Apr. 4, 2017, CN Application No. 201710227493.6, filed on Apr. 7, 2017, CN Application No. 201710256444.5, filed on Apr. 19, 2017, CN Application No. 201710266052.7, filed Apr. 21, 2017 and CN Application No. 201710312415.6, filed May 5, 2017. The entire contents of each of the aforementioned applications are incorporated herein by reference.

TECHNICAL FIELD

The present disclosure relates to the technical field of artificial intelligence, and more particularly to an operation device and method.

BACKGROUND

Multi-layer neural networks are widely used in tasks such as classification and identification. In recent years, due to their high identification rate and high parallelism, they have received extensive attention from academia and industry.

At present, some neural networks with better performance are usually very large, which means that these neural networks require a large amount of computing resources and storage resources, whose overhead will reduce the operational speed of the neural networks, and at the same time greatly increase the requirement on the transmission bandwidth of hardware and that on the operation device.

SUMMARY

(I) Technical Problem to be Solved

The present disclosure provides an operation device and method, which at least partially solve the technical problem as mentioned above.

(II) Technical Solutions

According to an aspect of the present disclosure, it provides a neural network operation device, comprising:
an operation module for executing a neural network operation; and
a power conversion module connected to the operation module, for converting input neuron data and/or output neuron data of the neural network operation into power neuron data.

In some embodiments, the power conversion module includes:
a first power conversion unit for converting the neuron data output from the operation module into power neuron data; and
a second power conversion unit for converting the neuron data input to the operation module into power neuron data.

In some embodiments, the operation module further includes a third power conversion unit for converting the power neuron data into non-power neuron data.

In some embodiments, the neural network operation device further comprises:

a storage module for storing data and operational instructions;
a control module for controlling interactions of the data and the operational instructions, the control module is configured to receive the data and the operational instructions sent by the storage module and decode the operational instructions into operational microinstructions;
wherein the operation module includes an operation unit for receiving the data and the operational microinstructions sent by the control module, and performing the neural network operation on the received weight data and neuron data according to the operational microinstructions.

In some embodiments, the control module includes: an operational instruction buffer unit, a decoding unit, an input neuron buffer unit, a weight buffer unit and a data control unit,
wherein the operational instruction buffer unit is connected to the data control unit for receiving operational instructions sent by the data control unit;
the decoding unit is connected to the operational instruction buffer unit for reading operational instructions from the operational instruction buffer unit and decoding the operational instructions into operational microinstructions;
the input neuron buffer unit is connected to the data control unit for acquiring corresponding power neuron data from the data control unit;
the weight buffer unit is connected to the data control unit for acquiring corresponding weight data from the data control unit;
the data control unit is connected to the storage module for implementing interactions of the data and the operational instructions between the storage module and the operational instruction buffer unit, the weight buffer unit as well as the input neuron buffer unit, respectively;
wherein the operation unit is connected to the decoding unit, the input neuron buffer unit and the weight buffer unit respectively, for receiving the operational microinstructions, the power neuron data and the weight data, and performing corresponding neural network operations on the power neuron data and the weight data received by the operation unit according to the operational microinstructions.

In some embodiments, the neural network operation device further comprises an output module including an output neuron buffer unit for receiving neuron data output from the operation module;
wherein, the power conversion module includes:
a first power conversion unit connected to the output neuron buffer unit for converting the neuron data output from the output neuron buffer unit into the power neuron data;
a second power conversion unit connected to the storage module for converting the neuron data input to the storage module into the power neuron data;
the operation module further includes:
a third power conversion unit connected to the operation unit for converting the power neuron data into non-power neuron data.

In some embodiments, the first power conversion unit is further connected to the data control unit for converting the neuron data output from the operation module into power neuron data and sending the power neuron data to the data control unit as input data of a next layer of neural network operation.

In some embodiments, the power neuron data includes sign bits used to indicate the sign of the power neuron data and power bits used to indicate power-bit data of the power neuron data; the sign bits include one or more bits of data, and the power bits include m bits of data, with m being a positive integer greater than 1.

In some embodiments, the neural network operation device further comprises a storage module pre-stored with an encoding table including the power-bit data and exponential values, the encoding table is used to acquire an exponential value corresponding to the each power-bit data according to the power-bit data of the power neuron data.

In some embodiments, the encoding table further includes one or more zero setting power-bit data, to which the corresponding power neuron data is 0.

In some embodiments, the power neuron data corresponding to the maximum power-bit data is 0, or the power neuron data corresponding to the minimum power-bit data is 0.

In some embodiments, a correspondence in the encoding table is that the most significant bit of the power-bit data represents a zero setting bit, while the other m−1 bits of the power-bit data correspond to the exponential values.

In some embodiments, a correspondence in the encoding table is a positive correlation. The storage module is pre-stored with an integer x and a positive integer y, wherein the exponential value corresponding to the minimum power-bit data is x, where x denotes an offset value and y denotes a step length.

In some embodiments, the exponential value corresponding to the minimum power-bit data is x, the power neuron data corresponding to the maximum power-bit data is 0, and the exponential values corresponding to other power-bit data than the minimum and maximum power-bit data are (power-bit data+x)*y.

In some embodiments, y=1, x=−2m−1.

In some embodiments, a correspondence in the encoding table is a negative correlation. A storage module is pre-stored with an integer x and a positive integer y, wherein the exponential value corresponding to the maximum power-bit data is x, where x denotes an offset value and y denotes a step length.

In some embodiments, the exponential value corresponding to the maximum power-bit data is x, the power neuron data corresponding to the minimum power-bit data is 0, and the exponential values corresponding to other power-bit data than the minimum and maximum power-bit data are (power-bit data−x)*y.

In some embodiments, y=1, x=2m−1.

In some embodiments, converting the neuron data into the power neuron data includes:

$$s_{out}=s_{in}$$

$$d_{out+}=\lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in} \times s_{in}$, $d_{out+}$ is a positive part of the output data with $d_{out+}+d_{out} \times s_{out}$, $\lfloor x \rfloor$ represents a flooring operation on the data x; or $$s_{out}=s_{in}$$

$$d_{out+}=\lceil \log_2(d_{in+}) \rceil$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in} \times s_{in}$, $d_{out+}$ is a positive part of the output data with $d_{out+}=d_{out} \times s_{out}$, $\lceil x \rceil$ represents a ceiling operation on the data x; or $$s_{out}=s_{in}$$

$$d_{out+}=[\log_2(d_{in+})]$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data $d_{in+}=d_{in} \times s_{in}$, $d_{out+}$ is a positive part of the output data with $d_{out+}=d_{out} \times s_{out}$, $[x]$ represents a rounding operation on the data x.

According to the other aspect of the present disclosure, provided is a neural network operation method, comprising:
executing a neural network operation; and
converting input neuron data of the neural network operation into power neuron data prior to the execution of the neural network operation; and/or converting output neuron data of the neural network operation into power neuron data after the execution of the neural network operation.

In some embodiments, the step of converting input neuron data of the neural network operation into power neuron data prior to the execution of the neural network operation includes:
converting non-power neuron data in the input data into the power neuron data; and
receiving and storing operational instructions, the power neuron data and weight data.

In some embodiments, between the step of receiving and storing operational instructions, the power neuron data and weight data and the step of executing a neural network operation, the method further comprises:
reading the operational instructions, and decoding them into respective operational microinstructions.

In some embodiments, in the step of executing a neural network operation, the weight data and the power neuron data are subjected to a neural network operation according to the operational microinstructions.

In some embodiments, the step of converting output neuron data of the neural network operation into power neuron data after the execution of the neural network operation includes:
outputting neuron data obtained from the neural network operation; and
converting non-power neuron data in the neuron data obtained from the neural network operation into the power neuron data.

In some embodiments, the non-power neuron data in the neuron data obtained from the neural network operation is converted into power neuron data which then is sent to the data control unit, as input power neurons of the next layer of the neural network operation; the step of the neural network operation and the step of converting the non-power neuron data into the power neuron data are repeated until the operation of the last layer of the neural network is finished.

In some embodiments, an integer x and a positive integer y are pre-stored in the storage module, where x denotes an offset value and y denotes a step length; a range of the power neuron data representable by the neural network operation device can be adjusted by changing the integer x and the positive integer y pre-stored in the storage module.

According to another aspect of the present disclosure, there is provided a method of using the neural network operation device, wherein a range of the power neuron data representable by the neural network operation device can be adjusted by changing the integer x and the positive integer y pre-stored in the storage module.

According to an aspect of the present disclosure, there is provided a neural network operation device, comprising:
an operation module for executing a neural network operation; and a power conversion module connected to the operation module for converting input data and/or output data of the neural network operation into power data.

In some embodiments, the input data includes input neuron data and input weight data; the output data includes output neuron data and output weight data; and the power data includes power neuron data and power weight data.

In some embodiments, the power conversion module includes:

a first power conversion unit for converting the output data of the operation module into power data; and a second power conversion unit for converting the input data of the operation module into power data.

In some embodiments, the operation module further includes a third power conversion unit for converting power data into non-power data.

In some embodiments, the neural network operation device further comprises:

a storage module for storing data and operational instructions;

a control module for controlling interactions of the data and the operational instructions, the control module is configured to receive the data and the operational instructions sent by the storage module and decode the operational instructions into operational microinstructions;

wherein the operation module includes an operation unit for receiving the data and the operational microinstructions sent by the control module, and performing the neural network operation on the received weight data and neuron data according to the operational microinstructions.

In some embodiments, the control module includes an operational instruction buffer unit, a decoding unit, an input neuron buffer unit, a weight buffer unit and a data control unit, wherein the operational instruction buffer unit is connected to the data control unit for receiving operational instructions sent by the data control unit;

the decoding unit is connected to the operational instruction buffer unit for reading operational instructions from the operational instruction buffer unit and decoding the operational instructions into operational microinstructions;

the input neuron buffer unit is connected to the data control unit for acquiring corresponding power neuron data from the data control unit;

the weight buffer unit is connected to the data control unit for acquiring corresponding power weight data from the data control unit;

the data control unit is connected to the storage module for implementing interactions of the data and the operational instructions between the storage module and the operational instruction buffer unit, the weight buffer unit as well as the input neuron buffer unit, respectively;

wherein the operation unit is connected to the decoding unit, the input neuron buffer unit and the weight buffer unit respectively, for receiving the operational microinstructions, the power neuron data and the power weight data, and performing corresponding neural network operations on the power neuron data and the power weight data received by the operation unit according to the operational microinstructions.

In some embodiments, the neural network operation device further comprises an output module including an output neuron buffer unit for receiving neuron data output from the operation module;

wherein the power conversion module includes:

a first power conversion unit connected to the output neuron buffer unit and the operation unit for converting the neuron data output from the output neuron buffer unit into the power neuron data and converting the weight data output from the operation unit into the power weight data; and a second power conversion unit connected to the storage module for converting the neuron data and the weight data input to the storage module into the power neuron data and the power weight data, respectively;

the operation module further comprises a third power conversion unit connected to the operation unit for converting the power neuron data and the power weight data into non-power neuron data and non-power weight data, respectively.

In some embodiments, the first power conversion unit is further connected to the data control unit for converting the neuron data and the weight data output from the operation module into the power neuron data and the power weight data respectively, and sending the power neuron data and the power weight data to the data control unit as input data of a next layer of neural network operation.

In some embodiments, the power neuron data includes sign bits used to indicate the sign of the power neuron data and power bits used to indicate power-bit data of the power neuron data; the sign bits include one or more bits of data, and the power bits include m bits of data, with m being a positive integer greater than 1;

the power weight data indicates that the value of the weight data is represented in the manner of its power exponent, wherein the power weight data includes sign bits used to represent the sign of the weight data by one or more bits, and power bits used to represent the power-bit data of the weight data by m bits, with m being a positive integer greater than 1.

In some embodiments, the neural network operation device further comprises a storage module pre-stored with an encoding table including the power-bit data and exponential values, the encoding table is used to acquire an exponential value corresponding to the data for each power bit according to the power-bit data of the power neuron data and the power weight data.

In some embodiments, the encoding table further includes one or more zero setting power-bit data, to which the corresponding power neuron data and power weight data are 0.

In some embodiments, the power neuron data and the power weight data corresponding to the maximum power bit data are 0, or the power neuron data and the power weight data corresponding to the minimum power bit data are 0.

In some embodiments, a correspondence in the encoding table is that the most significant bit of the power-bit data represents a zero setting bit, while the other m−1 bits of the power-bit data correspond to the exponential values.

In some embodiments, a correspondence in the encoding table is a positive correlation. The storage module is pre-stored with an integer x and a positive integer y, wherein the exponential value corresponding to the minimum power-bit data is x, where x denotes an offset value and y denotes a step length.

In some embodiments, the exponential value corresponding to the minimum power-bit data is x, the power neuron data and the power weight data corresponding to the maximum power-bit data are 0, and the exponential values corresponding to other power-bit data than the minimum and maximum power-bit data are (power-bit data+x)*y.

In some embodiments, y=1, x=−2m−1.

In some embodiments, a correspondence in the encoding table is a negative correlation. A storage module is pre-stored with an integer x and a positive integer y, wherein the exponential value corresponding to the maximum power-bit data is x, where x denotes an offset value and y denotes a step length.

In some embodiments, the exponential value corresponding to the maximum power-bit data is x, the power neuron data and the power weight data corresponding to the minimum power-bit data are 0, and the exponential values corresponding to other power-bit data than the minimum and maximum power-bit data are (power-bit data−x)*y.

In some embodiments, y=1, x=2m−1.

In some embodiments, converting the neuron data and the weight data respectively into the power neuron data and the power weight data includes:

$$s_{out} = s_{in}$$

$$d_{out+} = \lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, $\lfloor x \rfloor$ represents a flooring operation on the data x; or $$s_{out} = s_{in}$$

$$d_{out+} = \lceil \log_2(d_{in+}) \rceil$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, $\lceil x \rceil$ represents a ceiling operation on the data x; or $$s_{out} = s_{in}$$

$$d_{out+} = [\log_2(d_{in+})]$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, [x] represents a rounding operation on the data x.

According to the other aspect of the present disclosure, there is provided a neural network operation method, comprising:

executing a neural network operation; and converting input data of the neural network operation into power data prior to the execution of the neural network operation; and/or converting output data of the neural network operation into power data after the execution of the neural network operation.

In some embodiments, the input data includes input neuron data and input weight data, the output data includes output neuron data and output weight data, and the power data includes power neuron data and power weight data.

In some embodiments, the step of converting input data of the neural network operation into power data prior to the execution of the neural network operation includes:

converting non-power data in the input data into power data; and receiving and storing operational instructions and the power data.

In some embodiments, between the step of receiving and storing operational instructions and the power data and the step of executing a neural network operation, the method further comprises:

reading operational instructions, and decoding them into respective operational microinstructions.

In some embodiments, in the step of executing a neural network operation, the power weight data and the power neuron data are subjected to a neural network operation according to the operational microinstructions.

In some embodiments, the step of converting output data of the neural network operation into power data after the execution of the neural network operation includes:

outputting data obtained from the neural network operation; and converting non-power data in the data obtained from the neural network operation into power data.

In some embodiments, the non-power data in the data obtained from the neural network operation is converted into power data which then is sent to the data control unit, as input data of the next layer of the neural network operation; the step of the neural network operation and the step of converting the non-power data into the power data are repeated until the operation of the last layer of the neural network is finished.

In some embodiments, an integer x and a positive integer y are pre-stored in the storage module, where x denotes an offset value and y denotes a step length; a range of the power data representable by the neural network operation device can be adjusted by changing the integer x and the positive integer y pre-stored in the storage module.

According to another aspect of the present disclosure, there is provided a method of using the neural network operation device, wherein a range of the power data representable by the neural network operation device can be adjusted by changing the integer x and the positive integer y pre-stored in the storage module.

According to an aspect of the present disclosure, there is provided an operation device, comprising:

an operation control module for determining partitioning information;

an operation module for subjecting an operation matrix to a partitioning operation, a transpose operation and a merging operation according to the partitioning information, to obtain a transposed matrix for the operation matrix.

In some embodiments, the operation device further comprises:

an address storage module, for storing address information of the operation matrix; and a data storage module, for storing the operation matrix, and storing the transposed matrix after operations;

wherein the operation control module is used to extract the address information of the operation matrix from the address storage module, and analyze the address information of the operation matrix to obtain the partitioning information; the operation module is used to acquire the address information and the partitioning information of the operation matrix from the operation control module, extract the operation matrix from the data storage module according to the address information of the operation matrix, and subject the operation matrix to the partitioning operation, the transpose operation and the merging operation according to the partitioning information to obtain the transposed matrix for the operation matrix, as well as to feedback the transposed matrix for the operation matrix to the data storage module.

In some embodiments, the operation module includes a matrix partitioning unit, a matrix operation unit and a matrix merging unit, wherein, the matrix partitioning unit is used for acquiring the address information and the partitioning information of the operation matrix from the operation control module, extracting the operation matrix from the data storage module according to the address information of the operation matrix, and partitioning the operation matrix according to the partitioning information into n partitioned matrices;

the matrix operation unit is used for acquiring the n partitioned matrices, and subjecting the n partitioned matrices to a transpose operation to obtain transposed matrices for the n partitioned matrices;

the matrix merging unit is used for acquiring and merging the transposed matrices for the n partitioned matrices, to obtain the transposed matrix for the operation matrix, and returning the transposed matrix for the operation matrix to the data storage module, where n is a natural number.

In some embodiments, the operation module further includes a buffer unit for buffering the n partitioned matrices so as to be acquired by the matrix operation unit.

In some embodiments, the operation control module includes an instruction processing unit, an instruction buffer unit and a matrix determination unit, wherein, the instruction buffer unit is used for storing matrix operational instructions to be executed;

the instruction processing unit is used for acquiring matrix operational instructions from the instruction buffer unit, decoding the matrix operational instructions, and acquiring the address information of the operation matrix from the address storage module according to the decoded matrix operational instructions;

the matrix determination unit is used for analyzing the address information of the operation matrix to obtain the partitioning information.

In some embodiments, the operation control module further includes a dependency processing unit for determining whether the decoded matrix operational instructions and the address information of the operation matrix are conflict with a previous operation, if there is a conflict, the decoded matrix operational instructions and the address information of the operation matrix are temporarily stored; if there is no conflict, the decoded matrix operational instructions and the address information of the operation matrix are sent to the matrix determination unit.

In some embodiments, the operation control module further includes an instruction queue memory for buffering the decoded matrix operational instructions and the address information of operation matrix with conflict; when the conflict is eliminated, the decoded matrix operational instructions and the address information of operation matrix that are buffered are sent to the matrix determination unit.

In some embodiments, the instruction processing unit includes a fetching unit and a decoding unit, wherein, the fetching unit is used for acquiring the matrix operational instructions from the instruction buffer unit and transmitting the matrix operational instructions to the decoding unit;

the decoding unit is used for decoding the matrix operational instructions, extracting the address information of the operation matrix from the address storage module according to the decoded matrix operational instructions, and transmitting the decoded matrix operational instructions and the extracted address information of the operation matrix to the dependency processing unit.

In some embodiments, the device further comprises an input/output module for inputting the operation matrix data to the data storage module and acquiring the transposed matrix after operation from the data storage module, and outputting the transposed matrix after operation.

In some embodiments, the address storage module includes a scalar register file or a universal memory unit; the data storage module includes a cache or a universal memory unit; the address information of the operation matrix is initial address information of the matrix and matrix size information.

According to another aspect of the present disclosure, provided is an operation method, comprising the following steps:

determining partitioning information by an operation control module;

subjecting, by an operation module, an operation matrix to a partitioning operation, a transpose operation and a merging operation according to the partitioning information, to obtain a transposed matrix for the operation matrix.

In some embodiments, the step of determining partitioning information by an operation control module includes:

extracting address information of the operation matrix by the operation control module from an address storage module; and obtaining the partitioning information according to the address information of the operation matrix by the operation control module.

In some embodiments, the step of extracting address information of the operation matrix by the operation control module from an address storage module includes:

extracting operational instructions by a fetching unit and sending the operational instructions to a decoding unit;

decoding, by the decoding unit, the operational instructions, acquiring the address information of the operation matrix from the address storage module according to the decoded operational instructions, and sending the decoded operational instructions and the address information of the operation matrix to a dependency processing unit;

analyzing, by the dependency processing unit, whether the decoded operational instructions have a dependency in term of data with previous instructions that have not been completed; if there is a dependency, the decoded operational instructions and the corresponding address information of the operation matrix need to wait in an instruction queue memory until their dependency in term of data with the previous instructions that have not been completed no longer exists.

In some embodiments, the step of subjecting by an operation module an operation matrix to a partitioning operation, a transpose operation and a merging operation according to the partitioning information to obtain a transposed matrix for the operation matrix includes:

extracting, by the operation module, the operation matrix from the data storage module according to the address information of the operation matrix, and partitioning the operation matrix into n partitioned matrices according to the partitioning information;

performing, by the operation module, the transpose operations on the n partitioned matrices respectively to obtain transposed matrices for the n partitioned matrices; and merging, by the operation module, the transposed matrices for the n partitioned matrices to obtain a transposed matrix for the operation matrix and feedback the transposed matrix for the operation matrix to the data storage module;

wherein, n is a natural number.

In some embodiments, the step of merging by the operation module the transposed matrices for the n partitioned matrices to obtain a transposed matrix for the operation matrix and feedback the transposed matrix for the operation matrix to the data storage module includes:

receiving, by a matrix merging unit, the transposed matrix for each partitioned matrix, performing a matrix merging operation on all the partitions when the number of the received transposed matrices for the partitioned matrices reaches the total number, to obtain the transposed matrix for the operation matrix; and feeding back the transposed matrix to a designated address of the data storage module;

accessing, by an input/output module, the data storage module directly, and reading the transposed matrix for the operation matrix obtained by operation from the data storage module.

According to an aspect of the present disclosure, there is provided a data screening device, comprising:

a storage unit for storing data;

a register unit for storing data address in the storage unit;

a data screening module for acquiring the data address from the register unit, acquiring corresponding data from the storage unit according to the data address, and screening the acquired data to obtain a data screening result.

In some embodiments, the data screening module includes a data screening unit for screening the acquired data.

In some embodiments, the data screening module further includes: an I/O unit, an input data buffer unit and an output data buffer unit;

the I/O unit is configured to transfer the data stored in the storage unit to the input data buffer unit;

the input data buffer unit is configured to store the data transferred by the I/O unit;

the data screening unit is configured to take data transferred from the input data buffer unit as input data, screen the input data, and transfer output data to the output data buffer unit;

the output data buffer unit is configured to store the output data.

In some embodiments, the input data includes data to be screened and location information data, and the output data includes screened data, or screened data and relevant information thereof.

In some embodiments, the data to be screened is a vector or an array, the location information data is a binary code, a vector or an array; and the relevant information includes vector length, array size and occupied space.

In some embodiments, the data screening unit is configured to scan each component of the location information data; if the component is 0, the corresponding component of the data to be screened is deleted; if the component is 1, the corresponding component of the data to be screened is remained. Or, if the component is 1, the corresponding component of the data to be screened is deleted; if the component is 0, the corresponding component of the data to be screened is remained. After the scan, the screened data is obtained and output.

In some embodiments, the data screening module further includes a structural deformation unit, which is configured to deform the storage structure for the input data and/or output data.

According to the other aspect of the present disclosure, there is provided a method for data screening by the data screening device, comprising:

Step A: acquiring data address from a register unit by a data screening module;

Step B: acquiring corresponding data from a storage unit according to the data address; and Step C: screening the acquired data to obtain a data screening result.

In some embodiments, the Step A includes: acquiring the address of the data to be screened and the address of the location information data from the register unit by the data screening unit;

the Step B includes:

Sub-step B1: transmitting, by an I/O unit, the data to be screened and the location information data in the storage unit to an input data buffer unit;

Sub-step B2: transferring, by the input data buffer unit, the data to be screened and the location information data to the data screening unit;

the Step C includes: screening, by the data screening unit, the data to be screened according to the location information data and transferring the output data to an output data buffer unit.

In some embodiments, between the Sub-step B1 and the Sub-step B2, there is also:

determining whether or not to deform the storage structure; if yes, performing Sub-step B3; if not, performing Sub-step B2 directly;

Sub-step B3: transferring, by the input data buffer unit, the data to be screened to a structural deformation unit which is configured to deform the storage structure, and return the deformed data to be screened to the input data buffer unit; and then Sub-step B2 is performed.

According to an aspect of the present disclosure, there is provided a neural network processor, comprising: a memory, a cache and a heterogeneous core; wherein, the memory is used for storing data and instructions for a neural network operation;

the cache is connected to the memory via a memory bus;

the heterogeneous core is connected to the cache via a cache bus, for reading the data and instructions for the neural network operation through the cache to accomplish the neural network operation, returning the operation result to the cache, and controlling the cache so that the operation result is written back into the memory.

In some embodiments, the heterogeneous core includes:

multiple operation cores, which have at least two different kinds of operation cores for executing a neural network operation or a neural network layer operation; and one or more logic control cores, for determining to execute a neural network operation or a neural network layer operation by dedicated cores and/or generic cores in accordance with data of the neural network operation.

In some embodiments, the multiple operation cores include x generic cores and y dedicated cores, wherein the dedicated cores are dedicated to execute assigned neural network/neural network layer operations, and the generic cores are used to execute arbitrary neural network/neural network layer operations.

In some embodiments, the generic core is a cpu, and the dedicated core is a npu.

In some embodiments, the cache includes a shared cache and/or a non-shared cache, wherein one shared cache is correspondingly connected to at least two cores in the heterogeneous cores via the cache bus, and one non-shared cache is correspondingly connected to one of the heterogeneous cores via the cache bus.

In some embodiments, the logic control core is connected to the cache via the cache bus, is configured to read data of the neural network operation through the cache, and determine to execute a neural network operation and/or a neural network layer operation by taking the dedicated core and/or the generic core as a target core in accordance with the type and parameters for the neural network model in the data of the neural network operation.

In some embodiments, the logic control core sends a signal to the target core via a control bus directly, or via the cache, so as to control the target core to execute a neural network operation and/or a neural network layer operation.

According to the other aspect of the present disclosure, there is provided a neural network operation method, wherein the neural network operation is performed by the neural network processor; the method includes:

reading, by a logic control core in a heterogeneous core, data and instructions of the neural network operation from a memory through a cache; and determining, by the logic control core in the heterogeneous core, to execute a neural network operation and/or a neural network layer operation by dedicated cores and/or generic cores in accordance with the type and parameters for the neural network model in the data of the neural network operation.

In some embodiments, the step of determining by the logic control core in the heterogeneous core to execute a neural network layer operation by dedicated cores and/or generic cores in accordance with the type and parameters for the neural network model in the data of the neural network operation includes:

determining, by the logic control core in the heterogeneous core, whether or not there is an eligible dedicated core in accordance with the type and parameters for the neural network model in the data of the neural network operation;

if a dedicated core m is eligible, the dedicated core m is used as a target core; and the logic control core in the heterogeneous core sends a signal to the target core and sends the addresses corresponding to the data and instructions of the neural network operation to the target core;

acquiring, by the target core, the data and instructions of the neural network operation from the memory through a shared or non-shared cache according to the address, performing the neural network operation, and outputting the operation result to the memory through the shared or non-shared cache, thereby accomplishing the operation;

if there is no eligible dedicated core, the logic control core in the heterogeneous core sends a signal to a generic core, and sends the addresses corresponding to the data and the instructions of the neural network operation to the generic core;

acquiring, by the generic core, the data and the instructions of the neural network operation from the memory through a shared or non-shared cache according to the addresses, performing the neural network operation, and outputting the operation result to the memory through the shared or non-shared cache, thereby accomplishing the operation;

In some embodiments, the eligible dedicated core refers to a dedicated core that supports the assigned neural network operation and can accomplish the scale of the assigned neural network operation.

In some embodiments, the step determining by the logic control core in the heterogeneous core to execute a neural network operation by dedicated cores and/or generic cores in accordance with the type and parameters for the neural network model in the data of the neural network operation includes:

analyzing, by the logic control core in the heterogeneous core, the type and parameters for the neural network model in the data, determining for each neural network layer respectively whether an eligible dedicated core exists, and allocating a corresponding generic core or dedicated core for each neural network layer, to obtain a core sequence corresponding to the neural network layers;

sending, by the logic control core in the heterogeneous core, the addresses corresponding to the data and the instructions of the neural network layer operation to the dedicated core or generic core corresponding to the neural network layer, and sending the serial number of the next dedicated core or generic core in the core sequence to the dedicated core or generic core corresponding to the neural network layer;

reading, by the dedicated core and generic core corresponding to the neural network layer, the data and the instructions of the neural network layer operation from the addresses, performing a neural network layer operation, and sending operation results to an assigned address of the shared and/or non-shared cache;

controlling, by the logic control core, the shared and/or non-shared cache to write the operation results of the neural network layers back to the memory, thereby completing the operation.

In some embodiments, the eligible dedicated core refers to a dedicated core that supports the assigned neural network layer operation and can accomplish the scale of the assigned neural network layer operation.

In some embodiments, the neural network operation includes a pulse neural network operation; the neural network layer operation includes a convolution, a fully connected layer operation, a concatenation operation, a bitwise addition/multiplication, a Relu operation, a pooling operation and/or a Batch Norm operation on the neural network layer.

(III) Beneficial Effects

It can be learnt from the above technical solutions that the operation device and method according to the present disclosure have at least one of the following beneficial effects:

(1) By storing neuron data in the manner of power data representations, the storage space required for storing the network data can be reduced, and at the same time, such data representation simplifies the multiplication of neurons and weight data, reducing the design requirements for the operator, and speeding up the operation speed of the neural network.

(2) By converting neuron data obtained after the operation into power neuron data, the overhead on neural network storage resources and computing resources can be reduced, and being beneficial to the improvement of the operation speed of the neural network.

(3) Before being input to the neural network operation device, the non-power neuron data may be first subjected to a power conversion, and then input to the neural network operation device, which further reduces the overhead on neural network storage resources and computing resources and increases the operation speed of the neural network.

(4) The data screening device and method according to the present disclosure temporarily store the data and the instructions involved in the screening operation on a dedicated buffer, which can perform data screening operations on data of different storage structures and different sizes more efficiently.

(5) By using a heterogeneous core for the neural network operation, different cores can be selected for the operations according to the type and scale of the actual neural network, making the best use of the actual operational capacity of hardware, and reducing the cost and the power consumption.

(6) Different cores are subjected to operations of different layers, and operations of different layers are performed in parallel; this can take full advantage of the parallelism of the neural networks and increase the efficiency of the neural network operation.

BRIEF DESCRIPTION OF THE DRAWINGS

The drawings are intended to facilitate further understanding of the present disclosure and constitute a part of the specification, and, together with the embodiments below, serve to explain the present disclosure, rather than limit the present disclosure. In the drawings:

FIG. 1I is a diagram for an encoding table according to an embodiment of the present disclosure.

FIG. 1J is another diagram for an encoding table according to an embodiment of the present disclosure.

FIG. 1K is another diagram for an encoding table according to an embodiment of the present disclosure.

FIG. 1L is another diagram for an encoding table according to an embodiment of the present disclosure.

DETAILED DESCRIPTION

Figure 1A:
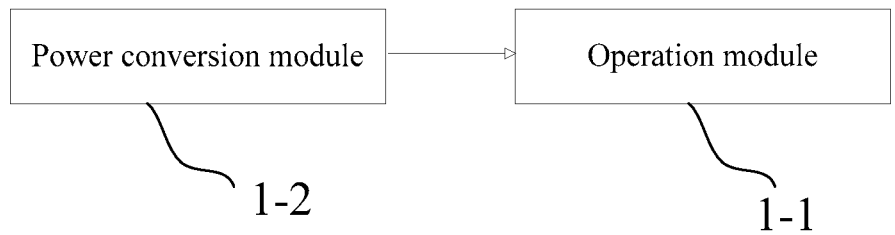
FIG. 1A is a structural diagram for a neural network operation device according to an embodiment of the present disclosure.

To facilitate the understanding of the object, technical solutions and advantages of the present disclosure, the present disclosure will be further described in detail below with reference to the specific embodiments and drawings.

It should be noted that in the drawings or the description of the specification, the similar reference numbers are used for similar or identical parts. Implementing modes not shown or described in the drawings are known to those of ordinary skill in the art. Additionally, although examples including parameters of specific values may be provided herein, it should be understood that the parameters are not necessarily exactly equal to the corresponding values, but may approximate the corresponding values within acceptable tolerances or design constraints. The directional terms mentioned in the embodiments, such as "upper", "lower", "front", "back", "left", "right", etc., only refer to the directions in the drawings. Therefore, the directional terms here are used to describe, rather than limit, the scope of protection of the present disclosure.

In one embodiment of the present disclosure, as shown in FIG. 1A, an operation device comprises: an operation module 1-1, for executing a neural network operation; and a power conversion module 1-2 connected to the operation module, for converting input neuron data and/or output neuron data of the neural network operation into power neuron data.

Figure 1B:
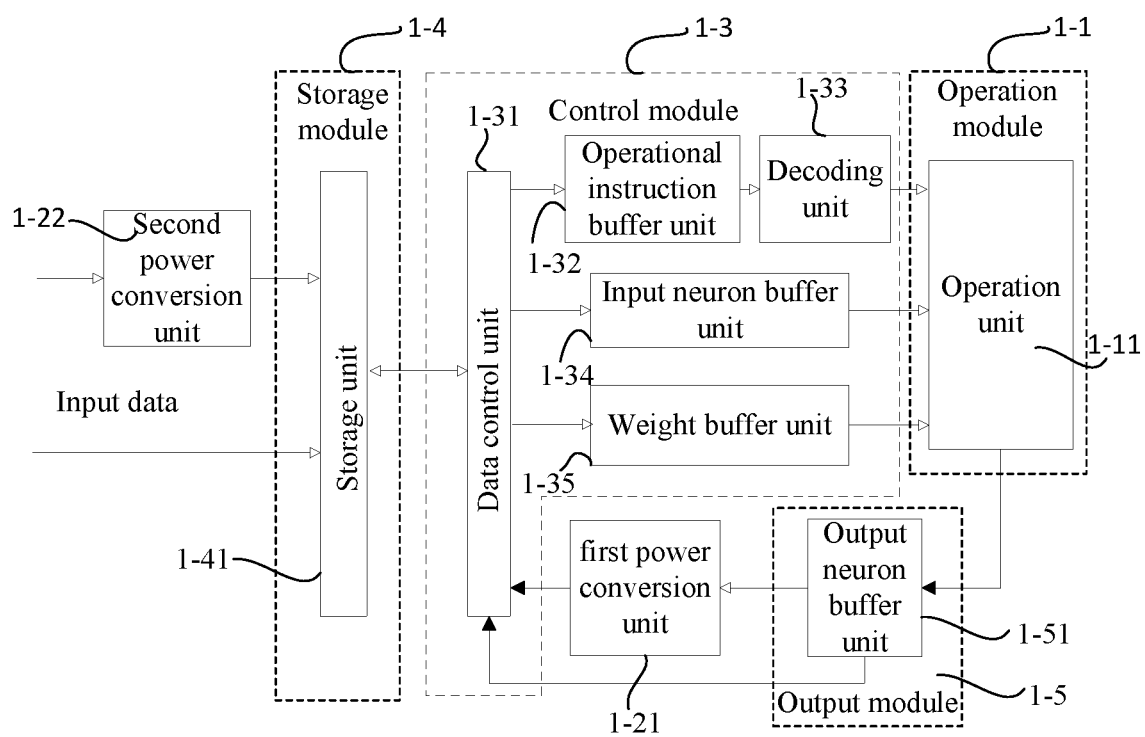
FIG. 1B is a structural diagram for a neural network operation device according to another embodiment of the present disclosure.

In the other embodiment, as shown in FIG. 1B, an operation device comprises:

a storage module 1-4, for storing data and operational instructions;

a control module 1-3 connected to the storage module for controlling interactions of the data and the operational instructions, the control module 1-3 is configured to receive the data and the operational instructions sent by the storage module and decode the operational instructions into operational microinstructions;

the operation module 1-1 is connected to the control module for receiving the data and the operational microinstructions sent by the control module, and performing the neural network operation on the received weight data and neuron data according to the operational microinstructions; and the power conversion module 1-2 connected to the operation module, for converting input neuron data and/or output neuron data of the neural network operation into power neuron data.

Those skilled in the art can understand that the storage module can be integrated in the operation device, or it can be disposed outside the operation device as an off-chip memory.

To be specific, further referring to FIG. 1B, the storage module comprises: a storage unit 1-41, for storing data and operational instructions.

The control module includes:

an operational instruction buffer unit 1-32 connected to the data control unit for receiving operational instructions sent by the data control unit;

a decoding unit 1-33 connected to the operational instruction buffer unit for reading operational instructions from the operational instruction buffer unit and decoding the operational instructions into operational microinstructions;

an input neuron buffer unit 1-34 connected to the data control unit for receiving neuron data sent by the data control unit;

a weight buffer unit 1-35 connected to the data control unit, for receiving weight data sent from the data control unit;

a data control unit 1-31 connected to the storage module for implementing interactions of the data and the operational instructions between the storage module and the operational instruction buffer unit, the weight buffer unit as well as the input neuron buffer unit, respectively.

The operation module includes: an operation unit 1-11 connected to the decoding unit, the input neuron buffer unit and the weight buffer unit respectively, for receiving the operational microinstructions, the neuron data and the weight data, and performing corresponding operations on the received neuron data and weight data according to the operational microinstructions.

In an optional embodiment, the operation unit includes, but not limited to: a first or more multipliers as a first part; one or more adders as a second part (more specifically, an adder tree formed by the adders of the second part), an activation function unit as a third part, and/or a vector processing unit as a fourth part. More specifically, the vector processing unit can process vector operations and/or pooling operations. The first part multiplies an input data 1 (in1) with an input data 2 (in2) to obtain the output (out) after multiplication, with the process: out=in1*in2; the second part adds the input data (in1) by the adders to obtain the output data (out). More specifically, when the second part is an adder tree, the input data (in1) is added step by step through the adder tree to obtain the output data (out); wherein in1 is a vector having a length of N, N>1, with the process: out=in1[1]+in1[2]+ . . . +in1[N]; and/or the input data (in1) is accumulated by the adder tree and then added with the input data (in2) to get the output data (out), with the process: out=in1[1]+in1[2]+ . . . +in1[N]+in2; or the input data (in1) is added with the input data (in2) to obtain the output data (out), with the process: out=in1+in2. The third part operates on the input data (in) with the activation function (active) to obtain the activation output data (out), with the process: out=active(in); wherein the activation function (active) can be sigmoid, tanh, relu, softmax and the like. In addition to the activation operation, the third part can implement other nonlinear functions. It is possible to obtain the output data (out) by subjecting the input data (in) to an operation (f), with the process: out=f(in). The vector processing unit obtains a pooled output data (out) by a pooling operation on the input data (in), with the process: out=pool(n), wherein the "pool" refers to a pooling operation. The pooling operation includes, but not limited to: average pooling, maximum pooling and median pooling; and the input data (in) is data in a pooling kernel associated with the output (out).

The execution of operation by the operation unit includes: a first part of multiplying the input data 1 with the input data 2 to obtain the multiplied data; and/or a second part of performing the additions (more specifically, the adder tree operations configured to add the input data 1 step by step through the adder tree), or adding the input data 1 with the input data 2 to obtain output data; and/or a third part of performing an activation function operation by applying an activation function (active) operation on the input data to obtain the output data; and/or a fourth part of performing a pooling operation with out=pool (in), where "pool" refers to a pooling operation. The pooling operation includes, but not limited to: average pooling, maximum pooling and median pooling; and the input data (in) is data in a pooling kernel associated with the output (out). In the operations of the above parts, one or more parts can be selected freely to make combinations in different orders, thereby achieving operations of different functions. Accordingly, computing units constitute architecture of two, three, or four flow-levels.

In another optional embodiment, the operation unit may include a main processing circuit and multiple secondary processing circuits.

The main processing circuit is used to partition one input data into multiple data partitions and sends at least one of the multiple data partitions and at least one of multiple operational instructions to the secondary processing circuits;

the multiple secondary processing circuits are used to execute operations on the received data partitions according to the operation instructions to obtain intermediate results, and to transmit the intermediate results to the main processing circuit;

the main processing circuit is used to process the intermediate results sent from the multiple secondary processing circuits to obtain results for the operational instructions, and send the results for the operational instructions to the data control unit.

Figure 1C:
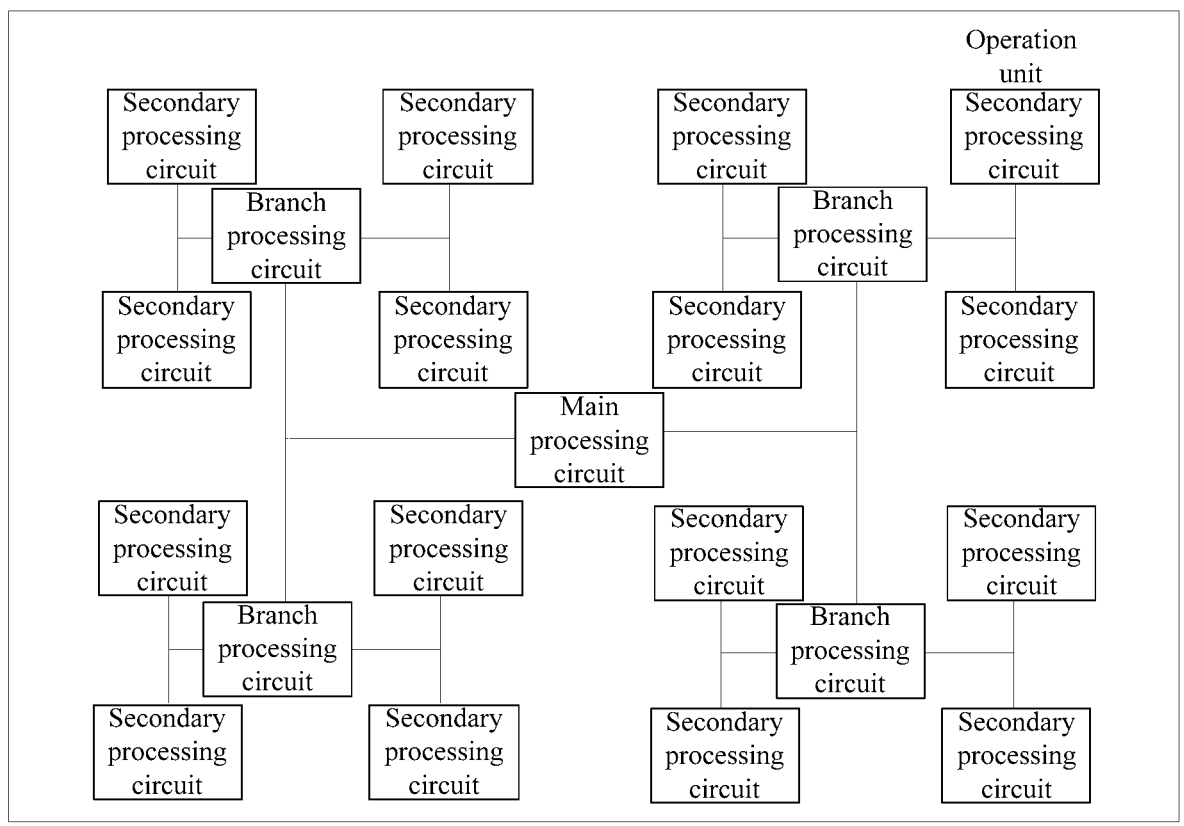
FIG. 1C is a functional diagram for an operation unit according to an embodiment of the present disclosure.

In an optional embodiment, an operation unit as shown in FIG. 1C can include branch processing circuits, wherein, the main processing circuit is connected to the branch processing circuits, while the branch processing circuits are connected to the multiple secondary processing circuits;

the branch processing circuits are used to transmit data or instructions between the main processing circuit and the secondary processing circuits.

Figure 1D:
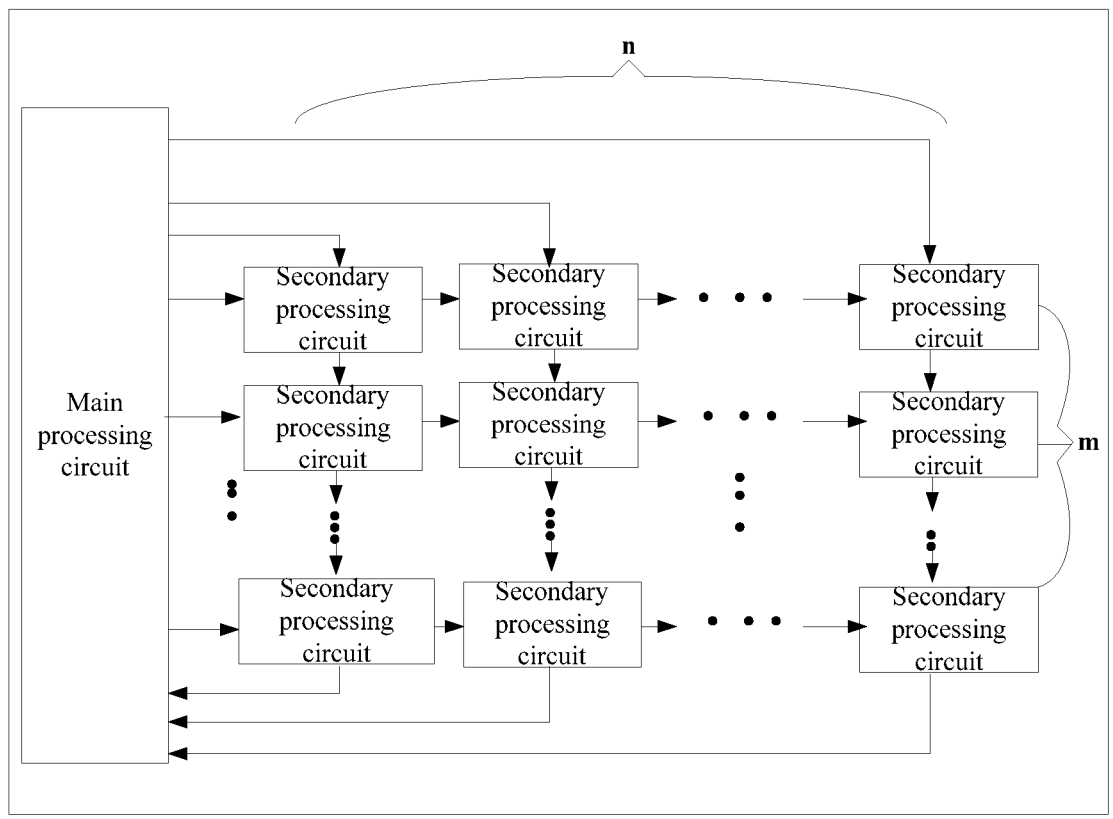
FIG. 1D is another functional diagram for an operation unit according to an embodiment of the present disclosure.

In another optional embodiment, an operation unit as shown in FIG. 1D can include a main processing circuit and multiple secondary processing circuits. Alternatively, the multiple secondary processing circuits are distributed in array; each secondary processing circuits is connected to other adjacent secondary processing circuits, and the main processing circuit is connected to k secondary processing circuits of the multiple secondary processing circuits, where the k fundamental circuits include: n secondary processing circuits in the first line, n secondary processing circuits in the m-th line and m secondary processing circuits in the first row.

The k secondary processing circuits are used to transmit data and instructions between the main processing circuit and the multiple secondary processing circuits.

Figure 1E:
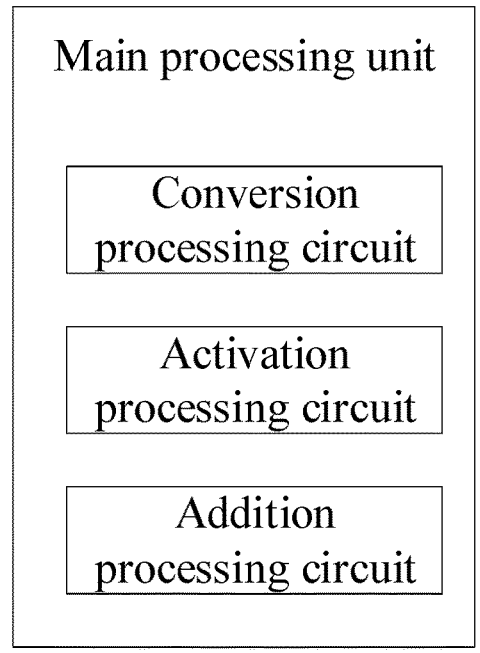
FIG. 1E is a functional diagram for a main processing circuit according to an embodiment of the present disclosure.

Alternatively, as shown in FIG. 1E, the main processing circuit may further include one of a conversion processing circuit, an activation processing circuit and an addition processing circuit, or any combination thereof;

the conversion processing circuit is used for conversion between a first data structure and a second data structure (e.g. conversion between continuous data and discrete data) on the data partitions or the intermediate results received by the main processing circuit; or for an conversion between a first data type and a second data type (e.g. conversion between a fixed point type and a floating point type) on the data partitions or the intermediate results received by the main processing circuit;

the activation processing circuit is used to execute an activation operation on the data in the main processing circuit;

the addition processing circuit is used to execute an addition or accumulation.

The secondary processing circuits include:

a multiplication processing circuit for executing a multiplication on the received data partitions to obtain a product result;

a forwarding processing circuit (optional) for forwarding the received data partitions or the product result;

an accumulation processing circuit for executing an accumulation on the product results to obtain the intermediate results.

In yet another optional embodiment, the operational instructions can be such operational instructions as matrix-matrix multiplication instructions, accumulation instructions, and activation instructions.

The output module 1-5 includes: an output neuron buffer unit 1-51 connected to the operation unit for receiving neuron data output by the operation unit.

The power conversion module includes:

a first power conversion unit 1-21 connected to the output neuron buffer unit, for converting the neuron data output by the output neuron buffer unit into power neuron data; and a second power conversion unit 1-22 connected to the storage module, for converting the neuron data input to the storage module into power neuron data; and directly storing the power neuron data in the neural network input data into the storage module.

If the neural network operation device utilizes an I/O module for data input/output, the first and second power conversion units can also be disposed between the I/O module and the operation module so as to convert the input neuron data and/or the output neuron data of the neural network operation into power neuron data.

Figure 1F:
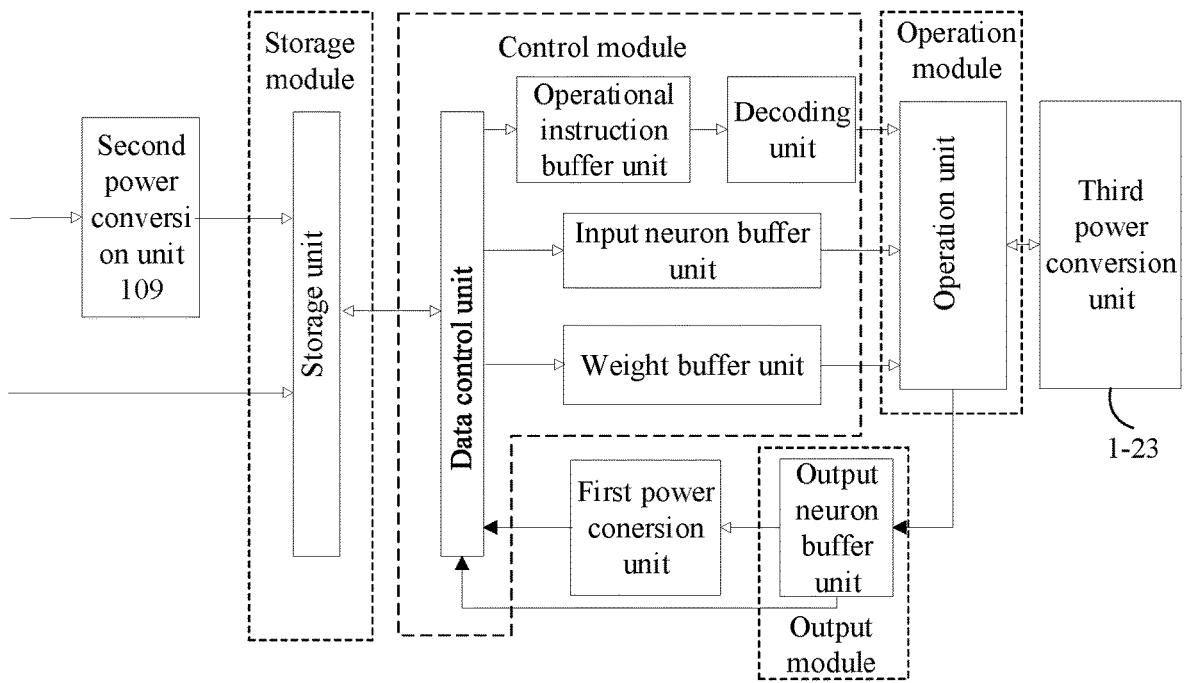
FIG. 1F is another structural diagram for a neural network operation device according to an embodiment of the present disclosure.
Figure 1G:
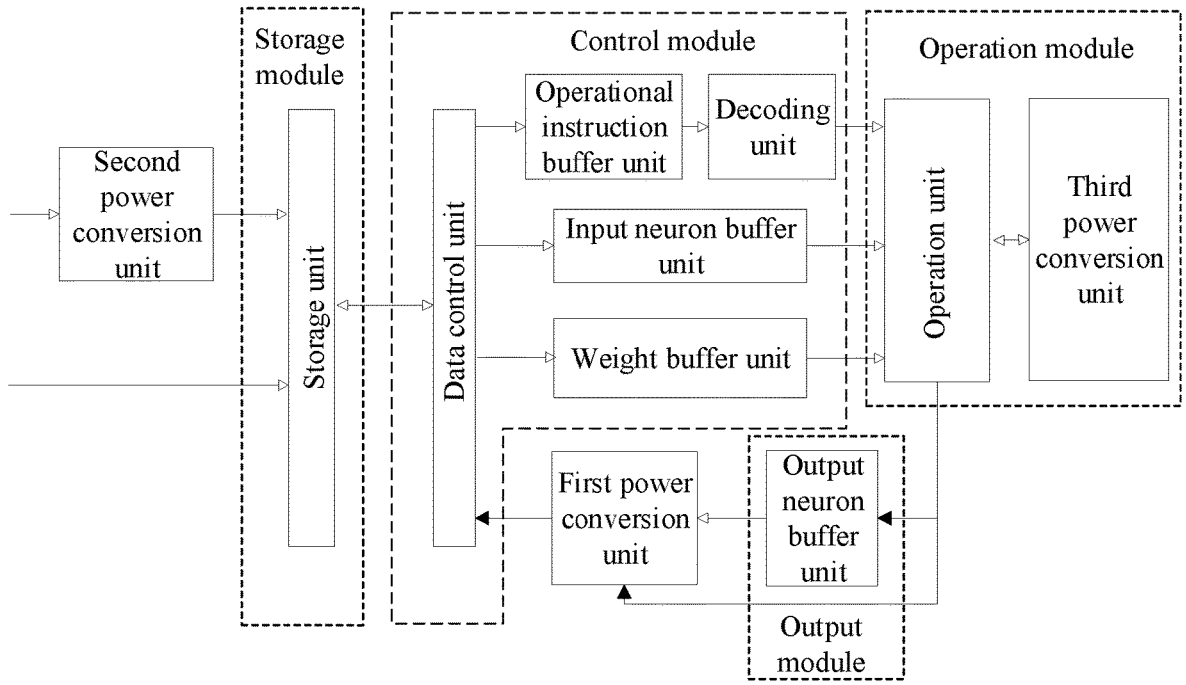
FIG. 1G is still another structural diagram for a neural network operation device according to an embodiment of the present disclosure.

Optionally, the operation module can comprise: a third power conversion unit 1-23, for converting the power neuron data into non-power neuron data. After converted into the power neuron data by the second power conversion unit, the non-power neuron data are input to the operation unit for operation. During operation, to increase precision a third power conversion unit may be optionally disposed for converting the power neuron data into the non-power neuron data. The third power conversion unit can be disposed either outside the operation module (as shown in FIG. 1F) or inside the operation module (as shown in FIG. 1G). The output non-power neuron data after the operation can be converted into the power neuron data by the first power conversion unit and then fed back to the data control unit for subsequent operations so as to increase the operation speed and forming a closed cycle.

Certainly, the data output by the operation module may also be directly sent to the output neuron buffer unit, and then to the data control unit by the output neuron buffer unit, without passing through the power conversion units.

Hereinto, the storage module can receive data and operational instructions from the external address spaces, and the data include neural network weight data, neural network input data and so on.

In addition, there are several options for power conversions. The following lists three power conversions used in the embodiment:

The first power conversion manner:

$$s_{out}=s_{in}$$

$$d_{out+}=\lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in}\times s_{in}$, $d_{out+}$ is a positive part of the output data with $d_{out+}=d_{out}\times s_{out}$, $\lfloor x \rfloor$ represents a flooring operation on the data x.

The second power conversion manner:

$$s_{out}=s_{in}$$

$$d_{out+}=\lceil \log_2(d_{in+}) \rceil$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in}\times s_{in}$, $d_{out+}$ is a positive part of the output data with $d_{out+}=d_{out}\times s_{out}$, $\lceil x \rceil$ represents a ceiling operation on the data x.

The third power conversion manner:

$$s_{out}=s_{in}$$

$$d_{out+}=[\log_2(d_{in+})]$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data $d_{in+}=d_{in}\times s_{in}$, $d_{out+}$ is a positive part of the output data with $d_{out+}=d_{out}\times s_{out}$, [x] represents a rounding operation on the data x.

It should be noted that, in addition to rounding, ceiling and flooring, the manners for power conversion of the present disclosure may also be fractional-event, fractional-odd, rounding towards zero, and random rounding. Among them, rounding, rounding towards zero and random rounding are preferred to reduce the loss of precision.

In addition, an embodiment of the present disclosure further provides a neural network operation method, comprising: executing a neural network operation; and converting input neuron data of the neural network operation into power neuron data prior to the execution of the neural network operation; and/or converting output neuron data of the neural network operation into power neuron data after the execution of the neural network operation Optionally, the step of the step of converting input neuron data of the neural network operation into power neuron data prior to the execution of the neural network operation comprises converting non-power neuron data in the input data into the power neuron data; and receiving and storing operational instructions, the power neuron data and weight data.

Optionally, between the step of receiving and storing operational instructions, the power neuron data and weight data and the step of executing a neural network operation, the method further comprises reading the operational instructions, and decoding them into respective operational microinstructions.

Optionally, in the step of executing a neural network operation, the weight data and the power neuron data are subjected to a neural network operation according to the operational microinstructions.

Optionally, the step of converting output neuron data of the neural network operation into power neuron data after the execution of the neural network operation includes: outputting neuron data obtained from the neural network operation; and converting non-power neuron data in the neuron data obtained from the neural network operation into the power neuron data.

Optionally, the non-power neuron data in the neuron data obtained from the neural network operation is converted into power neuron data which then is sent to the data control unit, as input power neurons of the next layer of the neural network operation; the step of the neural network operation and the step of converting the non-power neuron data into the power neuron data are repeated until the operation of the last layer of the neural network is finished.

Figure 1H:
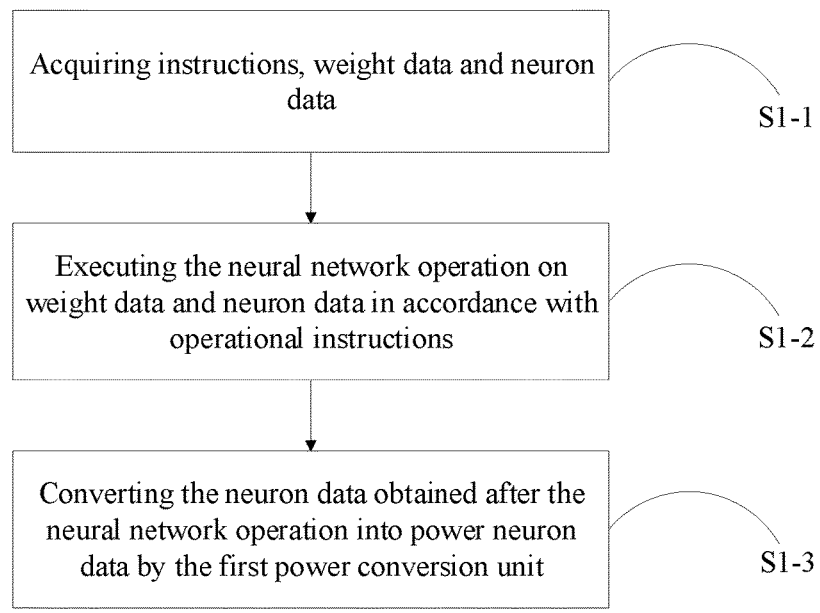
FIG. 1H is a flow chart of a neural network operation method according to an embodiment of the present disclosure.

To be specific, the neural network according an embodiment of the present disclosure is a multi-layer neural network. In some embodiments, for each layer of the neural network, operation can be performed according to the operation method as shown in FIG. 1H, wherein the input power neuron data for the first layer of the neural network can be read from the external address via the storage module; if the data read from the external address is power data already, it can be directly transmitted into the storage module; or otherwise, the data has to be converted into power data by the power conversion unit and then the input power neuron data of each layer of the neuron network can be provided by the output power neuron data of one or more layers of the neural networks prior to this layer. A mono-layer neural network operation method according to an embodiment is shown in FIG. 1H, comprising:

Step S1-1: acquiring operational instructions, weight data and neuron data.

Wherein, the Step S1-1 comprises the following substeps:

S1-11: inputting the operational instructions, the neuron data and the weight data to the storage module, wherein the power neuron data is directly input to the storage module, and the non-power neuron data is converted by the second power conversion unit and then input to the storage module;

S1-12: receiving, by the data control unit, the operational instructions, the power neuron data and the weight data sent by the storage module;

S1-13: receiving, by an operational instruction buffer unit, an input neuron buffer unit and a weight buffer unit respectively, the operational instructions, the power neuron data and the weight data sent by the data control unit and distributing them to the decoding unit or the operation unit.

The power neuron data indicates that values of neuron data are represented by exponential values thereof. Specifically, the power neuron data include sign bits and power bits; the sign bits represent the sign of the power neuron data with one or more bits, and the power bits represent power-bit data of the power neuron data with m bits, m being a positive integer greater than 1. The storage unit in the storage module is pre-stored with an encoding table that provides exponential values corresponding to each power-bit data of the power neuron data. The encoding table provides one or more power-bit data (i.e. zero setting power-bit data) to make the assigned corresponding power neuron data 0. In other words, when the power-bit data of the power neuron data is a zero setting power-bit data in the encoding table, the power neuron data is 0; wherein, the encoding table may be flexibly stored in the form of a table or a mapping by a function relationship.

The correspondence in the encoding table may be arbitrary.

For example, the correspondence in the encoding table may be scrambled. A part of an encoding table with m being 5 is shown in FIG. 1I, when the power-bit data is 00000, the corresponding exponential value is 0; when the power-bit data is 00001, the corresponding exponential value is 3; when the power-bit data is 00010, the corresponding exponential value is 4; when the power-bit data is 00011, the corresponding exponential value is 1; and when the power-bit data is 00100, the corresponding power neuron data is 0.

The correspondence in the encoding table may also be a positive correlation. The storage module is pre-stored with an integer x and a positive integer y; the exponential value corresponding to the minimum power-bit data is x and the power neuron data corresponding to any other one or more power-bit data is 0, wherein x denotes an offset value and y denotes a step length. In one embodiment, the exponential value corresponding to the minimum power-bit data is x, while the power neuron data corresponding to the maximum power-bit data is 0, and the exponential values corresponding to other power-bit data than the minimum and maximum power-bit data are (power-bit data+x)*y. By presetting different x and y as well as by changing the values of x and y, the range of representation by the power becomes configurable and is suitable for different application contexts requiring varied numerical ranges. Therefore, the neural network operation device can be applied in a wider range and its application is more flexible and changeable, being adjustable according to user requirements.

In one embodiment, y is 1, x equals −2m−1, so the exponential range of the value represented by power neuron data is −2m−1 to 2m−1−1.

In one embodiment, a part of an encoding table with m being 5, x being 0 and y being 1 is shown in FIG. 1J, when the power-bit data is 00000, the corresponding exponential value is 0; when the power-bit data is 00001, the corresponding exponential value is 1; when the power-bit data is 00010, the corresponding exponential value is 2; when the power-bit data is 00011, the corresponding exponential value is 3; and when the power-bit data is 11111, the corresponding power neuron data is 0. As another part of an encoding table as shown in FIG. 1K, with m being 5, x being 0 and y being 2, when the power-bit data is 00000, the corresponding exponential value is 0; when the power-bit data is 00001, the corresponding exponential value is 2; when the power-bit data is 00010, the corresponding exponential value is 4; when the power-bit data is 00011, the corresponding exponential value is 6; when the power-bit data is 11111, the corresponding power neuron data is 0.

The correspondence in the encoding table may be a negative correlation. The storage module is pre-stored with an integer x and a positive integer y; the exponential value corresponding to the maximum power-bit data is x and the power neuron data corresponding to any other one or more power-bit data is 0, wherein x denotes an offset value and y denotes a step length. In one embodiment, the exponential value corresponding to the maximum power-bit data is x, while the power neuron data corresponding to the minimum power-bit data is 0, and the exponential values corresponding to the other power-bit data than the minimum and maximum power-bit data are (power-bit data−x)*y. By presetting different x and y as well as by changing the values of x and y, a range of representation by the power becomes configurable and is suitable for different application contexts requiring varied numerical ranges. Therefore, the neural network operation device can be applied in a wider range and its application is more flexible and changeable, being adjustable according to user requirements.

In one embodiment, y is 1, x equals to 2m−1, so the exponential range of the value represented by power neuron data is −2m−1−1 to 2m−1.

As part of an encoding table as shown in FIG. 1L with m being 5, when the power-bit data is 11111, the corresponding exponential value is 0; when the power-bit data is 11110, the corresponding exponential value is 1; when the power-bit data is 11101, the corresponding exponential value is 2; when the power-bit data is 11100, the corresponding exponential value is 3; when the power-bit data is 00000, the corresponding power neuron data is 0.

The correspondence in the encoding table may be that the most significant bit of the power-bit data represents a zero setting bit, and the other m−1 bits of the power-bit data correspond to exponential values. When the most significant bit of the power-bit data is 0, the corresponding power neuron data is 0; when the most significant bit of the power-bit data is 1, the corresponding power neuron data is not 0. Vice versa, i.e. when the most significant bit of the power-bit data is 1, the corresponding power neuron data is 0; when the most significant bit of the power bit data is 0, the corresponding power neuron data is not 0. In other words, one bit is separated from the power bits of the power neuron data to indicate whether the power neuron data is 0 or not.

Figure 1M:
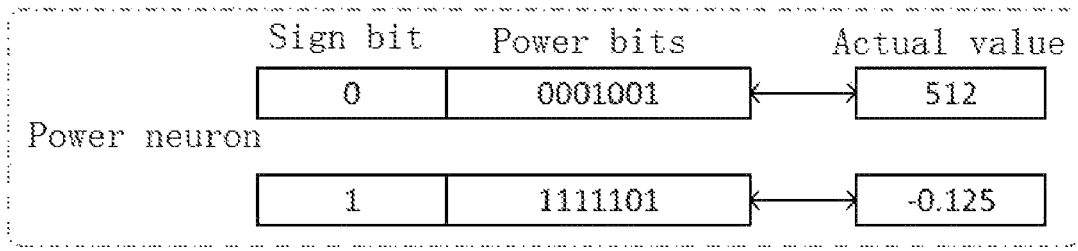
FIG. 1M is a diagram for a representation of power data according to an embodiment of the present disclosure.

In one specific example as shown in FIG. 1M, the sign bit has 1 bit, and the power-bit data has 7 bits, i.e. m is 7. In the encoding table, when the power-bit data is 11111111, the corresponding power neuron data is 0, and when the power-bit data is of other values, the power neuron data corresponds to a respective binary complement. When the sign bit of a power neuron data is 0 and the power bits are 0001001, it represents a specific value of 29, i.e. 512; when the sign bit of a power neuron data is 1 and its power bits are 1111101, it represents a specific value of −2−3, i.e. −0.125. Compared with floating point data, the power data only retains the power bits of the data, which significantly reduces the storage space required for data storage.

The power data representation can reduce the storage space required for storing neuron data. In examples of the embodiments, the power data have 8 bits. It should be recognized that the data length is not constant, but on different occasions, different data lengths are adopted according to the range of the neuron data.

Step S1-2: subjecting the weight data and the neuron data to the neural network operation in accordance with the operational microinstructions, wherein the Step S1-2 comprises the following sub-steps:

S1-21: reading, by the decoding unit, operational instructions from the operational instruction buffer unit, and decoding the operational instructions into respective operational microinstructions;

S1-22: receiving, by the operation unit, the operational microinstructions, the power neuron data and the weight data sent by the decoding unit, the input neuron buffer unit and the weight buffer unit respectively, and executing the neural network operation on the weight data and the power neuron data according to the operational microinstructions.

The multiplication of a power neuron and a weight is specifically as follows: the sign bit of the power neuron data and the sign bit of the weight data are subjected to an XOR operation; in the case where the correspondence in the encoding table is scrambled, search the encoding table to find out an exponential value corresponding to the power-bits of the power neuron data; in the case where the correspondence in the encoding table is a positive correlation, the minimum exponential value in the encoding table is recorded and an addition is performed to find out an exponential value corresponding to the power bits of the power neuron data; in the case where the correspondence in the encoding table is a negative correlation, the maximum value in the encoding table is recorded and a subtraction is performed to find out an exponential value corresponding to the power bits of the power neuron data; the exponential value and the power bits of the weight data are added and the significant bits of the weight data remain unchanged.

Figure 1N:
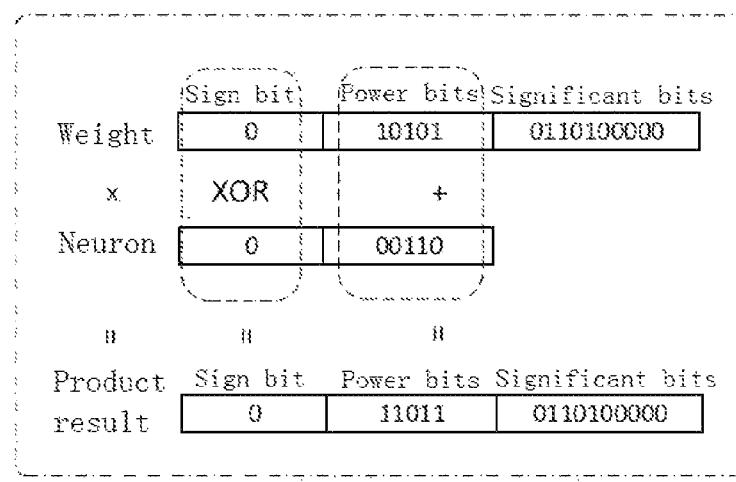
FIG. 1N is a diagram for a multiplication of a weight and a power neuron according to an embodiment of the present disclosure.

A specific example I is shown in FIG. 1N. If the weight data is 16-bit floating point data, with the sign bit being 0, the power bits being 10101, and the significant bits being 0110100000, the actual value represented is 1.40625*26. The sign bit of a power neuron data is 1-bit, and the power bits is 5-bit, that is, m is 5. In the encoding table, when the power-bit data is 11111, the corresponding power neuron data is 0, and when the power-bit data is of other values, the power data corresponds to a respective binary complement. When the power neuron is 000110, the actual value represented is 64, which is 26. The power bits of the weight and the power bits of the power neuron are added to get 11011, and the actual value of the result is 1.40625*212, which is the product result of the neuron and the weight. By this operation, the multiplication becomes an addition, which reduces the amount of operation required for the calculations.

Figure 1O:
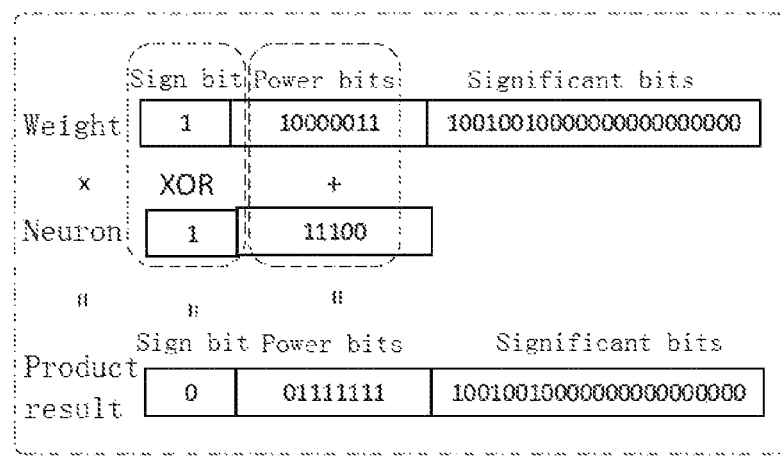
FIG. 1O is a diagram for a multiplication of a weight and a power neuron according to an embodiment of the present disclosure.

A specific example II is shown in FIG. 1O. If the weight data is 32-bit floating point data, with the sign bit being 1, the power bits being 10000011, and the significant bits being 10010010000000000000000, the actual value represented is −1.5703125*24. The sign bit of the power neuron data is 1-bit, and the power-bits data is 5-bit, that is, m is 5. In the encoding table, when the power-bit data is 11111, the corresponding power neuron data is 0, and when the power-bit data is of other values, the power data corresponds to a respective binary complement. If the power neuron is 111100, the actual value represented is −2−4. If adding the power bits of the weight with the power bits of the power neuron results in 01111111, the actual value of the result is 1.5703125*20, which is the product result of the neuron and the weight.

Step S1-3: the first power conversion unit converts the neuron data obtained after the neural network operation into power neuron data.

Wherein the Step S1-3 comprises the following sub-steps:

S1-31: receiving, by the output neuron buffer unit, the neuron data sent by the operation unit after the neural network operation;

S1-32: receiving, by the first power conversion unit, the neuron data sent by the output neuron buffer unit, and converting non-power neuron data therein into power neuron data.

Wherein, there are a variety of optional power conversion operations, which are selected according to actual application requirements. In this embodiment, three power conversion operations are listed as follows:

The first power conversion manner:

$$s_{out} = s_{in}$$

$$d_{out+} = \lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, $\lfloor x \rfloor$ represents a flooring operation on the data x.

The second power conversion manner:

$$s_{out} = s_{in}$$

$$d_{out+} = \lceil \log_2(d_{in+}) \rceil$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, $\lceil x \rceil$ represents a ceiling operation on the data x.

The third power conversion manner:

$$s_{out} = s_{in}$$

$$d_{out+} = [\log_2(d_{in+})]$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data $d_{in+} = d_{in} \times s_{in}$, $d_{out+}$ is a positive part of the output data with $d_{out+} = d_{out} \times s_{out}$, $[x]$ represents a rounding operation on the data x.

Additionally, the power neuron data obtained by the power conversion unit can serve as the input power neurons for the next layer of the neural network operation, and Steps 1 to 3 are repeated until the operation of the last layer of the neural network is finished. By changing the integer x and the positive integer y pre-stored in the storage module, the range of power neuron data that can be representable by the neural network operation device can be adjustable.

In another embodiment, the present disclosure further provides a method of using the neural network operation device, wherein the range of power neuron data that can be representable by the neural network operation device can be adjustable by changing the integer x and the positive integer y pre-stored in the storage module.

In other embodiments of the present disclosure, being different from the preceding embodiments, the power conversion module of the operation device is connected to the operation module for converting the input data and/or the output data of the neural network operation into the power data.

To be specific, the input data includes input neuron data and input weight data; the output data includes output neuron data and output weight data; and the power data includes power neuron data and power weight data.

In other words, on the basis of the aforementioned embodiments, in addition to the power conversion on the neuron data, the power conversion module here can further perform a power conversion on the weight data. Besides, after converted into power weight data, the weight data in the operation results can be directly sent to the data control unit for the subsequent operations. The remaining modules, units, functions and applications of the operation device as well as the connection relationships thereof are similar to those in the preceding embodiments.

Figure 2A:
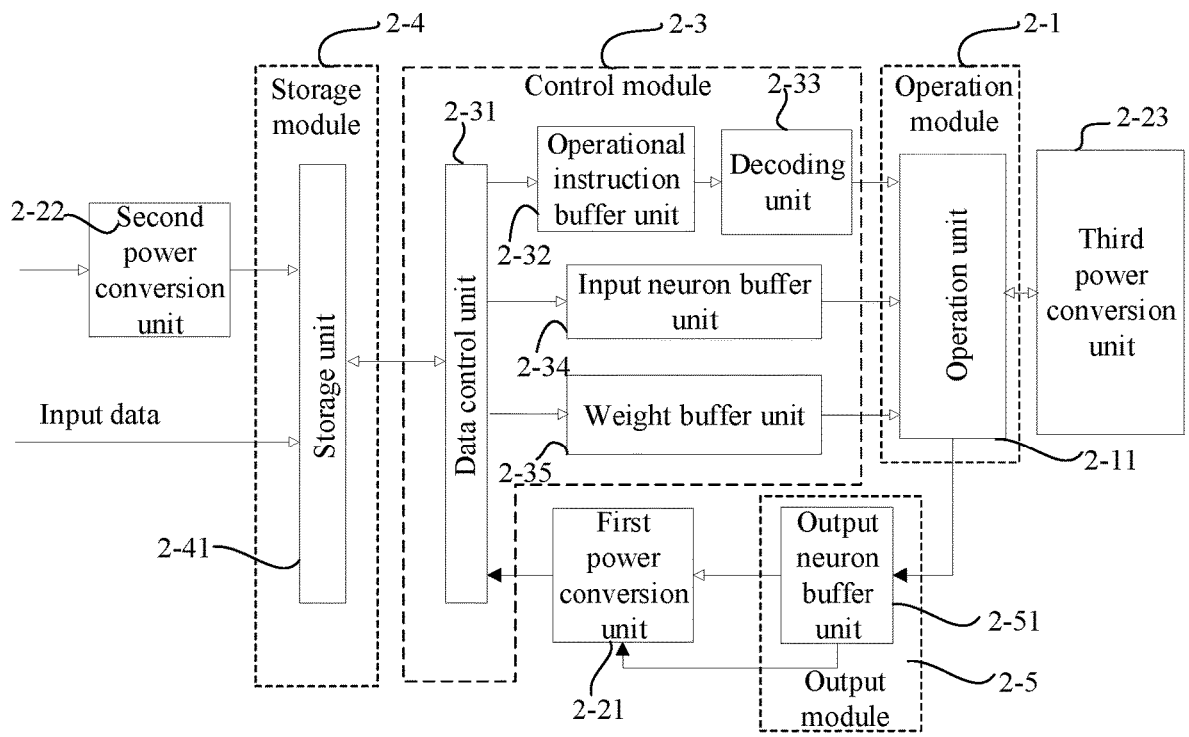
FIG. 2A is a structural diagram for a neural network operation device according to an embodiment of the present disclosure.

As shown in FIG. 2A, the neural network operation device of this embodiment comprises a storage module 2-4, a control module 2-3, an operation module 2-1, an output module 2-5 and a power conversion module 2-2.

The storage module includes a storage unit 2-41, for storing data and instructions;

the control module includes:

a data control unit 2-31 connected to the storage unit, for the interactions of the data and the instructions between the storage unit and the buffer units;

an operational instruction buffer unit 2-32 connected to the data control unit for receiving instructions sent by the data control unit;

a decoding unit 2-33 connected to the operational instruction buffer unit for reading instructions from the operational instruction buffer unit and decoding the instructions into operational instructions;

an input neuron buffer unit 2-34 connected to the data control unit for receiving neuron data sent from the data control unit;

a weight buffer unit 2-35 connected to the data control unit for receiving weight data sent from the data control unit.

The operation module includes: an operation unit 2-11 connected to a control module for receiving data and operational instructions sent by this control module, and executing a neural network operation on the received neuron data and weight data according to the operational instructions;

the output module includes: an output neuron buffer unit 2-51 connected to the operation unit for receiving neuron data output by the operation unit; and sending them to the data control unit, as input data of a next layer of the neural network operation;

the power conversion module can include:

a first power conversion unit 2-21 connected to the output neuron buffer unit and the operation unit for converting the neuron data output from the output neuron buffer unit into the power neuron data and converting the weight data output from the operation unit into the power weight data; and/or a second power conversion unit 2-22 connected to the storage module, for converting the neuron data and the weight data input to the storage module into the power neuron data and the power weight data, respectively;

optionally, the operation device further includes: a third power conversion unit 2-23 connected to the operation unit, for converting the power neuron data and the power weight data into non-power neuron data and non-power weight data, respectively.

It should be noted that explanation is made here only by an example in which the power conversion module includes the first power conversion unit, the second power conversion unit and the third power conversion unit at the same time, but in fact, the power conversion module can include any of the first power conversion unit, the second power conversion unit and the third power conversion unit, like the embodiments shown in the FIGS. 1B, 1F and 1G.

After converted into the power neuron data and the power weight data via the second power conversion unit, the non-power neuron data and the non-power weight data are input to the operation unit for operation; and during the operation, to increase precision, the third power conversion unit may be disposed for converting the power neuron data and the power weight data into the non-power neuron data and the non-power weight data, where the third power conversion unit can be disposed outside the operation module or inside the operation module; the output non-power neuron data after operation can be converted into power neuron data through the first power conversion unit and then fed back to the data control unit for the subsequent operations, so as to increase the operation speed, thereby forming a closed cycle.

Furthermore, the specific operations of the power conversion on the weight data are the same as that in the preceding embodiments, and will not be repeated here.

Figure 2B:
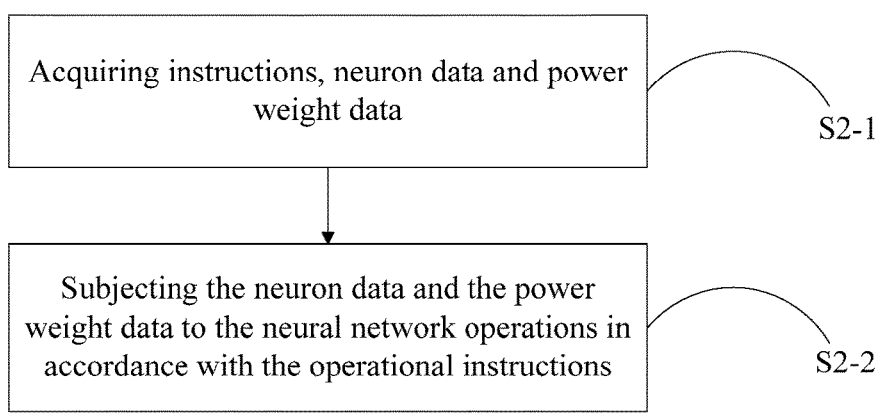
FIG. 2B is a flow chart of a neural network operation method according to an embodiment of the present disclosure.

In some embodiments, the neural network is a multi-layer neural networks; for each layer of the neural network, operation can be performed according to the operation method as shown in FIG. 2B, wherein the input power weight data for the first layer of the neural network can be read from the external address via the storage unit; if the weight data read from the external address is power weight data already, it can be directly transmitted into the storage unit; or otherwise, the weight data has to be converted into the power weight data by the power conversion unit first. A mono-layer neural network operation method according to an embodiment is shown in FIG. 1B, comprising:

Step S2-1: acquiring instructions, neuron data and power weight data.

Wherein, the Step S2-1 comprises the following sub-steps:

S2-11: inputting the instructions, the neuron data and the weight data to the storage unit, wherein the power weight data is directly input to the storage unit, and the non-power weight data is converted by the power conversion unit and then input to the storage unit;

S2-12: receiving, by the data control unit, the instructions, the neuron data and the power weight data sent by the storage unit;

S2-13: receiving, by the instruction buffer unit, the input neuron buffer unit and the weight buffer unit respectively, the instructions, neuron data and power weight data sent by the data control unit and distribute them to the decoding unit or the operation unit.

The power neuron data indicates that values of weight data are represented by exponential values thereof. Specifically, the power weight data include sign bits and power bits; the sign bits represent the sign of the weight data with one or more bits, and the power bits represent power-bit data of the weight data with m bits, m being a positive integer greater than 1. The storage unit is pre-stored with an encoding table that provides exponential values corresponding to each power-bit data of the power neuron data. The encoding table provides one or more power-bit data (i.e. zero setting power-bit data) to make the assigned corresponding power weight data 0. In other words, when the power-bit data of the power weight data is a zero setting power-bit data in the encoding table, the power weight data is 0; wherein. The correspondence in the encoding table is similar to that in the aforementioned embodiments, and will not be repeated here.

Figure 2C:
FIG. 2C is a diagram for a representation of power data according to an embodiment of the present disclosure.

In one specific example as shown in FIG. 2C, the sign bit has 1 bit, and the power-bit data has 7 bits, i.e. m is 7. In the encoding table, when the power-bit data is 11111111, the corresponding power weight data is 0, and when the power-bit data is of other values, the power weight data corresponds to a respective binary complement. When the sign bit of a power weight data is 0 and its power bits are 0001001, it represents a specific value of 29, i.e. 512; when the sign bit of the power weight data is 1 and its power bits are 1111101, it represents a specific value of −2−3, i.e. −0.125. Compared with floating point data, the power data only retains the power bits of the data, which significantly reduces the storage space required for data storage.

The power data representation can reduce the storage space required for storing the weight data. In examples of the embodiment, the power data have 8 bits. It should be recognized that this data length is not constant, and on different occasions, but on different occasions, different data lengths are adopted according to the range of the weight data.

Step S2-2: subjecting the neuron data and the power weight data to the neural network operation in accordance with the operational instructions, wherein the Step S2-2 comprises the following sub-steps:

S2-21: reading, by the decoding unit, instructions from an instruction buffer unit, and decoding the instructions into respective operational instructions;

S2-22: receiving, by the operation unit, the operational instructions, the power weight data and the neuron data sent by the decoding unit, the input neuron buffer unit and the weight buffer unit respectively, and executing the neural network operation on the neuron data and the power weight data according to the operational instructions.

The multiplication of a neuron and a power weight is specifically as follows: the sign bit of the neuron data and the sign bit of the power weight data are subjected to an XOR operation; in the case where the correspondence in the encoding table is scrambled, search the encoding table to find out an exponential value corresponding to the power bits of the power weight data; in the case where the correspondence in the encoding table is a positive correlation, the minimum exponential value in the encoding table is recorded and an addition is performed to find out an exponential value corresponding to the power bits of the power weight data; in the case where the correspondence in the encoding table is a negative correlation, the maximum value in the encoding table is recorded and a subtraction is performed to find out an exponential value corresponding to the power bits of the power weight data; the exponential value and the power bits of the neuron data are added and the significant bits of the neuron data remain unchanged.

Figure 2D:
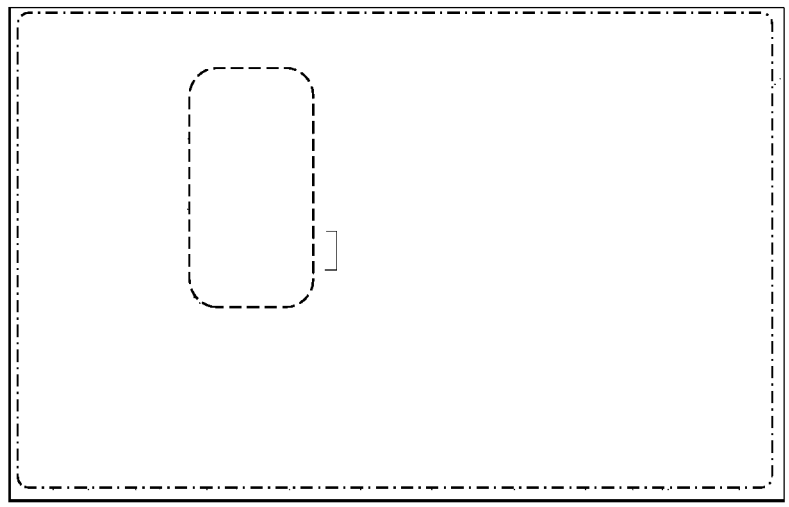
FIG. 2D is a diagram for a multiplication of a weight and a power neuron according to an embodiment of the present disclosure.

A specific example I is shown in FIG. 2D. If the neuron data is 16-bit floating point data, with the sign bit being 0, the power bits being 10101, and the significant bits being 0110100000, the actual value represented is 1.40625*26. The sign bit of a power weight data is 1-bit, and the power bits is 5-bit, that is, m is 5. In the encoding table, when the power-bit data is 11111, the corresponding power weight data is 0, and when the power-bit data is of other values, the power data corresponds to a respective binary complement. When the power weight is 000110, the actual value represented is 64, which is 26. The power bits of the power weight and the power bits of the neuron are added to get 11011, and the actual value of the result is 1.40625*212, which is the product result of the neuron and the power weight. By this operation, the multiplication becomes an addition, which reduces the amount of operation required for the calculations.

Figure 2E:
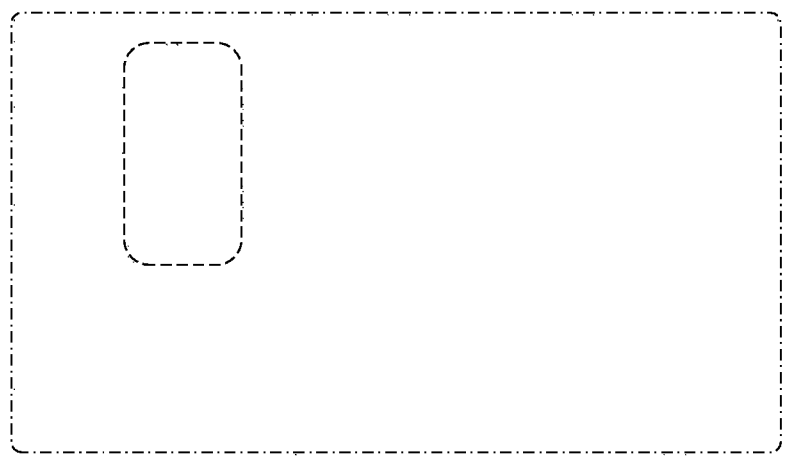
FIG. 2E is a diagram for a multiplication of a weight and a power neuron according to an embodiment of the present disclosure.

A specific example II is shown in FIG. 2E. If the neuron data is 32-bit floating point data, with the sign bit being 1, the power bits being 10000011, and the significant bits being 10010010000000000000000, the actual value represented is −1.5703125*24. The sign bit of the power weight data is 1-bit, and the power-bits data is 5-bit, that is, m is 5. In the encoding table, when the power-bit data is 11111, the corresponding power weight data is 0, and when the power-bit data is of other values, the power data corresponds to a respective binary complement. If the power neuron is 111100, the actual value represented is −2−4. If adding the power bits of the neuron with the power bits of the power weight results in 01111111, the actual value of the result is 1.5703125*20, which is the product result of the neuron and the power weight.

Optionally, Step S2-3 is further comprised, i.e. outputting the neuron data obtained after the neural network operation as the input data of the next layer of the neural network operation.

Wherein the Step S2-3 includes the following sub-steps:

S2-31: receiving, by the output neuron buffer unit, the neuron data sent by the operation unit after the neural network operation;

S2-32: transferring the neuron data received by the output neuron buffer unit to the data control unit; the neuron data obtained by the output neuron buffer unit can serve as the input neurons of the next layer of the neural network operation, and Steps S2-1 to S2-3 are repeated until the operation of the last layer of the neural network is finished.

In addition, the power neuron data obtained by the power conversion unit can serve as the input power neurons for the next layer of the neural network operation, and Steps S2-1 to S2-3 are repeated until the operation of the last layer of the neural network is finished. A range of the power neuron data representable by the neural network operation device can be adjusted by changing the integer x and the positive integer y pre-stored in the storage module.

Figure 2F:
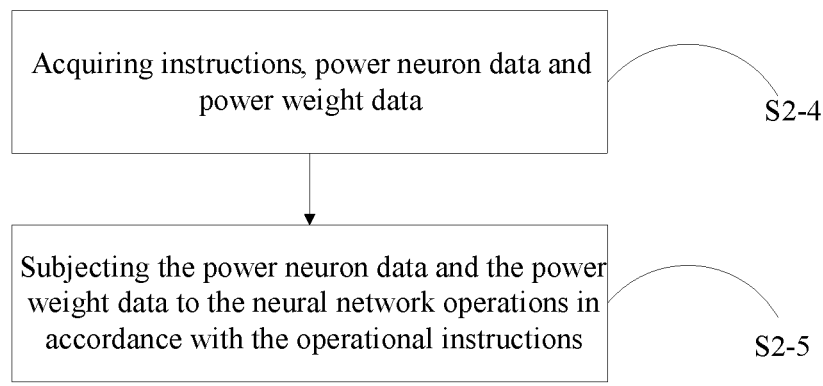
FIG. 2F is a flow chart of a neural network operation method according to an embodiment of the present disclosure.

In some embodiments, the neural network is a multi-layer neural network. For each layer of the neural network, operation can be performed according to the operation method as shown in FIG. 2F, wherein the input power weight data for the first layer of the neural network can be read from the external address via the storage unit; if the data read from the external address is power weight data already, it can be directly transmitted into the storage unit; or otherwise, the data has to be converted into power weight data by the power conversion unit. The input power neuron data for the first layer of the neuron network can be read from an external address by the storage unit, if the data read from the external address is power data already, it can be directly transmitted into the storage unit; or otherwise, the data has to be converted into power neuron data by the power conversion unit. The input neuron data of each subsequent layer of the neuron network can be provided by the output power neuron data of one or more layers of the neural network prior to this layer. A mono-layer neural network operation method according to an embodiment is shown in FIG. 2F, comprising:

Step S2-4: acquiring instructions, power neuron data and power weight data.

Wherein, the Step S2-4 comprises the following sub-steps:

S2-41: inputting the instructions, the neuron data and the weight data to the storage unit, wherein the power neuron data and the power weight data are directly input to the storage unit, and the non-power neuron data and the non-power weight data are converted by the first power conversion unit into the power neuron data and the power weight data, and then input to the storage unit;

S2-42: receiving, by the data control unit, the instructions, the power neuron data and the power weight data sent by the storage unit;

S2-43: receiving, by an instruction buffer unit, an input neuron buffer unit and a weight buffer unit respectively, the instructions, the power neuron data and the power weight data sent by the data control unit and distributing them to the decoding unit or the operation unit.

The power neuron data and the power weight data indicate that values of the neuron data and the weight data are represented by exponential values thereof. Specifically, both the power neuron data and the power weight data include sign bits and power bits; the sign bits represent the sign of the neuron data and the weight data with one or more bits, and the power bits represent power-bit data of the neuron data and the weight data with m bits, m being a positive integer greater than 1. The storage unit in the storage module is pre-stored with an encoding table that provides an exponential value corresponding to each power-bit data of the neuron data and the weight data. The encoding table provides one or more power-bit data (i.e. zero setting power-bit data) to make the assigned corresponding power neuron data and the assigned corresponding power weight data 0. In other words, when the power-bit data of the power neuron data and the power weight data are zero setting power-bit data in the encoding table, the power neuron data and the power weight data are 0.

Figure 2G:
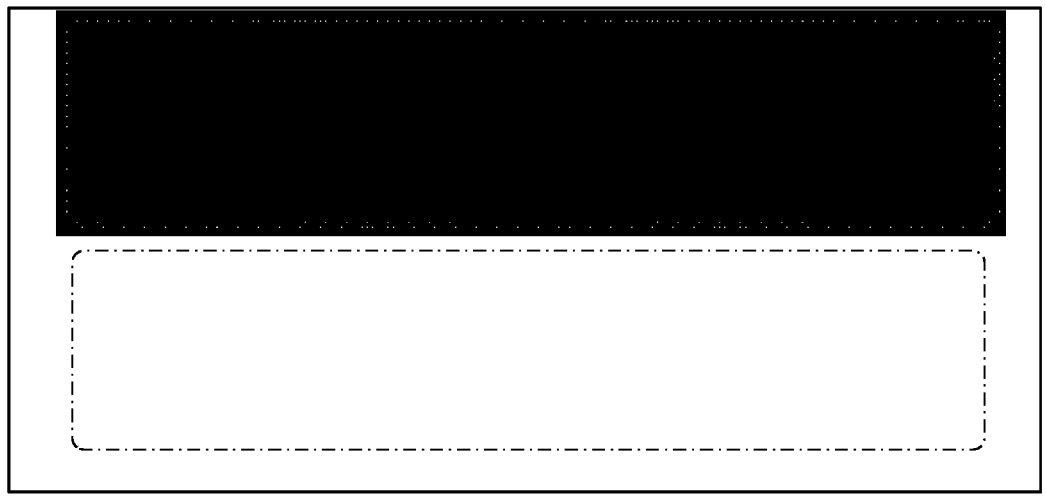
FIG. 2G is a diagram for a representation of power data according to an embodiment of the present disclosure.

In a specific embodiment, as shown in FIG. 2G, the sign bit has 1 bit, and the power-bit data have 7 bits, i.e. m is 7. In the encoding table, when the power-bit data is 11111111, the corresponding power neuron data and power weight data are 0, and when the power-bit data is of other values, the power neuron data and the power weight data correspond to respective binary complements. When the sign bit of the power neuron data and the power weight data are 0 and the power bits are 0001001, it represents a specific value of 29, i.e. 512; when the sign bit of the power neuron data and the power weight data is 1 and its power bits are 1111101, it represents a specific value of −2−3, i.e. −0.125. Compared with floating point data, the power data only retains the power bits of the data, which significantly reduces the storage space required for data storage.

The power data representation can reduce the storage space required for storing neuron data and weight data. In examples of the embodiments, the power data have 8 bits. It should be recognized that the data length is not constant, but on different occasions, different data lengths are adopted according to the range of the neuron data and the weight data.

Step S2-5: subjecting the power neuron data and the power weight data to the neural network operation in accordance with the operational instructions, wherein the Step S2-5 comprises the following sub-steps:

S2-51: reading, by the decoding unit, instructions from the instruction buffer unit, and decoding the instructions into respective operational instructions;

S2-52: receiving, by the operation unit, the operational instructions, the power neuron data and the power weight data sent by the decoding unit, the input neuron buffer unit and the weight buffer unit respectively, and executing the neural network operation on the power neuron data and the power weight data according to the operational instructions.

The multiplication of a power neuron and a power weight is specifically as follows: the sign bit of the power neuron data and the sign bit of the power weight data are subjected to an XOR operation; in the case where the correspondence in the encoding table is scrambled, search the encoding table to find out exponential values corresponding to the power bits of the power neuron data and that of the power weight data; in the case where the correspondence in the encoding table is a positive correlation, the minimum exponential value in the encoding table is recorded and an addition is performed to find out exponential values corresponding to the power bits of the power neuron data and that of the power weight data; in the case where the correspondence in the encoding table is a negative correlation, the maximum value in the encoding table is recorded and a subtraction is performed to find out exponential values corresponding to the power bits of the power neuron data and that of the power weight data; the exponential value corresponding to the power neuron data and that corresponding to the power weight data are added.

Figure 2H:
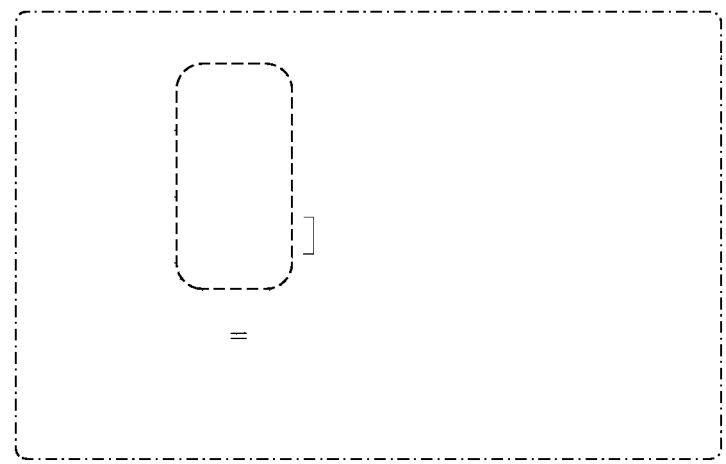
FIG. 2H is a diagram for a multiplication of a power neuron and a power weight according to an embodiment of the present disclosure.

A specific example I is shown in FIG. 2H. Sign bits of the power neuron data and the power weight data have 1 bit, and the power bits data have 4 bits, that is, m is 4. In the encoding table, when the power-bit data is 1111, the corresponding power weight data is 0; and when the power-bit data is of other values, the power data correspond to respective binary complements. If the power neuron data is 00010, the actual value represented is 22. If the power weight data is 00110, the actual value represented is 64, i.e. 26. If the product of the power neuron data and the power weight data is 01000, the actual value represented is 28.

It can be seen that the multiplication of the power neuron data and the power weight data is simpler than the multiplication of floating-point data as well as the multiplication of floating-point data and power data.

The method according to this embodiment can further comprises Step S2-6, i.e. outputting the neuron data obtained after the neural network operation as the input data of the next layer of the neural network operation.

Wherein the Step S2-6 comprises the following sub-steps:

S2-61: receiving, by the output neuron buffer unit, the neuron data sent by the operation unit after the neural network operation.

S2-62: transferring the neuron data received by the output neuron buffer unit to the data control unit; the neuron data obtained by the output neuron buffer unit can serve as the input neurons of the next layer of the neural network operation, and Steps S4 to S6 are repeated until the operation of the last layer of the neural network is finished.

Since the neuron data obtained after the neural network operation are also power data, the bandwidth required for transmitting them to the data control unit is significantly reduced in comparison with that required by floating-point data, the overhead on neural network storage resources and computing resources is further reduced, and the operation speed of neural networks is improved.

In addition, the specific operations of the power conversion are the same as that in the preceding embodiments, and will not be repeated here.

All the units in the disclosed embodiments can be hardware structures, and the physical implementation of the hardware structures includes but not limited to physical devices, which include but not limited to transistors, memristors and DNA computers.

In an embodiment of the present disclosure, there is provided an operation device, comprising:

an operation control module 3-2 for determining partitioning information; and an operation module 3-3 for subjecting an operation matrix to a partitioning operation, a transpose operation and a merging operation according to the partitioning information, to obtain a transposed matrix for the operation matrix.

To be specific, the partitioning information may contain at least one of a partition size information, a partition mode information and a partition merging information. Wherein, the partition size information indicates the size information of each obtained partitioned matrix after the operation matrix is partitioned. The partition mode information indicates the mode of partitioning on the operation matrix. The partitioning merging information indicates a method of merging to obtain a transposed matrix for the operation matrix after the transpose operations on the partitioned matrices.

The operation device according to the present disclosure can partition the operation matrix, obtain transposed matrices of a plurality of the partitioned matrices by performing transpose operations respectively on the plurality of partitioned matrices, and finally merge the transposed matrices of the plurality of the partitioned matrices to obtain the transposed matrix for the operation matrix, so that it is possible to finish a transpose operation of matrix of any size within constant time complexity by a single instruction. Compared with conventional methods of matrix transpose operation, the present disclosure makes the use of the matrix transposition operation simpler and more efficient while reducing the operation time complexity.

Figure 3A:
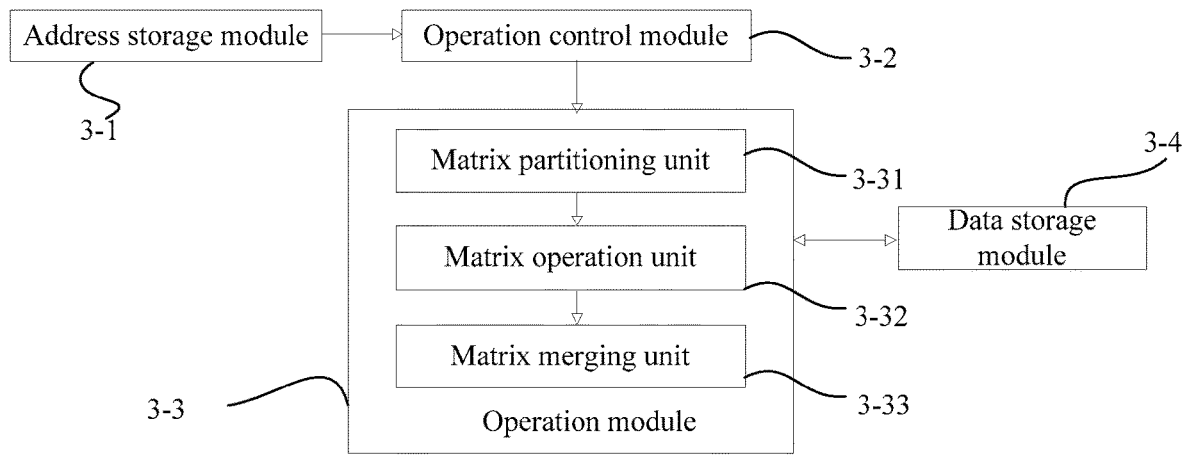
FIG. 3A is a structural diagram for an operation device proposed in the present disclosure.
Figure 3B:
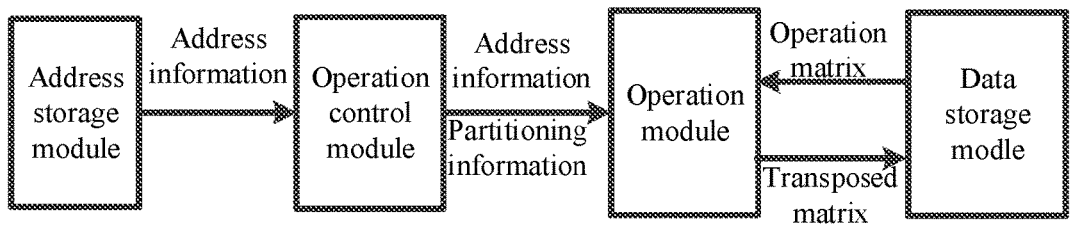
FIG. 3B is a diagram for information flow of an operation device proposed in the present disclosure.

As shown in FIGS. 3A to 3B, in some embodiments of the present disclosure, the operation device further comprises:

an address storage module 3-1, for storing address information of the operation matrix; and a data storage module 3-4, for storing initial matrix data including the operation matrix, and storing the transposed matrix after operations;

wherein, the operation control module is used to extract the address information of the operation matrix from the address storage module, and analyze the address information of the operation matrix to obtain the partitioning information; the operation module is used to acquire the address information and the partitioning information of the operation matrix from the operation control module, extract the operation matrix from the data storage module according to the address information of the operation matrix, and subject the operation matrix to the partitioning operation, the transpose operation and the merging operation according to the partitioning information to obtain the transposed matrix for the operation matrix, as well as to feedback the transposed matrix for the operation matrix to the data storage module.

Figure 3C:
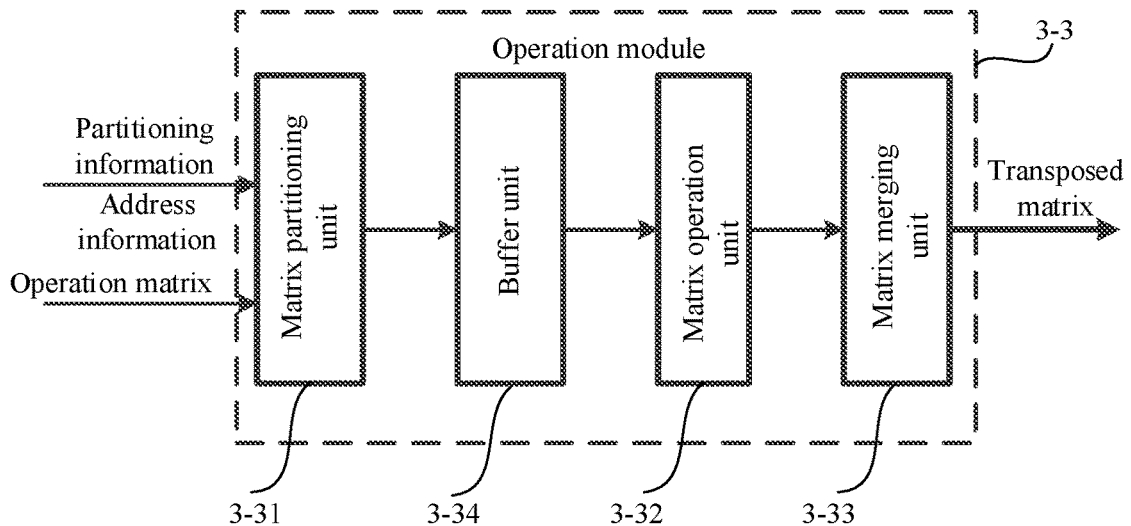
FIG. 3C is a structural diagram for an operation module in an operation device proposed in the present disclosure.

As shown in FIG. 3C, in some embodiments of the present disclosure, the above operation module includes a matrix partitioning unit, a matrix operation unit and a matrix merging unit, wherein, the matrix partitioning unit 3-31 is used for acquiring the address information and the partitioning information of the operation matrix from the operation control module, extracting the operation matrix from the data storage module according to the address information of the operation matrix, and partitioning the operation matrix according to the partitioning information into n partitioned matrices;

the matrix operation unit 3-32 is used for acquiring the n partitioned matrices, and subjecting the n partitioned matrices to a transpose operation to obtain transposed matrices for the n partitioned matrices;

the matrix merge unit 3-33, for acquiring and merging the transposed matrices of the n partitioned matrices to obtain transposed matrices of the operation matrices, where n is a natural number.

Figure 3D:
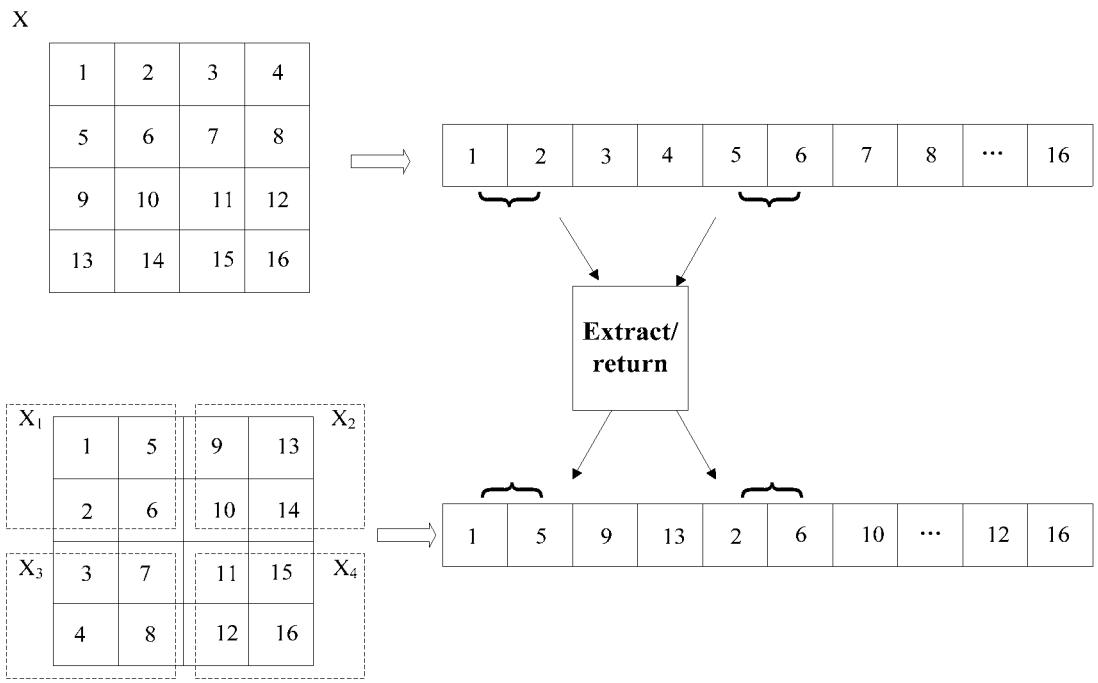
FIG. 3D is a diagram for a matrix operation by an operation module proposed in the present disclosure.

For example, as shown in FIG. 3D, for an operation matrix X stored in the data storage module, the matrix partitioning unit of the operation module extracts the operation matrix X from the data storage module, and performs the partitioning operation on the operation matrix X according to the partitioning information to obtain four partitioned matrices X1, X2, X3 and X4, and outputs them to the matrix operation unit; the matrix operation unit obtains these four partitioned matrices from the matrix partitioning unit, and performs transpose operations on the four partitioned matrices respectively to obtain the transposed matrices X1T, X2T, X3T and X4T of the four partitioned matrices, as well as outputs the transposed matrices to the matrix merging unit; the matrix merging unit obtains the transposed matrices of the four partitioned matrices from the matrix operation unit and merges them to the transposed matrix XT of the operation matrix; and the transposed matrix XT can be further output to the data storage module.

In some embodiments of the present disclosure, the above operation module further includes a buffer unit 3-34, for buffering the n partitioned matrices to be acquired by the matrix operation unit.

In some embodiments of the present disclosure, the above matrix merge unit may further include a memory, for temporarily storing the transposed matrices of the acquired partitioned matrices; after the matrix operation unit finishes the operations for all partitioned matrices, the matrix merging unit can acquire the transposed matrices of all the partitioning matrices, and then performs a merging operation on the transposed matrices of n partitioned matrices to obtain the transposed matrix and writes the output results back to the data storage module.

It should be understood by those skilled in the art that the aforementioned matrix partitioning unit, the matrix operation unit, and the matrix merging unit may be implemented in the forms of both hardware and software program modules. The matrix partitioning unit and the matrix merging unit may include one or more control elements, and the matrix operation unit may include one or more control elements and computing elements.

Figure 3E:
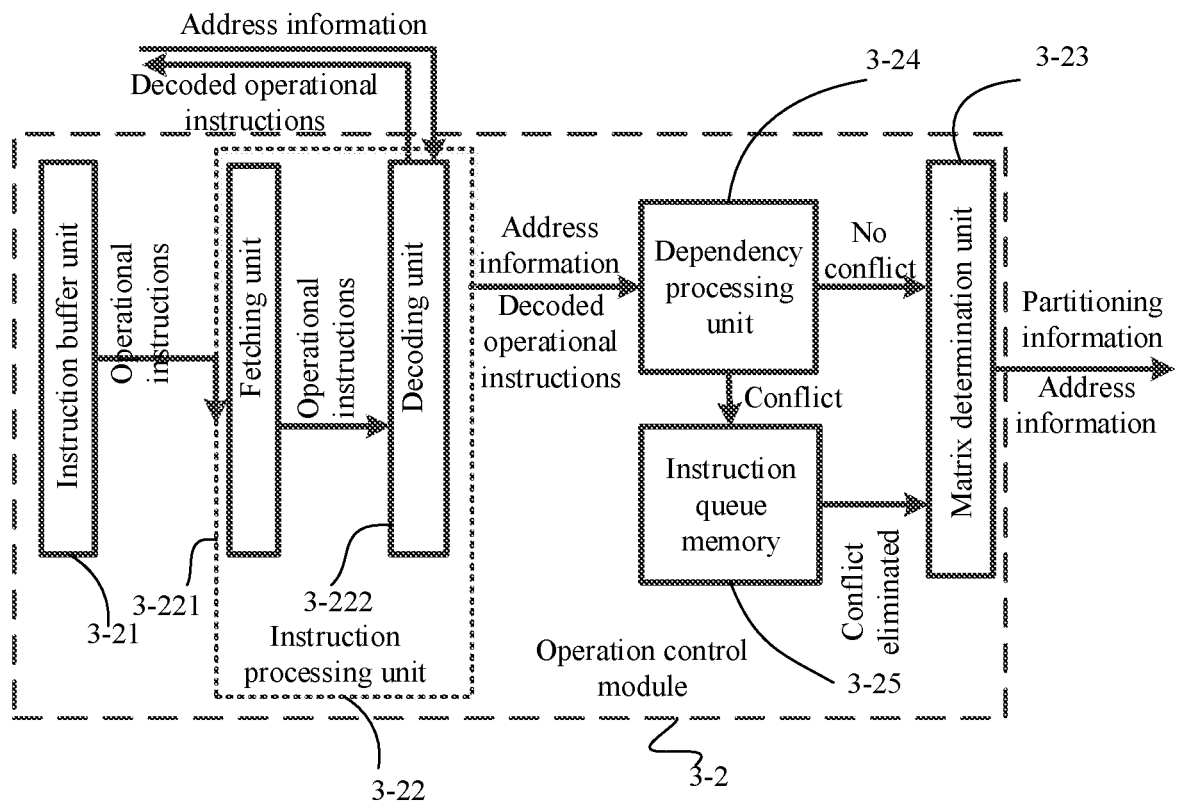
FIG. 3E is a structural diagram for an operation control module in an operation device proposed in the present disclosure.

As shown in FIG. 3E, in some embodiments of the present disclosure, the aforesaid operation control module includes an instruction processing unit 3-22, an instruction buffer unit 3-21 and a matrix determination unit 3-23, wherein, the instruction buffer unit is used for storing matrix operational instructions to be executed;

the instruction processing unit is used for acquiring matrix operational instructions from the instruction buffer unit, decoding the matrix operational instructions, and extracting the address information of the operation matrix from the address storage module according to the decoded matrix operational instructions;

the matrix determination unit is used for determining whether or not to perform the partitioning according to the address information of the operation matrix, and obtaining the partitioning information according to determination result.

In some embodiments of the present disclosure, the aforementioned operation control module further includes a dependency processing unit 3-24, for determining whether the decoded matrix operational instructions and the address information of the operation matrix are conflict with a previous operation, if there is a conflict, the decoded matrix operational instructions and the address information of the operation matrix are temporarily stored; if there is no conflict, the decoded matrix operational instructions and the address information of the operation matrix are sent to the matrix determination unit.

In some embodiments of the present disclosure, the aforementioned operation control module further includes an instruction queue memory 3-25 for buffering the decoded matrix operational instructions and the address information of operation matrix with conflict; when the conflict is eliminated, the decoded matrix operational instructions and the address information of operation matrix that are buffered are sent to the matrix determination unit.

To be specific, when matrix operational instructions accesses the data storage module, the previous and following instructions may access the same storage space; to ensure the correctness of the instruction execution result, if the present instruction is detected to be dependent on data of the previous instructions, the present instruction has to wait in the instruction queue memory until the dependency is eliminated.

In some embodiments of the present disclosure, the above instruction processing unit includes a fetching unit 3-221 and a decoding unit 3-222, wherein, the fetch unit is used for acquiring the matrix operational instructions from the instruction buffer unit and transmitting the matrix operational instructions to the decoding unit;

the decoding unit is used for decoding the matrix operational instructions, extracting the address information of the operation matrix from the address storage module according to the decoded matrix operational instructions, and transmitting the decoded matrix operational instructions and the extracted address information of the operation matrix to the dependency processing unit.

In some embodiments of the present disclosure, the above operation device further comprises an input/output module for inputting the operation matrix data to the data storage module and acquiring the transposed matrix after operation from the data storage module, and outputting the transposed matrix after operation.

In some embodiments of the present disclosure, the above address information of the operation matrix includes initial address information of matrix and matrix size information.

In some embodiments of the present disclosure, the address information of the operation matrix is the storage address of matrix in the data storage module.

In some embodiments of the present disclosure, the address storage module is a scalar register file or a universal memory unit; the data storage module is a cache or a universal memory unit.

In some embodiments of the present disclosure, the address storage module may be a scalar register file, which provides a scalar register required in the process of operation; the scalar register not only stores the matrix addresses, but also stores scalar data. The scalar data in the scalar register can be used to record the number of matrix partitions after the partitioning operation when transposing a large scale matrix.

In some embodiments of the present disclosure, the data storage module may be a cache, which can support matrix data of different sizes.

In some embodiments of the present disclosure, the matrix determination unit is used to determine the size of a matrix. If the size exceeds the prescribed maximum scale M, the matrix is required to be subjected to a partitioning operation, and the matrix determination unit makes an analysis according to such determination result to obtain the partitioning information.

In some embodiments of the present disclosure, the instruction buffer unit is used to store matrix operational instructions to be executed. During the execution of the instructions, they are buffered in the instruction buffer unit at the same time. After one instruction is executed, if the instruction is also the earliest instruction among uncommitted instructions in the instruction buffer unit, the instruction will be committed. Once committed, a change in the state of the device caused by the operation of the instruction will not be revoked. The instruction buffer unit can be a re-ordering buffer.

In some embodiments of the present disclosure, the matrix operational instructions are matrix transposition operational instructions, including opcodes and operands, wherein the opcodes are used to indicate the function of the matrix transposition operational instructions, and the matrix operation control module determines to perform a matrix transposition by identifying the opcodes; the operands are used to indicate the data information of the matrix transposition operation instructions, wherein the data information may be an immediate operand or a register number; for example, when a matrix is to be acquired, the matrix initial address and matrix size can be acquired from the corresponding register according to the register number, and then the matrix stored in the corresponding address is obtained from the data storage module according to the matrix initial address and the matrix size.

The present disclosure uses a new operation structure to implement the transposition on a matrix simply and efficiently, which reduces the time complexity of this operation.

The present disclosure further discloses an operation method, comprising steps of:

Step 1: extracting, by operation control module, address information of an operation matrix by an operation control module from an address storage module;

Step 2: obtaining, by the operation control module, partitioning information according to the address information of an operation matrix, and transmitting the address information of the operation matrix and partitioning information to an operation module;

Step 3: extracting, by the operation module, the operation matrix from a data storage module according to the address information of the operation matrix, and partitioning the operation matrix into n partitioned matrices according to the partitioning information;

Step 4: performing, by the operation module, transpose operations on the n partitioned matrices respectively to obtain transposed matrices for the n partitioning matrices;

Step 5: merging, by the operation module, the transposed matrices for then partitioned matrices to obtain a transposed matrix for the operation matrix and feedback the transposed matrix to the data storage module;

wherein, n is a natural number.

The operation device and method provided in the present disclosure are described in details by the following specific embodiments.

Figure 3F:
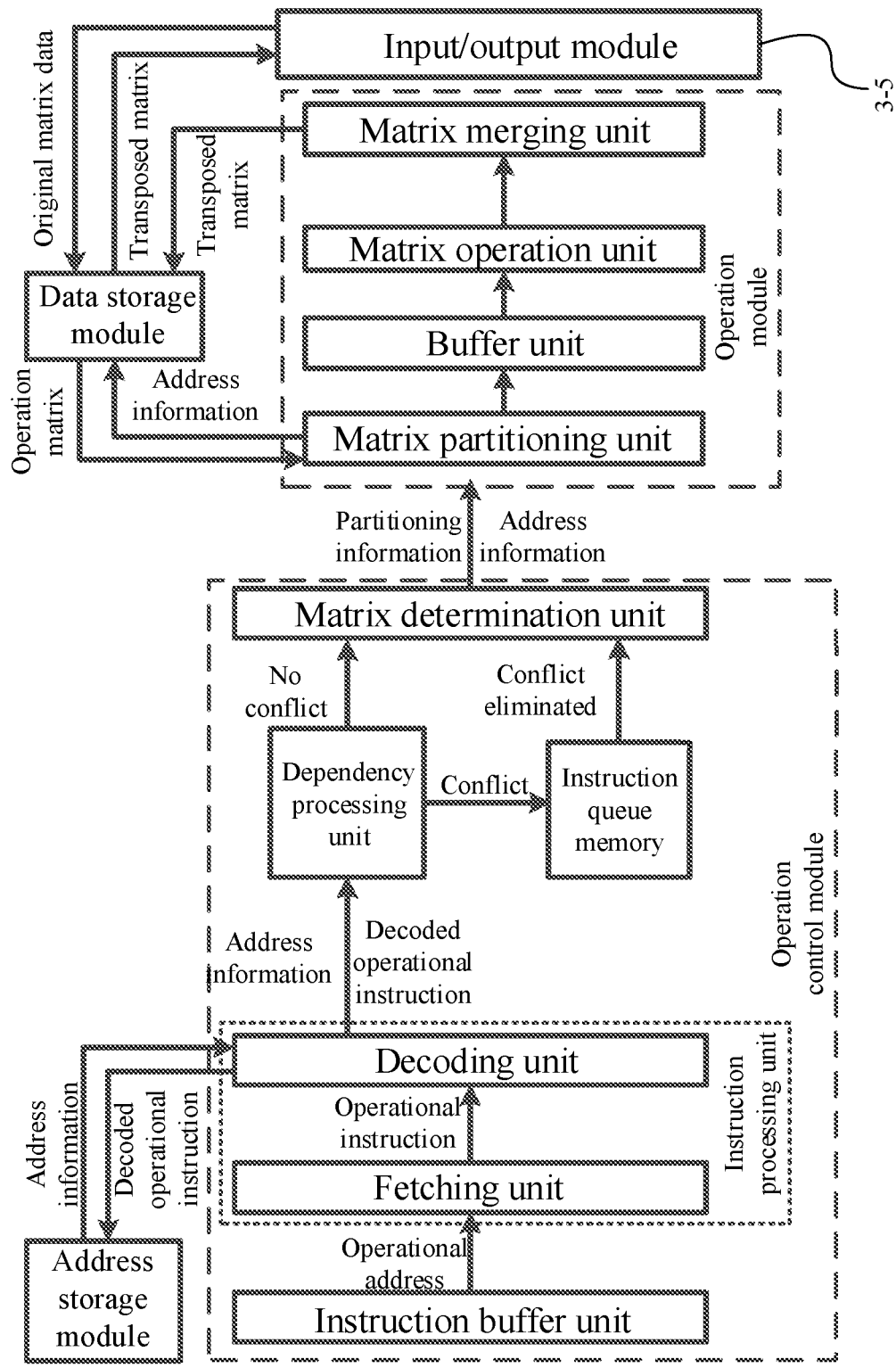
FIG. 3F is a specific structural diagram for an operation device according to one embodiment of the present disclosure.

In some embodiments, as shown in FIG. 3F, the present embodiment provides an operation device, including an address storage module, an operation control module, an operation module, a data storage module and an input/output module 3-5, wherein, optionally, the operation control module includes an instruction buffer unit, an instruction processing unit, a dependency processing unit, an instruction queue memory and a matrix determination unit, where the instruction processing unit includes a fetching unit and a decoding unit;

optionally, the operation module includes a matrix partitioning unit, a matrix buffer unit, a matrix operation unit and a matrix merging unit;

optionally, the address storage module is a scalar register file;

optionally, the data storage module is a cache; and the input/output module is an IO direct memory access module.

The following is a detailed explanation on each component of the operation device:

The fetching unit is responsible for acquiring the next operational instruction to be executed from the instruction buffer unit, and sending this operational instruction to the decoding unit;

The decoding unit is responsible for decoding the operational instruction, sending the decoded operational instruction to the scalar register file, thereby obtaining address information of the operation matrix fed back by the scalar register file, and transmitting the decoded operational instruction and the obtained address information of the operation matrix to the dependency processing unit;

The dependency processing unit processes a storage dependency possibly existing between an operational instruction and the previous operational instruction. The matrix operational instruction will access a cache, and previous and following instructions may access the same storage space. To ensure the correctness of the instruction execution result, if the present instruction is detected to be dependent on data of the previous instructions, the present instruction has to be buffered in the instruction queue memory and wait until the dependency is eliminated; if the present operational instruction is not dependent on any previous operational instruction, the dependency processing unit directly transmits the address information of the operation matrix and the decoded operational instructions to a matrix determination unit;

Considering that dependencies may exist on the corresponding/assigned scalar registers for different operational instructions, the instruction queue memory is used for buffering the decoded operational instructions with conflict and the corresponding address information of the operation matrix; when the dependency is satisfied, the decoded operational instructions and the corresponding address information of the operation matrix are sent to the matrix determination unit;

The matrix determination unit is used to determine the size of a matrix according to the address information of the operation matrix; if the size exceeds the prescribed maximum scale M, the matrix is required to be subjected to a partitioning operation, and the matrix determination unit makes an analysis according to such determination result to obtain the partitioning information, and transmits the address information of the operation matrix and the obtained partitioning information to the matrix partitioning unit;

The matrix partitioning unit is responsible for extracting the operation matrix to be transposed from the cache according to the address information of the operation matrix, and partitioning the operation matrix according to the partitioning information into n partitioned matrices.

The matrix buffer unit is used to buffer the n partitioned matrices and transmit them sequentially to the matrix operation unit for transpose operation;

The matrix operation unit is responsible for extracting the partitioned matrices sequentially from the matrix buffer unit for transpose operation, and transmitting the transposed partitioned matrices to the matrix merging unit;

The matrix merging unit is responsible for receiving and temporarily storing the transposed partitioned matrices, and performing a merging operation on the transposed matrices for the n partitioned matrices after all the partitioned matrices have been subjected to the transpose operation, to obtain a transposed matrix for the operation matrix.

The scalar register file provides a scalar register required by the device in the process of operation and provides the address information of the operation matrix for operation;

The cache is a transient storage device dedicated to matrix data and can support matrix data of different sizes;

The IO memory access module is used to directly access the cache, and responsible for reading data from or writing data to the cache.

Figure 3G:
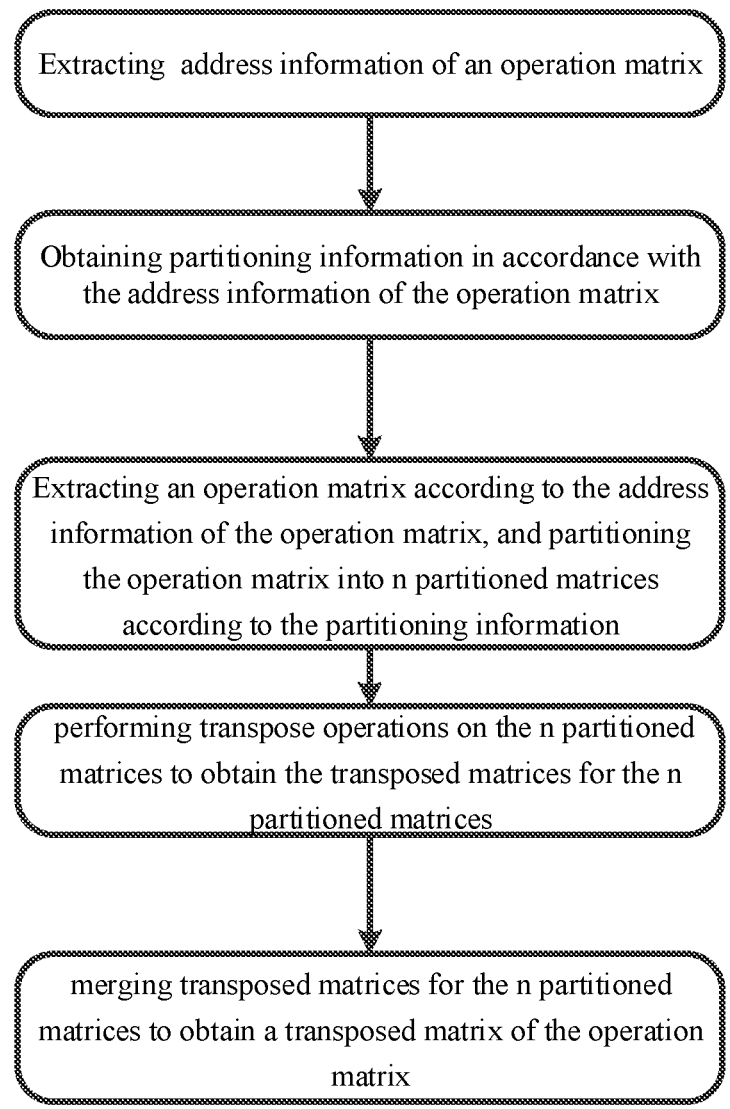
FIG. 3G is a flow chart of an operation method according to another embodiment of the present disclosure.

In some embodiments, as shown in FIG. 3G, the present embodiment provides an operation method, which is used to execute a transpose operation on large-scale matrices, specifically comprising the steps of:

Step 1: extracting, by an operation control module, address information of an operation matrix from an address storage module, specifically comprising the following steps:

Step 1-1: extracting operational instructions by a fetching unit and sending the operational instructions to a decoding unit;

Step 1-2: decoding, by the decoding unit, the operational instructions, acquiring the address information of the operation matrix from the address storage module according to the decoded operational instructions, and sending the decoded operational instructions and the address information of the operation matrix to a dependency processing unit;

Step 1-3: analyzing, by the dependency processing unit, whether the decoded operational instructions have a dependency in term of data with previous instructions that have not been completed. Specifically, the dependency processing unit can determine whether there is a register to be written in according to the address of the register required to be read by the operational instruction; if yes, there is a dependency and the operational instruction cannot be executed until the data is written back;

If there is a dependency, this decoded operational instruction and the corresponding address information of the operation matrix are required to wait in an instruction queue memory until the dependency in term of data with the previous instructions that have not been executed does not exist anymore;

Step 2: obtaining, by the operation control module, partitioning information in accordance with the address information of the operation matrix;

Specifically, after the dependency disappears, the instruction queue memory sends the decoded operational instruction and the corresponding address information of the operation matrix to the matrix determination unit to determine whether the matrix is needed to be partitioned; the matrix determination unit obtains partitioning information according to the determination result and transmits the partitioning information and the address information of the operation matrix to the matrix partitioning unit;

Step 3: extracting, by the operation module, the operation matrix from the data storage module according to the address information of the operation matrix, and partitioning the operation matrix into n partitioned matrices according to the partitioning information;

To be specific, the matrix partitioning unit extracts the desired operation matrix from the data storage module according to the introduced address information of the operation matrix, partitions the operation matrix into n partitioned matrices according to the introduced partitioning information, and transmits each partitioned matrix to the matrix buffer unit sequentially upon completion of partitioning;

Step 4: performing, by the operation module, transpose operations on the n partitioned matrices respectively to obtain the transposed matrices for the n partitioned matrices;

To be specific, the matrix operation unit sequentially extracts the partitioned matrices from the matrix buffer unit, and transposes each of the extracted partitioned matrices, and then transmits the resulting transposed matrix for each partitioned matrix to the matrix merging unit.

Step 5: merging, by the operation module, transposed matrices for the n partitioned matrices to obtain a transposed matrix of the operation matrix, and feeds back the transposed matrix to the data storage module, specifically comprising the steps of:

Step 5-1: the matrix merging unit receives the transposed matrix for each partitioned matrix, and when the number of the received transposed matrices for the partitioned matrices reaches the total number of the partitions, a matrix merging operation is applied on all the partitions to obtain the transposed matrix for the operation matrix; and feeds back the transposed matrix to a specified address of the data storage module;

Step 5-2: an input/output module has directly access to the data storage module, and reads the transposed matrix for the operation matrix obtained by operation from the data storage module.

The vector mentioned in the present disclosure may be a 0-dimensional vector, a 1-dimensional vector, a 2-dimensional vector or a multi-dimensional vector, wherein the 0-dimensional vector may also be called a scalar, and the 2-dimensional vector may also be called a matrix.

Figure 4A:
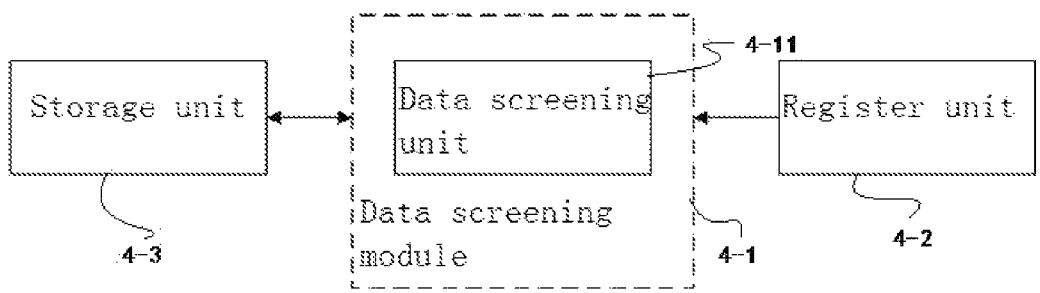
FIG. 4A is an overall structural diagram for a data screening device according to an embodiment of the present disclosure.
Figure 4B:
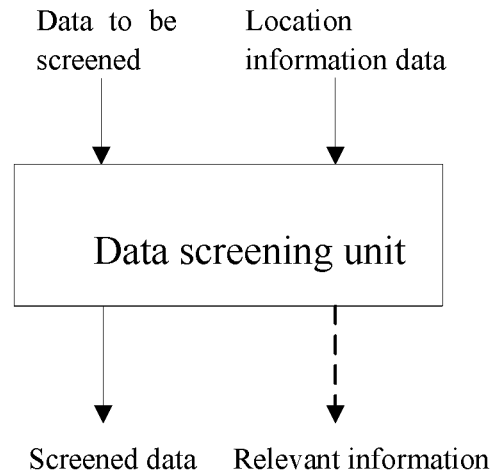
FIG. 4B is a functional diagram for a data screening unit according to an embodiment of the present disclosure.
Figure 4C:
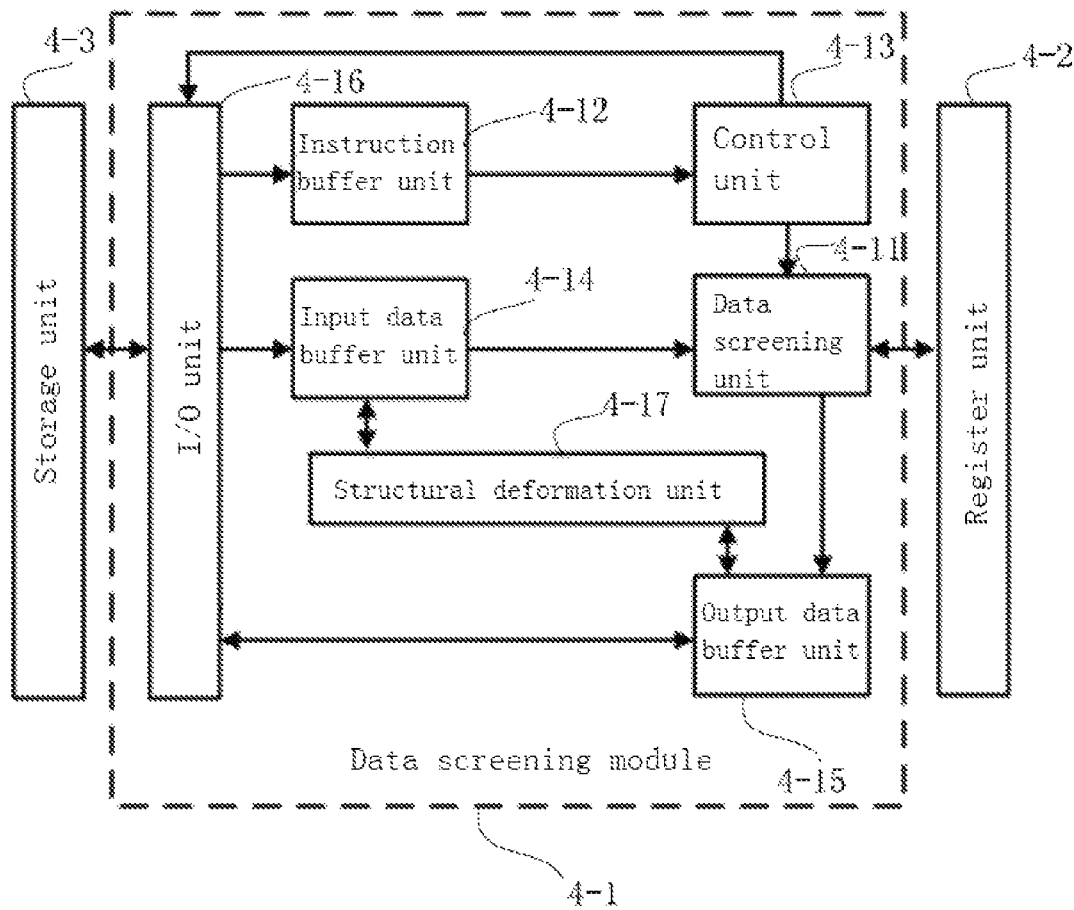
FIG. 4C is specific structural diagram for a data screening device according to an embodiment of the present disclosure.

An embodiment of the present disclosure provides a data screening device, as shown in FIG. 4A, comprising: a storage unit 4-3, for storing data and instructions, wherein the data include data to be screened and location information data;

a register unit 4-2, for storing data addresses in the storage unit;

a data screening module 4-1, including a data screening unit 4-11, the data screening module acquires a data address from a register unit according to the instruction, acquires corresponding data from the storage unit according to the data address, and performs a screening operation according to the acquired data to obtain a data screening result;

a data screening unit, whose schematically functional diagram is shown in FIG. 4B, its input data is data to be screened and the location information data, and its output data can only include screened data, or can include relevant information, e.g. vector length, array size, occupied space, etc., of the screened data at the same time;

furthermore, as shown in FIG. 4C, the data screening device of the present embodiment specifically includes:

a storage unit 4-3, for storing data to be screened, location information data and instructions;

a register unit 4-2, for storing data addresses in the storage unit;

a data screening module 4-1, including:

an instruction buffer unit 4-12, for storing instructions;

a control unit 4-13, reading the instructions from the instruction buffer unit, and decoding them into specific operational microinstructions;

an I/O unit 4-16, for transferring the instructions in the storage unit to the instruction buffer unit, transferring the data in the storage unit to an input data buffer unit and an output buffer unit, or transferring the output data in the output buffer unit to the storage unit;

an input data buffer unit 4-14 for storing data transferred by the I/O unit, including data to be screened and location information data;

a data screening unit 4-11 for receiving microinstructions sent by the control unit, and acquiring a data address from the register unit, serving the data to be screened and the location information data sent by the input data buffer unit as input data, performing a screening operation on the input data, and after completion transmitting the screened data to the output data buffer unit;

an output data buffer unit 4-15 for storing output data that can only include screened data, or can include relevant information, e.g. vector length, array size, occupied space, etc., of the screened data at the same time.

The data screening device of the present embodiment is suitable for a plurality of screening objects. The data to be screened may be vectors or high-dimensional arrays or the like. The location information data can be binary codes, or vectors, high-dimensional arrays and the like, with each component being 0 or 1. Among them, the components of the data to be screened and the components of the location information data may be of one-to-one correspondence. It should be understood by those skilled in the art that each component of the location information data being 1 or 0 is merely an exemplary way of expressing location information, but expression of the location information is not limited to this way.

Alternatively, when each component in the location information data is 0 or 1, the step of screening the input data by the data screening unit comprises: scanning each component of the location information data by the data screening unit; if the component is 0, its corresponding component in the data to be screened is deleted; if the component is 1, its corresponding component in the data to be screened is retained; or, if the component of the location information data is 1, its corresponding component in the data to be screened is deleted, if the component is 0, its corresponding component in the data to be screened is retained. When the scanning is completed, the screening is completed, and the screened data are obtained and output. In addition, while the screening operation is performed, the relevant information of the screened data may also be recorded, such as vector length, array size, occupied space, etc.; and whether or not the relevant information should be synchronously recorded and output depends on specific circumstances. It should be noted that, when each component of the location information data is expressed by other ways of expression, the data screening unit may also configure a screening operation corresponding to the way of expression.

The process of data screening is explained below by examples.

Example I

Supposing the data to be screened is a vector (1 0 101 34 243), and the components less than 100 need to be screened, then the input location information data is also a vector, i.e. vector (1 1 0 1 0). The screened data can still be kept in the vector structure, and the vector lengths of the screened data can be output simultaneously.

The location information vector may be externally input or internally generated. Optionally, the device of the present disclosure may further include a location information generating module, which is configured to generate a location information vector, where the location information generating module is connected to the data screening unit. Specifically, the location information generating module may generate the location information vector by a vector operation, wherein the vector operation may be a vector comparison operation, that is, the components of the vector to be screened are compared with a predefined value one by one. It should be noted that the location information generating module may further choose other vector operations to generate the location information vector according to predefined conditions. In this example, it is prescribed that if the component of the location information data is 1, its corresponding component in the data to be screened is retained, if the component is 0, its corresponding component in the data to be screened is deleted.

The data screening unit initializes a variable length=0, for recording the vector length of the screened data;

the data screening unit reads the data in the input data buffer unit, scans the first component of the location information vector and finds its value to be 1, so the first component of the vector to be screened, with a value of 1, is retained, length=length+1;

scanning the second component of the location information vector and finding its value to be 1, so the second component of the vector to be screened, with a value of 0, is retained, length=length+1;

scanning the third component of the location information vector and finding its value to be 0, so the third component of the vector to be screened with a value of 101 is deleted, where the length is unchanged;

scanning the fourth component of the location information vector and finding its value to be 1, so the fourth component of the vector to be screened with a value of 34 is retained, length=length+1;

scanning the fifth component of the location information vector and finding its value to be 0, so the fifth component of the vector to be screened with a value of 243 is deleted, where the length is unchanged;

The retained values form a screened vector (1 0 34) and its vector length is length=3, which is stored in an output buffer unit.

In the data screening device of this embodiment, the data screening module may further include a structural deformation unit 4-17, which may deform the storage structures of the input data in the input data buffer unit and the output data in the output data buffer unit, for example, a high-dimensional array is expanded to a vector, or a vector is changed into a high-dimensional array, or the like. Optionally, the method of expanding the high-dimensional data may be in a row-major order or a column-major order, and other expansion methods may be selected according to specific situations.

Example II

Supposing the data to be screened is an array $$\begin{pmatrix} 1 & 4 \\ 61 & 22 \end{pmatrix},$$

and the even values to be screened, then the input location information array is $$\begin{pmatrix} 0 & 1 \\ 0 & 1 \end{pmatrix},$$

and the screened data is of a vector structure and no relevant information is output. The present example prescribes that if the component of the location information data is 1, its corresponding component in the data to be screened is retained, and if the component is 0, its corresponding component of the data to be screened is deleted.

The data screening unit reads data in the input data buffer unit, scans the (1,1)-th component of the location information array and finds its value to be 0, so the (1,1)-th component of the array to be screened with a value of 1 is delete;

scanning the (1,2)-th component of the location information array and finding its value to be 1, so the (1,2)-th component of the array to be screened with a value of 4 is retained;

scanning the (2,1)-th component of the location information array and finding its value to be 0, so the (2,1)-th component of the array to be screened with a value of 61 is deleted;

scanning the (2,2)-th component of the location information array and finding its value to be 1, so of the (2,2)-th component of the array to be screened with a valued of 22 is retained;

The structural deformation unit turns the retained values into a vector, i.e. the screened data is a vector (4 22), which is stored in an output data buffer unit.

Figure 4D:
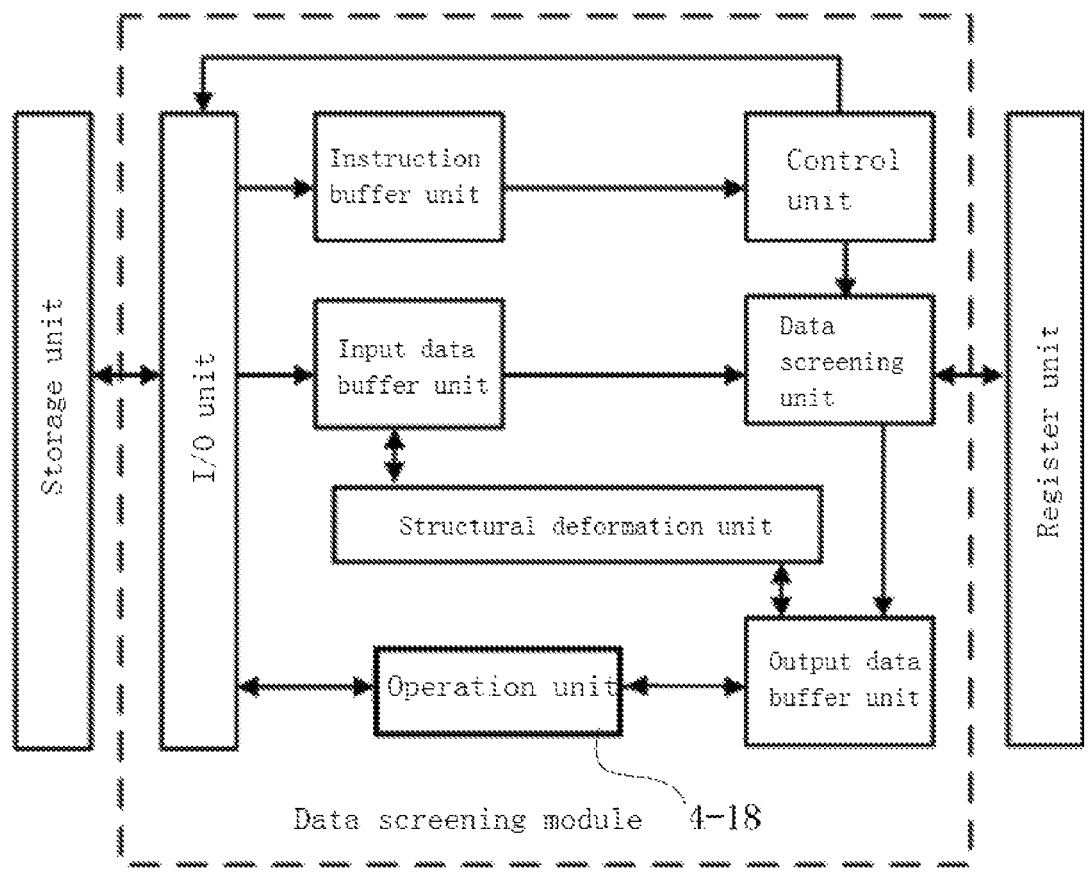
FIG. 4D is another specific structural diagram for a data screening device according to an embodiment of the present disclosure.

In some embodiments, as shown in FIG. 4D, the data screening module may further include: a computing unit 4-18. Therefore, the device of the present disclosure can achieve data screening and processing simultaneously, that is, a data screening and processing device can be obtained. The specific structure of the computing unit is the same as that in the foregoing embodiments, and details are not repeated herein.

The present disclosure provides a method for data screening by the data screening device, comprising:

acquiring data address from a register unit by a data screening module;

acquiring corresponding data from a storage unit according to the data address; and screening the acquired data to obtain a data screening result.

In some embodiments, the step of acquiring data address from a register unit by a data screening module comprises: acquiring the address of the data to be screened and the address of the location information data from the register unit by the data screening unit.

In some embodiments, the step of acquiring corresponding data from a storage unit according to the data address comprises the sub-steps as follows:

transmitting, by an I/O unit, the data to be screened and the location information data in the storage unit to an input data buffer unit; and transferring, by the input data buffer unit, the data to be screened and the location information data to the data screening unit.

Optionally, between the sub-step of transmitting, by an I/O unit, the data to be screened and the location information data in the storage unit to an input data buffer unit and the sub-step of transferring, by the input data buffer unit, the data to be screened and the location information data to the data screening unit, there is a sub-step of determining whether or not to deform the storage structure.

If the storage structure is deformed, the input data buffer unit transmits the data to be screened to the structural deformation unit, which deforms the storage structure, and transmits the deformed data to be screened back to the input data buffer unit; and then the sub-step of transferring, by the input data buffer unit, the data to be screened and the location information data to the data screening unit is executed. If not deformed, the sub-step of transferring, by the input data buffer unit, the data to be screened and the location information data to the data screening unit is directly executed.

In some embodiments, the step of screening the acquired data to obtain a data screening result comprises: screening, by the data screening unit, the data to be screened according to the location information data, and transmitting the output data to the output data buffer unit.

Figure 4E:
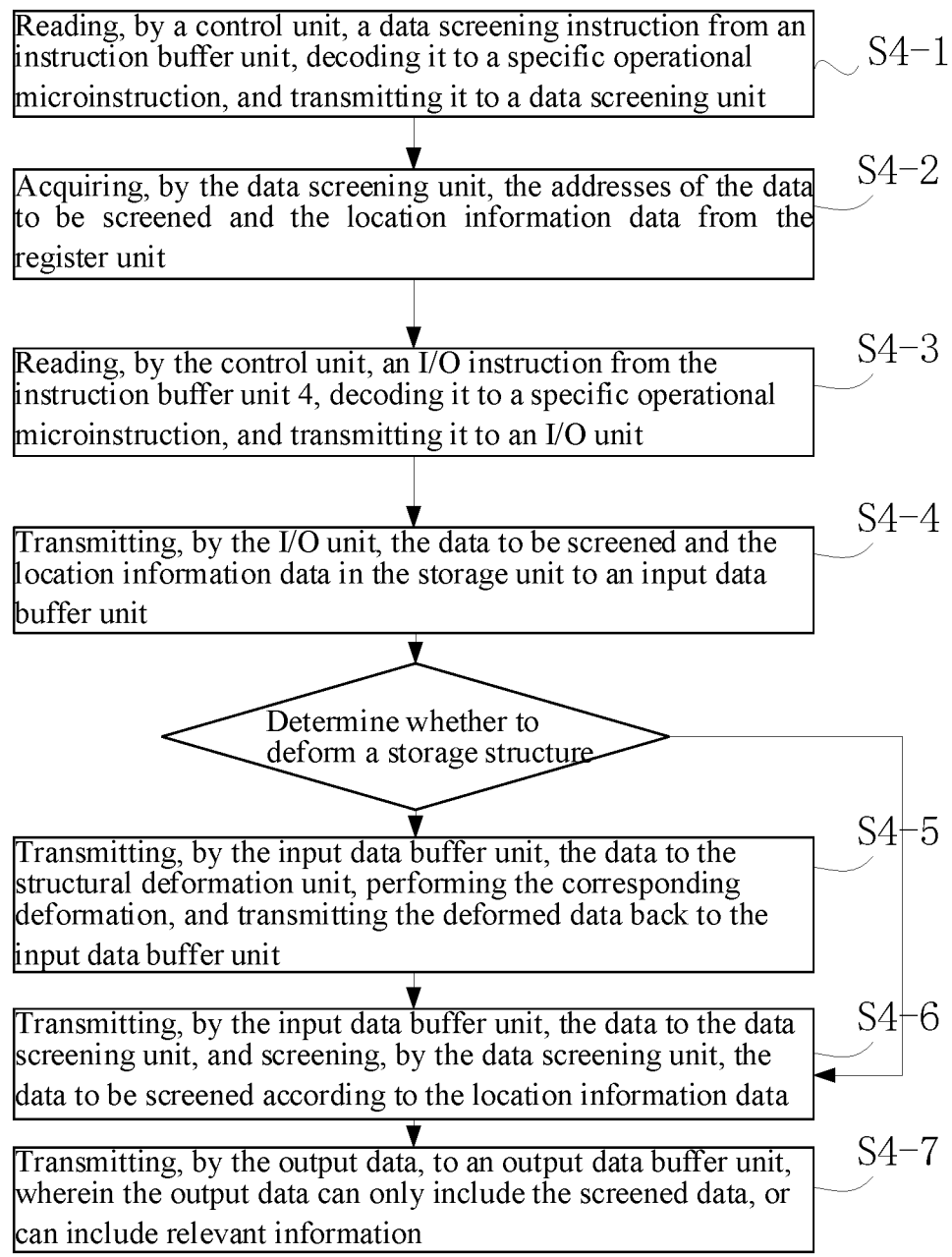
FIG. 4E is a flow chart of a data screening method according to an embodiment of the present disclosure.

As shown in FIG. 4E, in one specific embodiment of the present disclosure, the method for data screening specifically comprises:

Step S4-1: reading, by a control unit, a data screening instruction from an instruction buffer unit, decoding the data screening instruction to a specific operational microinstruction, and transmitting the operational microinstruction to a data screening unit;

Step S4-2: acquiring, by the data screening unit, the addresses of the data to be screened and the location information data from the register unit;

Step S4-3: reading, by the control unit, an I/O instruction from the instruction buffer unit, decoding the I/O instruction to a specific operational microinstruction, and transmitting the operational microinstruction to an I/O unit;

Step S4-4: transmitting, by the I/O unit, the data to be screened and the location information data in the storage unit to an input data buffer unit;

determining whether or not to deform a storage structure; if yes, executing Step S4-5; if not, directly executing Step S4-6;

Step S4-5: transmitting, by the input data buffer unit, the data to the structural deformation unit, performing the corresponding storage structure deformation, and then transmitting the deformed data back to the input data buffer unit, then proceeding to Step S4-6;

Step S4-6: transmitting, by the input data buffer unit, the data to the data screening unit, and screening, by the data screening unit, the data to be screened according to the location information data;

Step S4-7: transmitting, by the output data, to an output data buffer unit, wherein the output data can only include the screened data, or can include relevant information, e.g. vector length, array size, occupied space, etc., of the screened data at the same time.

So far the embodiments of the present disclosure have been described in detail in conjunction with the drawings. Based on the above description, those skilled in the art should have a clear understanding of a data screening device and method of the present disclosure.

An embodiment of the present disclosure provides a neural network processor, comprising: a memory, a cache and a heterogeneous core, wherein the memory is used to store data and instructions for a neural network operation; the cache is connected to the memory via a memory bus; the heterogeneous core is connected to the cache via a cache bus, for reading the data and instructions for the neural network operation through the cache to accomplish the neural network operation, returning the operation result to the cache, and controlling the cache so that the operation result is written back into the memory.

Thereinto, the heterogeneous core refers to cores of at least two different kinds, that is, cores of at least two different structures.

In some embodiments, the heterogeneous core includes: multiple operation cores, which have at least two different kinds of operation cores for executing a neural network operation or a neural network layer operation; and one or more logic control cores, for determining to execute a neural network operation or a neural network layer operation by dedicated cores and/or generic cores in accordance with data of the neural network operation.

Furthermore, the multiple operation cores include m generic cores and n dedicated cores, wherein the dedicated cores are dedicated to execute assigned neural network/neural network layer operations, and the generic cores are used to execute arbitrary neural network/neural network layer operations. Optionally, the generic core is a cpu, and the dedicated core is a npu.

In some embodiments, the cache includes a shared cache and/or a non-shared cache, wherein one shared cache is correspondingly connected to at least two cores in the heterogeneous cores via the cache bus, and one non-shared cache is correspondingly connected to one of the heterogeneous cores via the cache bus.

To be specific, the cache can merely include one or more shared cache, and each shared cache is connected to multiple cores (a logic control core, a dedicated core or a generic core) in the heterogeneous core. The cache may only include one or more non-shared cache, and each non-shared cache is connected to one core (a logic control core, a dedicated core or a generic core) in the heterogeneous core. The cache may include both one or more shared cache and one or more non-shared cache, wherein each shared cache is connected to multiple cores (a logic control core, a dedicated core or a generic core) in the heterogeneous core, and each non-shared cache is connected to one core (a logic control core, a dedicated core or a generic core) in the heterogeneous core.

In some embodiments, the logic control core is connected to the cache via the cache bus, is configured to read data of the neural network operation through the cache, and determine to execute a neural network operation and/or a neural network layer operation by taking the dedicated core and/or the generic core as a target core in accordance with the type and parameters for the neural network model in the data of the neural network operation. Wherein, a pathway may be added between the cores. The logic control core sends a signal to the target core via a control bus directly, or via the cache, so as to control the target core to execute a neural network operation and/or a neural network layer operation.

Figure 5A:
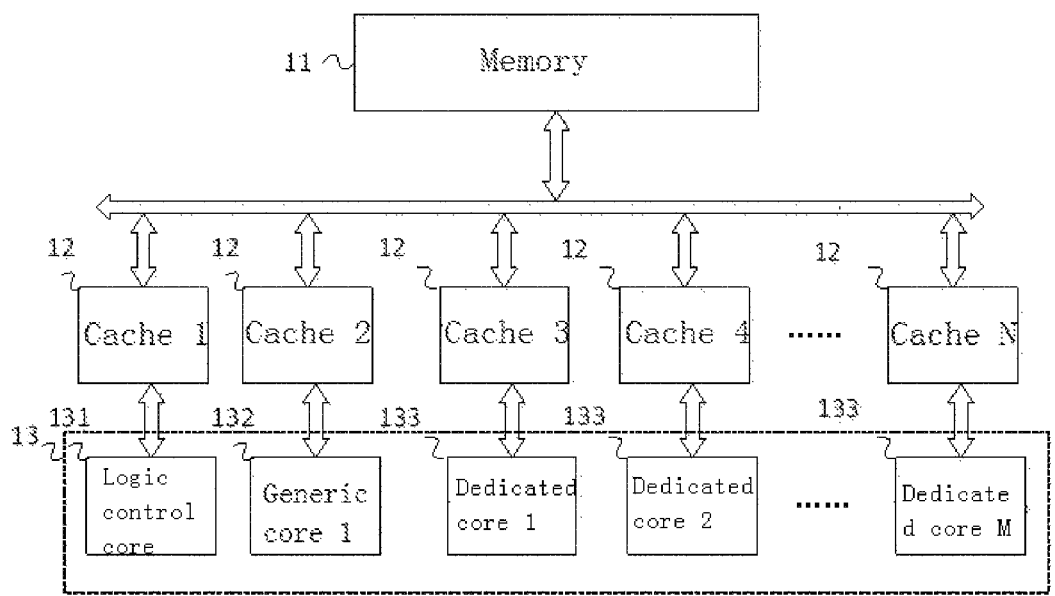
FIG. 5A schematically shows a heterogeneous multicore neural network processor according to one embodiment of the present disclosure.

An embodiment of the present disclosure provides a heterogeneous multi-core neural network processor, as shown in FIG. 5A, comprising: a memory 11, a non-shared cache 12 and a heterogeneous core 13.

The memory 11 is used to store data and instructions of the neural network operation, wherein the data include offsets, weights, input data, output data, types and parameters for the neural network model, and so on. Of course, the output data may not be stored in the memory; the instructions include all kinds of instructions corresponding to the neural network operation, such as CONFIG instructions, COMPUTE instructions, IO instructions, NOP instructions, JUMP instructions, MOVE instructions and the like. The data and instructions stored in the memory 11 can be transmitted to the heterogeneous core 13 through the non-shared cache 12.

The non-shared cache 12 includes multiple caches 121, with each connected to the memory 11 via the memory bus, and connected to the heterogeneous core 13 via the cache bus, to fulfill data exchanges between the heterogeneous core 13 and the non-shared cache 12, as well as the non-shared cache 12 and the memory 11. When the data or instructions of the neural network operation required by the heterogeneous core 13 are not stored in the non-shared cache 12, the non-shared cache 12 reads the required data or instructions from the memory 11 via the memory bus first, and then transmits them to the heterogeneous core 13 via the cache bus.

The heterogeneous core 13 includes a logic control core 131, a generic core 132 and multiple dedicated cores 133, and both of the logic control core 131 and the generic core 132 and each of the dedicated cores 133 are connected to corresponding caches 121 via the cache bus.

The heterogeneous core 13 is used to read the instructions and data of the neural network operation from the non-shared cache 12, complete the neural network operation, and return the operation result to the non-shared cache 12 to control the non-shared cache 12 to write the operation result back to the memory 11.

The logic control core 131 reads data and instructions of the neural network operation from the non-shared cache 12, and determines whether there is a dedicated core 133 capable of supporting the neural network operation and accomplishing the scale of the neural network operation according to the types and parameters for the neural network model in the data. If there is a dedicated core, the neural network operation is accomplished by the corresponding dedicated core 133; if not, the neural network operation is completed by the generic core 132. In order to determine the location of the dedicated core and whether it is idle, it is possible to provide a table (called a dedicated/generic core information table) for each kind of core (the dedicated cores supporting the same layer belong to one class, and the generic cores belong to one class), in which the serial number (or addresses) of the same kind of cores and whether they are currently idle are recorded. All cores are initially idle, and then the change of idle state is maintained by direct or indirect communication between the logic control core and the core. The serial numbers of the cores in the table can be acquired by scanning once during initialization of the network processor, which supports the dynamically configurable heterogeneous core (that is, the type and number of dedicated processors in the heterogeneous core can be changed at any time, and the core information table will be scanned and updated after the change). Optionally, it is possible not to support the dynamic configuration of the heterogeneous core, and in this case, the serial numbers of the cores in the table are only to be fixed without a need of scanning and updating for several times. Optionally, if the serial numbers of each type of dedicated cores are always continuous, a reference address can be recorded, and then a number of consecutive bits are used to represent these dedicated cores, and bit 0 or 1 can indicate whether they are idle. In order to determine the type and parameters for the network model, a decoder can be set in the logic control core to determine the type of the network layer according to instruction, and can determine whether the instruction is for the generic core or the dedicated core; and the parameters, the data addresses and so on can also be analyzed from the instruction. Optionally, it is also possible to specify that the data include a data head containing the serial number and size of each network layer, the addresses of the corresponding computing data and instructions and the like, and a special analyzer (either software or hardware) is provided to analyze this information. Optionally, the analyzed information is stored in a specified area. In order to determine which core to use based on the analyzed network layer serial number and size, a content addressable memory (CAM) can be set in the logic control core, and the content therein can be implemented as configurable, which requires a logic control core to provide some instructions to configure/write this CAM. The contents in the CAM include the network layer serial numbers, the maximum scales that respective dimensions can support, and the address of the information table of the dedicated core supporting the layer and the address of the information table of the generic core. Under this scheme, the analyzed layer serial number is used to find the corresponding item in table, and compare with the scale limit; if they meet, the address of the information table of the dedicated core is adopted to find an idle dedicated core therein, and a control signal is sent according to its serial number and a computing task is assigned; if a corresponding layer is not found in the CAM, or the size limit is exceeded, or there is no idle core in the information table of the dedicated core, the information table of the generic core is adopted to find an idle generic core, a control signal is sent according to its serial number and a computing task is assigned; if an idle core is not found in both tables, this task is added to a waiting queue together with some necessary information; once there is an idle core capable of computing this task, this task will be assigned to it for computation.

Of course, there are many ways to determine where the dedicated core is and whether it is idle. The above method of determining where the dedicated core is and whether it is idle is only an illustrative explanation. Each dedicated core 133 can independently perform a neural network operation, such as a spiking neural network (SNN) operation and other designated neural network operations, write the operation result back to its correspondingly connected cache 121, and control the cache 121 to write the operation result back to the memory 11.

The generic core 132 can independently complete a neural network operation beyond the operation scale supported by the dedicated core or that is not supported by any dedicated core 133, write the operation result back to the correspondingly connected cache 121, and control the cache 121 to write the operation result back to the memory 11.

Figure 5B:
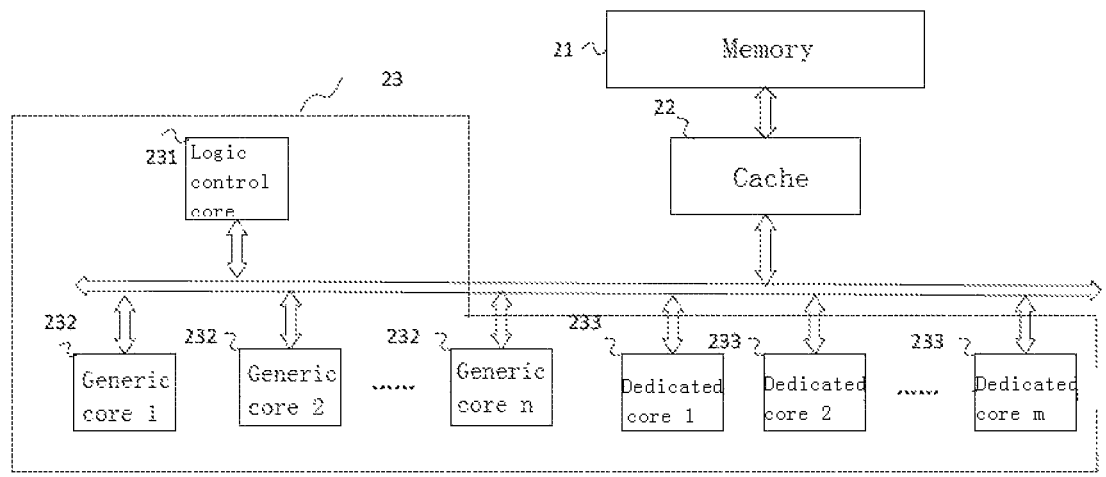
FIG. 5B schematically shows a heterogeneous multicore neural network processor according to another embodiment of the present disclosure.

One embodiment of the present disclosure provides a heterogeneous multi-core neural network processor, as shown in FIG. 5B, comprising: a memory 21, a shared cache 22 and a heterogeneous core 23.

A memory 21 is used to store data and instructions of the neural network operation, wherein the data include offsets, weights, input data, output data, and the type and parameters for the neural network model; the instructions include various kinds of instructions corresponding to the neural network operation. The data and instructions stored in the memory can be transmitted to the heterogeneous core 23 through the shared cache 22.

A shared cache 22 is connected to the memory 21 via the memory bus, and connected to the heterogeneous core 23 via the cache bus to achieve data exchanges between the heterogeneous core 23 and the shared cache 22 as well as the shared cache 22 and the memory 21.

When the data and instructions of the neural network operation required by the heterogeneous core 23 are not stored in the cache 22, the shared cache 22 reads the required data or instructions from the memory 21 via the memory bus first, and then transmits them to the heterogeneous core 23 via the cache bus.

The heterogeneous core 23 includes a logic control core 231, a generic core 232 and multiple dedicated cores 233, and both of the logic control core 231 and the generic core 232 and each of the dedicated cores 233 are connected to the shared caches 22 via the cache bus.

The heterogeneous core 23 is used to read data and instructions of the neural network operation from the shared cache 22, complete the neural network operation, send the operation result to the cache 22, and control the shared cache 22 to write the operation result back to the memory 21.

In addition, when it is necessary to make data transmission between the logic control core 231 and the generic core 232, between the logic control core 231 and the dedicated core 233, among the generic cores 232, as well as among the dedicated cores 233, the data sending core can first transmit the data to the shared cache 22 via the shared cache bus, and then transmit the data to the data receiving core without passing through the memory 21.

As to the neural network operation, its neural network model generally includes a plurality of neural network layers, each of which performs a corresponding operation with the operation result of the previous neural network layer, and the operation result of this layer is output to the next neural network layer, with the operation result of the last neural network layer being the result of the whole neural network operation. In the heterogeneous multi-core neural network processor of this embodiment, both of the generic core 232 and the dedicated core 233 can execute an operation of a neural network layer, and jointly accomplish the neural network operation by using the logic control core 231, the generic core 232 and the dedicated core 233. Hereinafter the neural network layer is referred to as a layer for convenience of description.

Wherein, each of the dedicated cores 233 can independently execute an operation of a layer, e.g. a convolution, a fully connected layer, a concatenation operation, a bitwise addition/multiplication, a Relu operation, a pooling operation and/or Batch Norm operation of the neural network layer, etc., and the scale of the neural network operation layer cannot be too large, i.e. cannot exceed the scale of the neural network operation layer supported by the corresponding dedicated core, that is, the dedicated core operation imposes limitations on the number of neurons and synapses in a layer. Upon completion of the operation of the layer, the operation result is written back to the shared cache 22.

The generic core 232 is used to execute an operation of the layer exceeding the operation scale supported by the dedicated cores 233 or that is not supported by any of the dedicated cores, write the operation result back to the shared cache 22, and control the shared cache 22 to write the operation result back to the memory 21.

Furthermore, after the dedicated core 233 and the generic core 232 write the operation results back to the memory 21, the logic control core 231 will send a signal of starting operation to the dedicated core or generic core that executes an operation of the next layer, and notify the dedicated core or generic core that executes the operation of the next layer to start the operation.

Even furthermore, the dedicated core 233 and the generic core 232 start the operation after receiving the signal of starting an operation sent from the dedicated core or generic core for the operation of the previous layer and when no layer operation is being executed currently; if a layer operation is currently being performed, the operation is not started until the current layer operation is completed and the operation result is written back to the shared cache 22.

The logic control core 231 reads the data of the neural network operation from the shared cache 22, analyzes each layer of the neural network model for the type and parameters of the neural network model therein; as for each layer, determines whether or not there is a dedicated core 233 that supports the operation of this layer and can accomplish the operation scale of this layer. If there is such a dedicated core, the operation of the layer is computed by the corresponding dedicated core 233, and if not, the operation of the layer is performed by the generic core 232. The logic control core 231 also provides the corresponding addresses of the data and instructions required for the layer operation by the generic core 232 and the dedicated core 233, and the generic core 232 and the dedicated core 233 read the data and instructions at the corresponding addresses, and perform the layer operations.

As for the dedicated core 233 and generic core 232 for executing the operation of the first layer, the logic control core 231 sends a start operation signal to the dedicated core 233 or the generic core 232 at the beginning of the operation, and after the neural network operation, the dedicated core 233 or the generic core 232 that executes the operation of the last layer sends a start operation signal to the logic control core 231. After receiving the start operation signal, the logic control core 231 controls the shared cache 22 to write the operation result back to the memory 21.

Figure 5C:
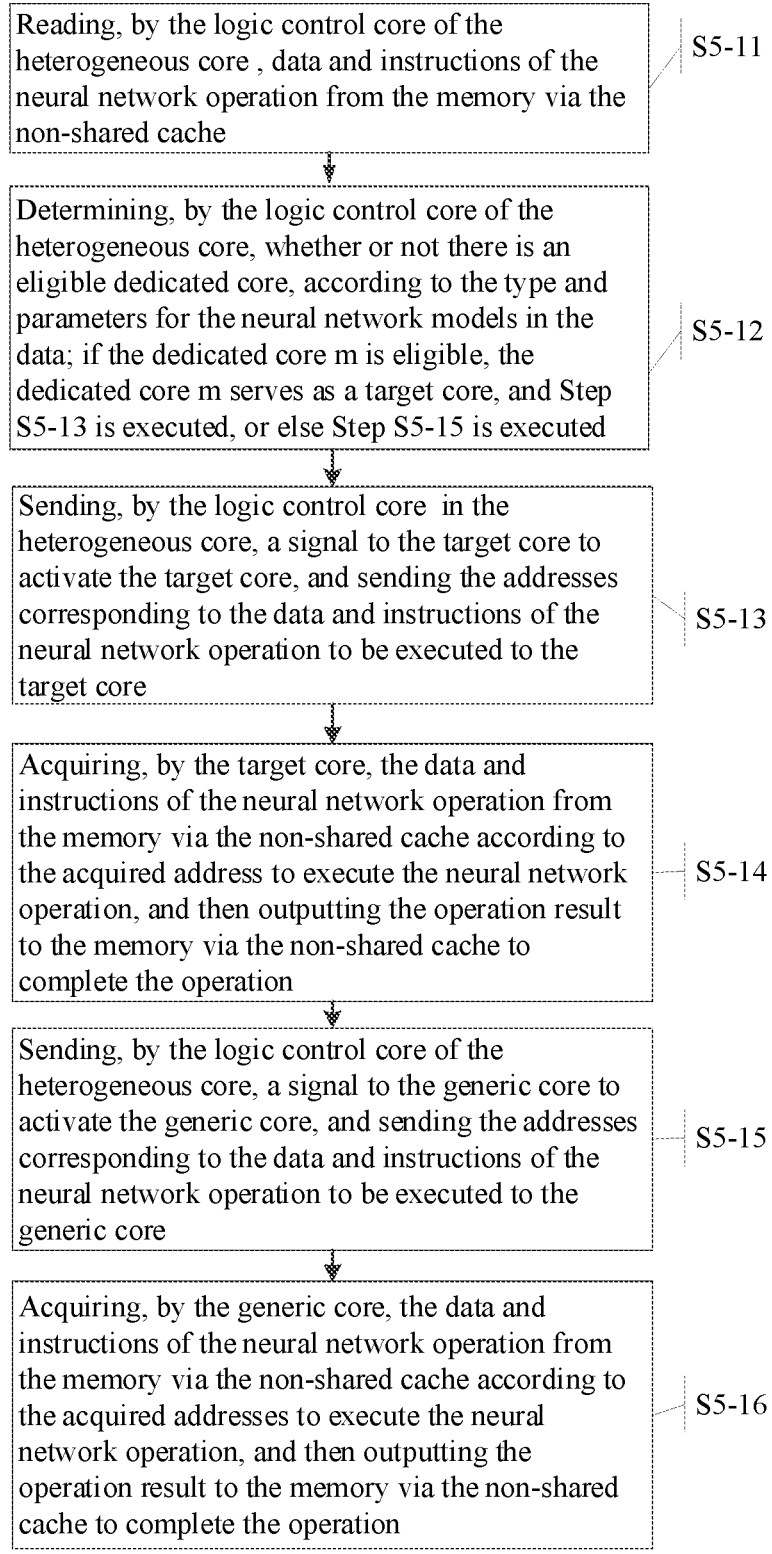
FIG. 5C is a flow chart of a neural network operation method according to another embodiment of the present disclosure.

One embodiment of the present disclosure provides a method for a neural network operation with the heterogeneous multi-core neural network processor according to the first embodiment; as shown in FIG. 5C, the method comprises the following steps:

Step S5-11: reading, by the logic control core 131 of the heterogeneous core 13, data and instructions of the neural network operation from the memory 11 via the non-shared cache 12;

Step S5-12: determining, by the logic control core 131 of the heterogeneous core 13, whether or not there is an eligible dedicated core, in accordance with the type and parameters for the neural network models in the data, wherein the term "eligible" refers to that the dedicated core supports the neural network operation and can accomplish the scale of the neural network operation (a scale restriction may be inherent from the dedicated core, which may be provided by the design manufacturer; or it may be man-made (e.g., found by experiments, beyond which the generic core is more effective); a scale restriction can be set at the time of configuring the CAM). If the dedicated core m is eligible, the dedicated core m serves as a target core, and Step S5-13 is executed, or else Step S5-15 is executed, wherein m is the serial number of the dedicated core, 1≤m≤M, M is a quantity of the dedicated cores;

Step S5-13: sending, by the logic control core 131 in the heterogeneous core 13, a signal to the target core to activate the target core, and sending the addresses corresponding to the data and instructions of the neural network operation to be executed to the target core at the same time;

Step S5-14: acquiring, by the target core, the data and instructions of the neural network operation from the memory 11 via the non-shared cache 12 according to the acquired address to execute the neural network operation, and then outputting the operation result to the memory 11 via the non-shared cache 12 to complete the operation;

further, following the above Step S5-12, if there is no eligible dedicated core, Steps S5-15 and S5-16 are executed subsequently;

Step S5-15: sending, by the logic control core 131 of the heterogeneous core 13, a signal to the generic core 132 to activate the generic core 132, and sending the addresses corresponding to the data and instructions of the neural network operation to be executed to the generic core 132 at the same time;

Step S5-16: acquiring, by the generic core 132, the data and instructions of the neural network operation from the memory 11 via the non-shared cache 12 according to the acquired addresses to execute the neural network operation, and then outputting the operation result to the memory 11 via the non-shared cache 12 to complete the operation.

Figure 5D:
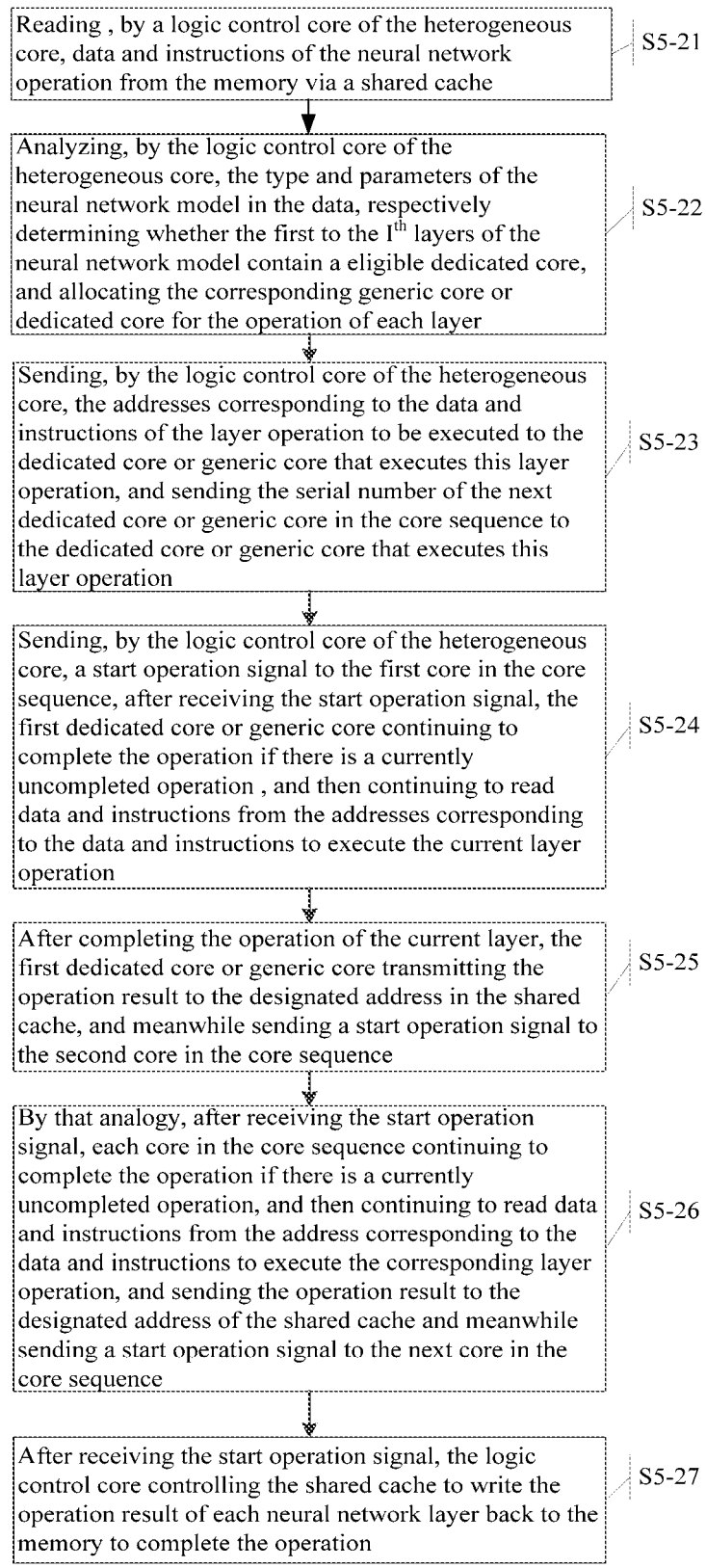
FIG. 5D is a flow chart of a neural network operation method according to another embodiment of the present disclosure.

One embodiment of the present disclosure provides a method for a neural network operation with the heterogeneous multi-core neural network processor according to the second embodiment; as shown in FIG. 5D, the method comprises the following steps:

Step S5-21: reading, by the logic control core 231 of the heterogeneous core 23, data and instructions of the neural network operation from the memory 21 via a shared cache 22;

Step S5-22: analyzing, by the logic control core 231 of the heterogeneous core 23, the type and parameters of the neural network model in the data, respectively determining whether the first to the Ith layers of the neural network model contain a eligible dedicated core, wherein I is the number of layers of the neural network model, and the term of "eligible" refers to that the dedicated core supports the operation of the layer and can accomplish its scale, and allocating the corresponding generic core or dedicated core for the operation of each layer.

As for the operation of the ith layer of the neural network model, 1≤i≤I, if the dedicated core m is eligible, the dedicated core m is chosen to execute the operation of the ith layer of the neural network model, wherein m is the serial number of the dedicated core, 1≤m≤M, M is the quantity of the dedicated cores. If no dedicated core is eligible, generic core M+n is chosen to execute the operation of the ith layer of the neural network model, wherein M+n is the serial number of the generic core, 1≤n≤N, is the quantity of the generic cores, where the dedicated cores 233 and the generic cores 232 are numbered uniformly (i.e. the dedicated core and the generic core are numbered together, for example, if there are x dedicated cores and y generic cores, they can be numbered from 1 to x+y, and each dedicated core or each generic core corresponds to a serial number from 1 to x+y; certainly, the dedicated core and the generic core may be numbered separately, for example, if there are x dedicated cores and y generic cores, the dedicated cores can be numbered from 1 to x, and the generic cores can be numbered from 1 to y, and each dedicated core or each generic core corresponds to a serial number); however in this situation, the number of the dedicated core may be the same as that of the generic core, but they are the same only in logical numbers, and they can be addressed according to their physical addresses to obtain a core sequence corresponding to the operations of the first to Ith layers of the neural network model finally. In other words, this core sequence contains I elements in total, and each element is a dedicated core or a generic core, corresponding to the operation of the first to Ith layer of the neural network model sequentially. For example, a core sequence 1a, 2b, . . . , il, where 1, 2, i represent serial numbers of the neural network layers, and a, b, l represent the serial numbers of the dedicated core or generic core.

Step S5-23: sending, by the logic control core 231 of the heterogeneous core 23, the addresses corresponding to the data and instructions of the layer operation to be executed to the dedicated core or generic core that executes this layer operation, and sending the serial number of the next dedicated core or generic core in the core sequence to the dedicated core or generic core that executes this layer operation, wherein it is the serial number of the logic control core that is sent to the dedicated core or generic core executing the last layer operation;

Step S5-24: sending, by the logic control core 231 of the heterogeneous core 23, a start operation signal to the first core in the core sequence. After receiving the start operation signal, the first dedicated core 233 or generic core 232 continuing to complete the operation if there is currently uncompleted operation, and then continuing to read data and instructions from the addresses corresponding to the data and instructions to execute the current layer operation;

Step S5-25: after completing the operation of the current layer, the first dedicated core 233 or generic core 232 transmitting the operation result to the designated address in the shared cache 22, and meanwhile sending a start operation signal to the second core in the core sequence;

Step S5-26: by that analogy, after receiving the start operation signal, each core in the core sequence continuing to complete the operation if there is a currently uncompleted operation, and then continuing to read data and instructions from the address corresponding to the data and instructions to execute the corresponding layer operation, and sending the operation result to the designated address of the shared cache 22 and meanwhile sending a start operation signal to the next core in the core sequence, where the last core in the core sequence sends a start operation signal to the logic control core 231;

Step S5-27: after receiving the start operation signal, the logic control core 231 controlling the shared cache 22 to write the operation result of each neural network layer back to the memory 21 to complete the operation.

Figure 5E:
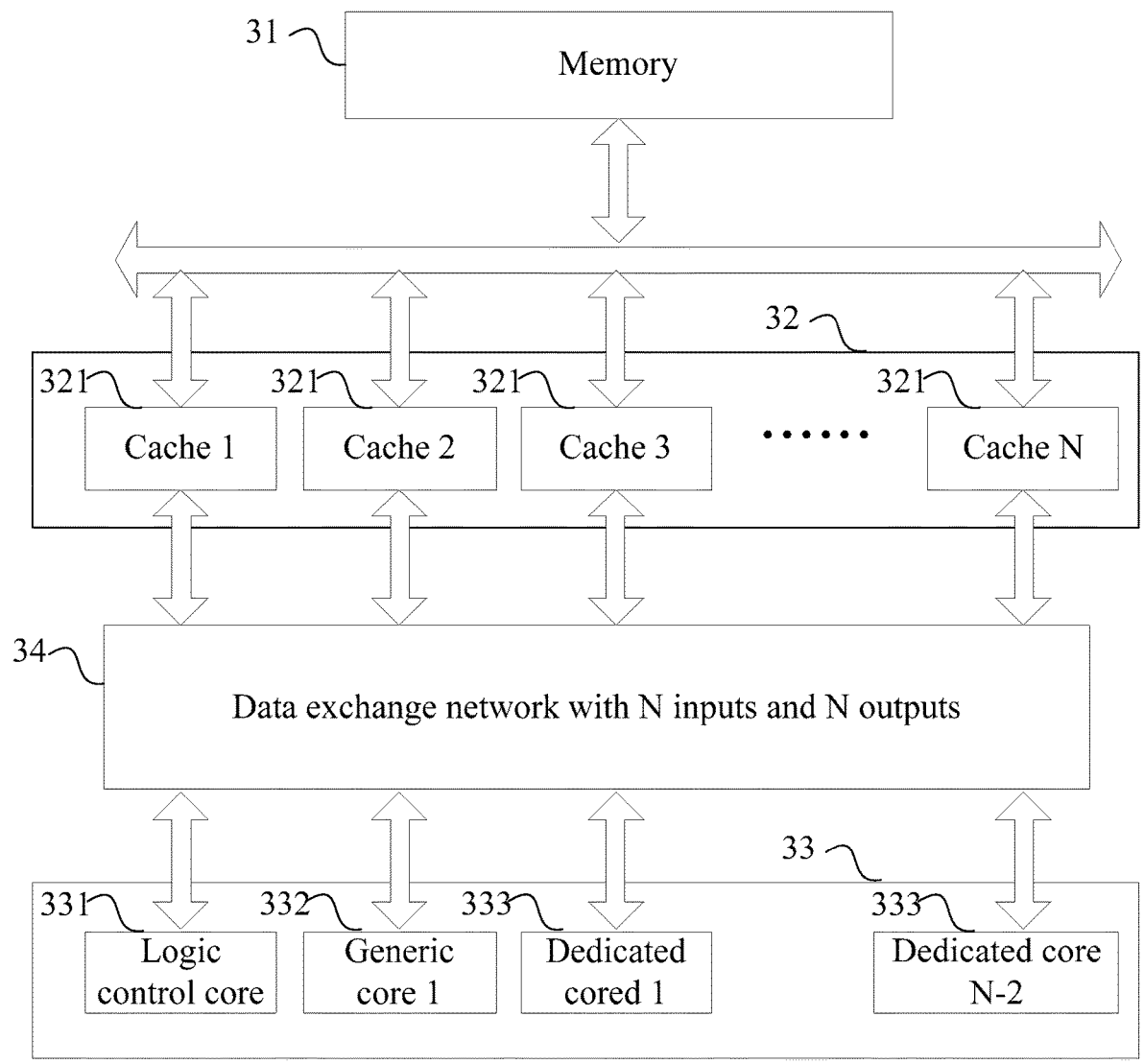
FIG. 5E schematically shows a heterogeneous multicore neural network processor according to another embodiment of the present disclosure.

As shown in FIG. 5E, the embodiment is a further extension of the above first embodiment. The cache 121 in Embodiment 1 (FIG. 5A) is dedicated to each core, and the dedicated core 1 can only access the cache 3, but no other caches, so do the other cores, so the entity 12 formed by 121 has a non-shared nature. However, if a core j uses the result of a core i (i≠j) (this result is initially stored in the cache corresponding to the core i), the core i must first write this result from the cache to the memory 11, and then the core j reads the result into the cache that it can access from the memory 11, after which the core j can use this result. To make this process more convenient, an N×N data exchange network 34 is added by such as a crossbar, so that each core (331 or 332 or 333) can access all caches (321), and at this point 32 has a shared nature.

A method for a neural network operation with the device of this embodiment as shown in FIG. 5E comprised:

Step S5-31: reading, by the logic control core 331 in the heterogeneous core 33,s data and instructions of the neural network operation from the memory 31 through the cache 32;

Step S5-32: determining, by the logic control core 331 in the heterogeneous core 33, whether or not there is an eligible dedicated core in accordance with the type and parameters for the neural network models in the data, wherein the term "eligible" refers to that the dedicated core supports the neural network operation and can accomplish the scale of the neural network operation; if the dedicated core m is eligible, the dedicated core m serves as a target core, and Step S5-33 is executed, or else Step S5-35 is executed, wherein m is the serial number of the dedicated core;

Step S5-33: sending, by the logic control core 331 in the heterogeneous core 33, a signal to the target core to activate the target core, and sending the addresses corresponding to the data and instructions of the neural network operation to be executed to the target core at the same time;

Step S5-34: acquiring, by the target core, the data and instructions of the neural network operation according to the acquired address (from the cache 32) to execute the neural network operation, and then storing the operation result to the cache 32 to complete the operation;

Step S5-35: sending, by the logic control core 331 in the heterogeneous core 33, a signal to the generic core 332 to activate the generic core 332, and sending the addresses corresponding to the data and instructions of the neural network operation to be executed to the generic core 332 at the same time;

Step S5-36: acquiring, by the generic core 332, the data and instructions of the neural network operation according to the acquired addresses (from the cache 32) to execute the neural network operation, and then stores the operation result to the cache 32 to complete the operation.

Figure 5F:
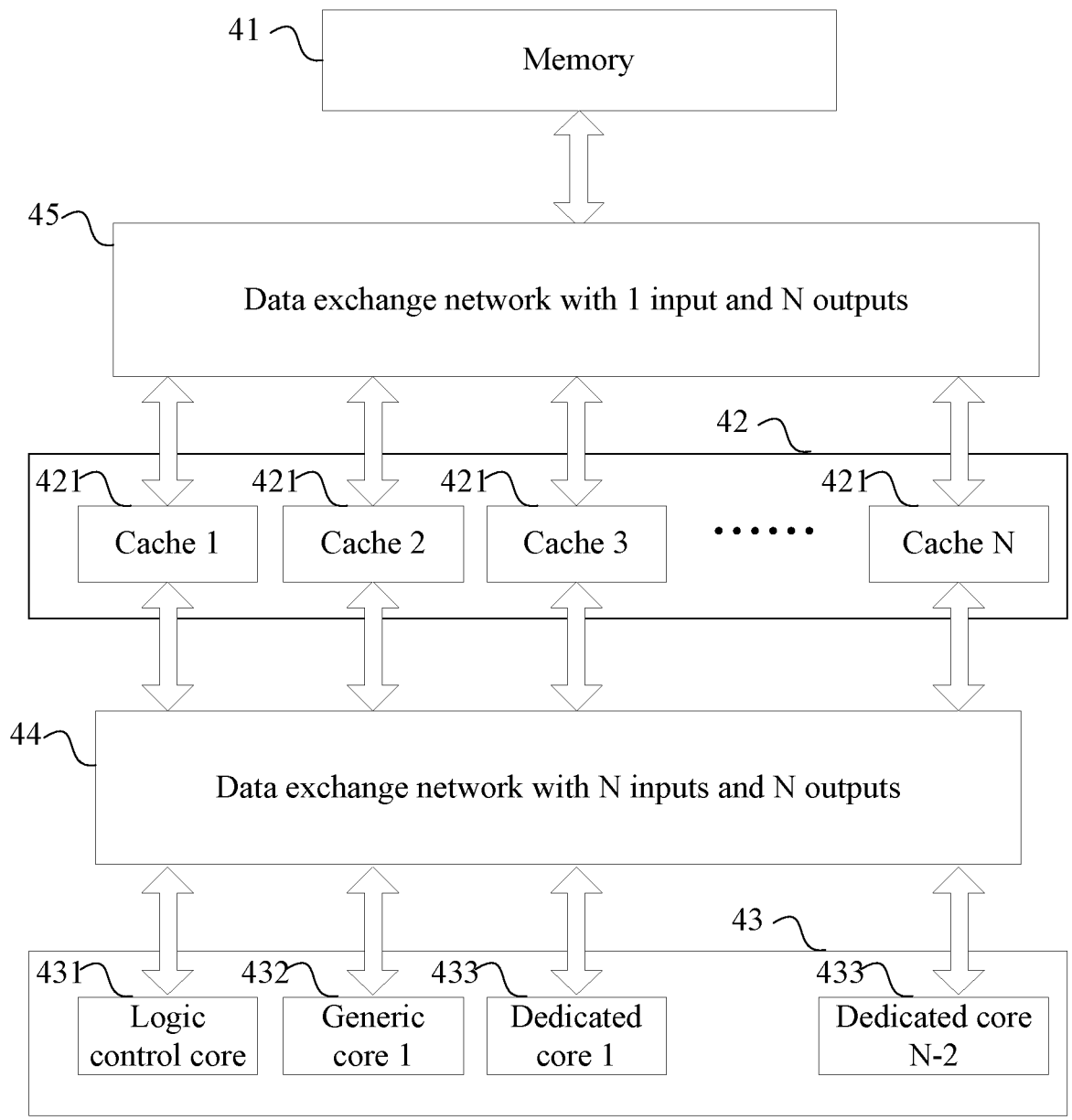
FIG. 5F schematically shows a heterogeneous multicore neural network processor according to another embodiment of the present disclosure.

Further, the way of connection between the memory and the cache can be changed, thereby producing a new embodiment, as shown in FIG. 5F. Compared with the embodiment as shown in FIG. 5E, the difference is in the way of connection between the memory 41 and the cache 42. The original is connected by the bus, and when the memory 31 is written by multiple caches 321, it needs to line up and is not efficient (see FIG. 5E). Now the structure here is abstracted as a 1 inputs and N outputs data exchange network, and this function can be implemented using a variety of topologies, such as a star structure (both of memory 41 and N caches 421 are connected via dedicated pathways), a tree structure (memory 41 is at the root position, while the caches 421 are at the leaf positions), and the like.

It should be noted that the present disclosure does not make any limitation on the number of the logic control cores, the number of the dedicated cores, the number of the generic cores, the number of the shared or non-shared caches, and the number of the memories, and they can be properly adjusted according to specific requirements for the neural network operation.

Heretofore, the embodiments of the present disclosure have been described in detail in conjunction with the drawings. Based on the above description, those skilled in the art should have a clear understanding of a heterogeneous multi-core neural network processor and a neural network operation method of the present disclosure.

In some embodiments, the present disclosure provides a chip comprising the above operation device.

In some embodiments, the present disclosure further provides a chip package structure comprising the above chip.

In some embodiments, the present disclosure further provides a board comprising the above chip package structure.

In some embodiments, the present disclosure further provides electronic equipment comprising the above board.

The electronic device may include a data processing device, a robot, a computer, a printer, a scanner, a tablet, a smart terminal, a mobile phone, a driving recorder, a navigator, a sensor, a camera, a server, a cloud server, a camera, a video camera, a projector, a watch, an earphone, a mobile storage, a wearable device, a transportation, a household appliance and/or a medical facility.

The transportation includes an airplane, a ship and/or a vehicle. The household appliance includes a television set, an air conditioner, a microwave oven, a refrigerator, a rice cooker, a humidifier, a washing machine, an electric lamp, a gas stove, and a range hood. The medical device includes a nuclear magnetic resonance instrument, a B-ultrasound machine, and/or an electrocardiograph.

It should be noted that, for the sake of brevity, the foregoing method embodiments are all described as a combination of a series of actions, but those skilled in the art should understand that the present disclosure is not limited by the described sequence of actions, because certain steps may be performed in other sequences or concurrently in accordance with the present disclosure. Furthermore, those skilled in the art should also understand that the embodiments described in the specification are all optional embodiments, and the actions and modules involved are not necessarily required by the present disclosure.

The above various embodiments are described with different focuses, and the parts that are not detailed in a certain embodiment can be found in the related descriptions of other embodiments.

In the several embodiments provided herein, it should be understood that the disclosed device may be implemented in other ways. For example, the device embodiments described above are merely illustrative. For example, the division of the units is only a logical functional division. In actual implementations, there may be other dividing manners, for example, combining multiple units or components or integrating them into another system, or ignoring or not executing some features. In addition, the mutual coupling or direct coupling or communication connection shown or discussed may be indirect coupling or communication connection through some interfaces, devices or units, and may be in an electrical form or other forms.

The units described as separate components may or may not be physically separated, and the components presented as units may or may not be physical units; that is, they may be located in one place, or may be distributed to multiple network units. Some or all of the units may be selected according to actual needs to achieve the purpose of the technical solution of the embodiment.

In addition, the respective functional units in the respective embodiments of the present disclosure may be integrated into one processing unit, or each unit may exist in a physically independent manner, or two or more units may be integrated in one unit. The above integrated unit can be implemented in the form of hardware or in the form of a software program module.

The integrated unit, if implemented in the form of a functional software unit and sold or used as a standalone product, may be stored in a computer readable memory. Based on such understanding, the essence of the technical solution of the present disclosure or the part of the technical solution which makes a contribution to the prior art or the whole or part of the technical solution may be embodied in the form of a software product. The computer software product is stored in a memory which includes a number of instructions for causing a computer device (which may be a personal computer, server or network device, etc.) to perform all or some of the steps of the method described in each embodiment of the present disclosure. The foregoing memory includes various media that can store program codes, such as USB stick, Read-Only Memory (ROM), Random Access Memory (RAM), removable hard disk, magnetic disk, CD, and the likes.

Those skilled in the art may understand that all or some of the steps in the methods of the above embodiments can be completed with related hardware instructed by a program. The program can be stored in a computer readable memory. The memory may include: flash disk, Read-Only Memory (ROM), Random Access Memory (RAM), magnetic disk, CD, and the likes.

The above description of the disclosed embodiments enables those skilled in the art to implement or use the present disclosure. Various modifications to these embodiments are obvious to those skilled in the art, and the general principles defined herein may be implemented in other embodiments without departing from the spirit or scope of the present disclosure. Therefore, the present disclosure is not limited to the embodiments shown herein, but satisfies the broadest scope consistent with the principles and novel features disclosed herein.

It should be noted that the implementations that are not shown or described in the drawings or the description are all known to those skilled in the art, and are not described in detail. In addition, the above definitions of the various elements and methods are not limited to the specific structures, shapes or manners mentioned in the embodiments, and modifications and alternation can be readily conceived by those skilled in the art. For example:

The control module of the present disclosure is not limited to a specific composition and structure in the embodiments, the control modules that can achieve interactions of data and operational instructions between the storage module and the operation unit and are generally known to those skilled in the art can all be used in the present disclosure.

The foregoing embodiments further explain the objective, the technical solution, and the advantageous effects of the present disclosure. It is appreciated that the foregoing is merely specific embodiments of the present disclosure, and is not intended to be limiting. Any modification, equivalent substitution, improvements, etc. made within the spirit and principles of the present disclosure shall be included in the scope of the present disclosure.

What is claimed is:

1. An operation device, comprising:
   an operation circuit for executing a neural network operation;
   a power conversion circuit connected to the operation circuit, for converting input neuron data and/or output neuron data of the neural network operation into power neuron data, wherein the power conversion circuit includes:
      a first power conversion circuit configured to convert the neuron data output from the operation circuit into the power neuron data, and
      a second power conversion circuit configured to convert the neuron data input to the operation circuit into the power neuron data, wherein the power neuron data includes:
         one or more sign bits that indicate a sign of the power neuron data, two or more power bits that indicate power-bit data of the power neuron data;
   a storage module configured to store an encoding table that includes the power-bit data and exponential values corresponding to the power-bit data,
      wherein a correspondence in the encoding table is a positive correlation, the storage module is pre-stored with an integer x and a positive integer y, wherein an exponential value corresponding to a minimum power-bit data in the encoding table is x, where x denotes an offset value and y denotes a step length.

2. The operation device according to claim 1, wherein the operation circuit further comprises a third power conversion circuit for converting the power neuron data into non-power neuron data.

3. The operation device according to claim 1, further comprising:
- a storage module for storing data and operational instructions; and
- a control circuit for controlling interactions of the data and the operational instructions, the control circuit being configured to receive the data and the operational instructions sent by the storage module and decode the operational instructions into operational microinstructions;
- wherein the operation circuit is configured to receive the data and the operational microinstructions sent by the control circuit, and performing the neural network operation on the received data according to the operational microinstructions.

4. The operation device according to claim 3, wherein the control circuit comprises an operational instruction buffer circuit, a decoding circuit, an input neuron buffer circuit, a weight buffer circuit and a data control circuit;
- wherein the operational instruction buffer circuit is connected to the data control circuit for receiving the operational instructions sent by the data control circuit;
- the decoding circuit is connected to the operational instruction buffer circuit for reading the operational instructions from the operational instruction buffer circuit and decoding the operational instructions into the operational microinstructions;
- the input neuron buffer circuit is connected to the data control circuit for acquiring corresponding power neuron data from the data control circuit;
- the weight buffer circuit is connected to the data control circuit for acquiring corresponding weight data from the data control circuit;
- the data control circuit is connected to the storage module for implementing interactions of the data and the operational instructions between the storage module and the operational instruction buffer circuit, the weight buffer circuit as well as the input neuron buffer circuit, respectively;
- the operation circuit is connected to the decoding circuit, the input neuron buffer circuit and the weight buffer circuit respectively, for receiving the operational microinstructions, the power neuron data and the weight data, and performing corresponding neural network operations on the power neuron data and the weight data received by the operation circuit according to the operational microinstructions.

5. The operation device according to claim 4, further comprising:
- an output module comprising an output neuron buffer circuit for receiving the neuron data output from the operation circuit;
- wherein
  - the first power conversion circuit connected to the output neuron buffer circuit for converting the neuron data output from the output neuron buffer circuit into the power neuron data;
  - the second power conversion circuit connected to the storage module for converting the neuron data input to the storage module into the power neuron data;
  - wherein the operation circuit further comprises a third power conversion circuit connected to the operation circuit for converting the power neuron data into non-power neuron data.

6. The operation device according to claim 5, wherein the first power conversion circuit is further connected to the data control circuit for converting the neuron data output from the operation circuit into power neuron data and sending the power neuron data to the data control circuit as input data of a next layer of the neural network operation.

7. The operation device according to claim 1, wherein the encoding table further includes one or more zero setting power-bit data, to which the corresponding power neuron data is 0.

8. The operation device according to claim 1, wherein the power neuron data corresponding to a maximum power-bit data is 0, or the power neuron data corresponding to a minimum power-bit data is 0.

9. The operation device according to claim 1, wherein power neuron data corresponding to maximum power-bit data in the encoding table is 0, and one or more of a plurality of exponential values corresponding to other power-bit data than a minimum and maximum power-bit data are (power-bit data+x)*y.

10. The operation device according to claim 9, wherein $y=1$, $x=-2^{m-1}$, in which m denotes a count of the power bits.

11. The operation device according to claim 1, wherein a correspondence in the encoding table is a negative correlation, the storage module is pre-stored with an integer x and a positive integer y, wherein one of a plurality of exponential values corresponding to a maximum power-bit data is x, where x denotes an offset value and y denotes a step length.

12. The operation device according to claim 11, wherein the exponential value corresponding to the maximum power-bit data is x, power neuron data corresponding to a minimum power-bit data is 0, and one or more of a plurality of exponential values corresponding to other power-bit data than the minimum and maximum power-bit data are (power-bit data−x)*y.

13. The operation device according to claim 12, wherein $y=1$, $x=2^{m-1}$, in which m denotes a count of the power bits.

14. The operation device according to claim 13, wherein converting the neuron data into the power neuron data comprises:

$$s_{out}=s_{in}$$

$$d_{out+}=\lfloor \log_2(d_{in+}) \rfloor$$

where $d_{in}$ is the input data of the power conversion circuit, $d_{out}$ represents the output data of the power conversion circuit, $s_{in}$ represents the sign of the input data, $s_{out}$ represents the sign of the output data, $d_{in+}$ represents a positive part of the input data with $d_{in+}=d_{in} \times s_{in}$, $d_{out+}$ represents a positive part of the output data with $d_{out+}=d_{out} \times s_{out}$, $\lfloor x \rfloor$ represents a flooring operation on the data x; or $$s_{out}=s_{in}$$

$$d_{out+}=\lceil \log_2(d_{in+}) \rceil$$

where $d_{in}$ is the input data of the power conversion circuit, $d_{out}$ is the output data of the power conversion circuit, $s_{in}$ is the sign of the input data, $s_{out}$ is the sign of the output data, $d_{in+}$ is a positive part of the input data with $d_{in+}=d_{in} \times s_{in}$, $d_{out+}$ is a positive part of the output data with $d_{out+}=d_{out} \times s_{out}$, $\lceil x \rceil$ represents a ceiling operation on the data x; or $$s_{out}=s_{in}$$

$$d_{out+}=[\log_2(d_{in+})]$$

where $d_{in}$ is the input data of the power conversion circuit, $d_{out}$ is the output data of the power conversion circuit, $s_{in}$ is the sign of the input data, $s_{out}$ is the sign of the output data, $d_{in+}$ is a positive part of the input data with $d_{in+}=d_{in} \times s_{in}$, $d_{out+}$ is a positive part of the output data with $d_{out+}=d_{out} \times s_{out}$, [x] represents a rounding operation on the data x.

15. A method of using an operation device according to claim 13, wherein a range of the power neuron data representable by the neural network operation device is adjusted by changing the integer x and the positive integer y pre-stored in the storage module.

16. An operation method, comprising:

executing, by an operation circuit, a neural network operation;

converting, by a power conversion circuit, neuron data of the neural network operation into power neuron data prior to the execution of the neural network operation;

converting, by the power conversion circuit, the neuron data of the neural network operation into the power neuron data after the execution of the neural network operation;

converting, by a first power conversion circuit of the power conversion circuit, the neuron data of the neural network operation into the power neuron data;

converting, by a second power conversion circuit of the power conversion circuit, the neuron data of the neural network operation into the power neuron data, wherein the power neuron data includes:

one or more sign bits that indicate a sign of the power neuron data, two or more power bits that indicate power-bit data of the power neuron data; and storing, by a storage module, an encoding table that includes the power-bit data and exponential values corresponding to the power-bit data, wherein a correspondence in the encoding table is a positive correlation, the storage module is pre-stored with an integer x and a positive integer y, wherein an exponential value corresponding to a minimum power-bit data in the encoding table is x, where x denotes an offset value and y denotes a step length.

17. The operation method according to claim 16, wherein converting neuron data of the neural network operation into power neuron data prior to the execution of the neural network operation comprises:

converting non-power neuron data in the neuron data into the power neuron data; and receiving and storing operational instructions, the power neuron data and weight data.

18. The operation method according to claim 17, wherein between receiving and storing operational instructions, the power neuron data and weight data and executing the neural network operation, the method further comprises:

reading the operational instructions, and decoding the operational instructions into respective operational microinstructions.

19. The operation method according to claim 18, wherein when executing the neural network operation, the weight data and the power neuron data are subjected to the neural network operation according to the operational microinstructions.

20. The operation method according claim 19, wherein converting output neuron data of the neural network operation into power neuron data after the execution of the neural network operation comprises:

outputting neuron data obtained from the neural network operation; and converting non-power neuron data in the neuron data obtained from the neural network operation into the power neuron data.

21. The operation method according to claim 20, wherein the power neuron data is sent to the data control circuit as input power neurons of a next layer of the neural network operation; executing the neural network operation and converting the non-power neuron data into the power neuron data are repeated until the operation of the last layer of the neural network is finished.

22. The operation method according to claim 21, wherein an integer x and a positive integer y are pre-stored in a storage module, where x denotes an offset value and y denotes a step length; a range of the power neuron data representable by the neural network operation device is adjusted by changing the integer x and the positive integer y pre-stored in the storage module.

* * * * *